(12) United States Patent
Lange

(10) Patent No.: US 12,139,695 B2
(45) Date of Patent: Nov. 12, 2024

(54) METHOD FOR CONDITIONING WOOD BARRELS

(71) Applicant: Intellectual Property Pty Ltd, Docklands (AU)

(72) Inventor: Darren Lange, Medindie (AU)

(73) Assignee: Intellectual Property Pty Ltd, Docklands (AU)

( * ) Notice: Subject to any disclaimer, the term of this patent is extended or adjusted under 35 U.S.C. 154(b) by 684 days.

(21) Appl. No.: 17/250,766

(22) PCT Filed: Sep. 3, 2019

(86) PCT No.: PCT/AU2019/050935
§ 371 (c)(1),
(2) Date: Mar. 2, 2021

(87) PCT Pub. No.: WO2020/047588
PCT Pub. Date: Mar. 12, 2020

(65) Prior Publication Data
US 2021/0198604 A1    Jul. 1, 2021

(30) Foreign Application Priority Data

Sep. 3, 2018  (AU) .................................. 2018903242

(51) Int. Cl.
| C12G 3/07 | (2006.01) |
| C12H 1/22 | (2006.01) |
| B27H 5/00 | (2006.01) |
| B27M 1/06 | (2006.01) |

(52) U.S. Cl.
CPC .................. *C12G 3/07* (2019.02); *C12H 1/22* (2013.01); *B27H 5/00* (2013.01); *B27M 1/06* (2013.01); *C12G 2200/21* (2013.01)

(58) Field of Classification Search
CPC .............. C12H 1/22; C12G 3/07; B27H 5/00; B27H 5/02; B27M 1/06
USPC ......... 99/277.1; 217/72, 88; 147/1; 432/224; 29/402.06
See application file for complete search history.

(56) References Cited

U.S. PATENT DOCUMENTS

| 747,740 | A | * | 12/1903 | Malone ......................... 99/277.1 |
| 1,014,883 | A | * | 1/1912 | Klein ......................... C12G 3/07 |
| | | | | 217/3 CB |
| 3,372,633 | A | * | 3/1968 | Horlander, Jr. ......... B65D 25/14 |
| | | | | 99/277.1 |
| 4,211,115 | A | | 7/1980 | Engebreth |
| 5,271,161 | A | | 12/1993 | Brinck, II |
| 5,630,265 | A | | 5/1997 | Stone |
| 5,906,151 | A | | 5/1999 | Firestone et al. |

| 2007/0259299 | A1 | * | 11/2007 | Schneiderwind ........ B27M 1/06 |
| | | | | 217/88 |
| 2011/0101010 | A1 | | 5/2011 | Maiocco |
| 2011/0203093 | A1 | * | 8/2011 | Dollinger ................. B27H 5/08 |
| | | | | 29/402.06 |
| 2016/0243599 | A1 | | 8/2016 | Albrecht |
| 2018/0371387 | A1 | | 12/2018 | Hall et al. |

FOREIGN PATENT DOCUMENTS

| FR | 3026337 A1 | 4/2016 |
| GB | 978514 | 12/1964 |
| GB | 2206605 A | 1/1989 |
| IE | 20170255 A1 | 6/2018 |
| WO | 03016177 A1 | 2/2003 |
| WO | 2012017110 A1 | 2/2012 |
| WO | 2016046481 A1 | 3/2016 |
| WO | 2020047588 A1 | 3/2020 |

OTHER PUBLICATIONS

Extended European Search Report in EP19856904.8, mailed May 30, 2022, 8 pages.
International Searching Authority in connection with PCT/AU2019/050935 filed Sep. 3, 2019, "The International Search Report and the Written Opinion of the International Searching Authority, or the Declaration", 8 pages, mailed Oct. 24, 2019.
International Preliminary Examining Authority in connection with PCT/AU2019/050935 filed Sep. 3, 2019, "International Preliminary Report on Patentability", 19 pages, mailed Dec. 21, 2020.
International Preliminary Examining Authority in connection with PCT/AU2019/050935 filed Sep. 3, 2019, "Written Opinion of the International Preliminary Examining Authority", 4 pages, mailed Jul. 27, 2020.
International Searching Authority in connection with PCT/AU2019/050935 filed Sep. 3, 2019, "Written Opinion of the International Searching Authority", 6 pages, mailed Oct. 24, 2019.

* cited by examiner

*Primary Examiner* — Reginald Alexander
(74) *Attorney, Agent, or Firm* — McKee, Voorhees & Sease, PLC

(57) ABSTRACT

Disclosed herein is a process for the conditioning of wood barrels, in particular, a process for the rapid conditioning of wood barrels. The disclosed process may comprise one or more steps comprising: subjecting a wood barrel to heat to increase the temperature of the wood; contacting the heated internal surface of the wood barrel with a fluid additive; and then optionally: subjecting the interior of the wood barrel to a pressurised environment; and/or subjecting the wood barrel to further heating; repeating one or more steps; and allowing the wood barrel to cool, or cooling the wood barrel, to provide a conditioned wood barrel. Also disclosed is another process comprising the step of providing a bladder and a liquid additive within the interior of a wood barrel for a predetermined time to facilitate absorbing the additive into the wood, wherein the bladder reduces the interior volume of the wood barrel such that the liquid additive is in contact with the internal surface of the barrel. Also disclosed herein are conditioned wood barrels and uses thereof.

16 Claims, 34 Drawing Sheets

METHOD FOR CONDITIONING WOOD BARRELS

CROSS-REFERENCE TO RELATED APPLICATIONS

The present application claims priority from Australian Provisional Patent Application No 2018903242 filed on 3 Sep. 2018, the contents of which are incorporated herein by reference in their entirety.

TECHNICAL FIELD

This disclosure generally relates to processes for the conditioning of wood barrels, in particular, processes for the rapid conditioning of wood barrels. The disclosure also relates to conditioned wood barrels and the use thereof.

BACKGROUND

Alcoholic beverages, such as vodka, tequila, rum, bourbon, whisky, brandy and the like are generally produced through a distillation process. Distillation yields primarily ethanol, but also aldehydes, esters, and fatty acids, all of which have very specific flavours and aromas. It is the unique combination of these chemicals that make spirits different from one another. Multiple distillations and filtering can remove many of these compounds to create a "clean" or aroma-less and flavourless spirit (i.e. vodka). The choice of raw materials, the fermentation process, and the distillation technique and equipment will all contribute to the overall chemical composition and therefore smell and taste of the final distillate product.

Following distillation, in order to improve the taste and smoothness of the alcoholic beverage, the products are generally aged. For instance, bourbons and whiskies are typically aged at least three years prior to being sold for consumption. Rums, tequilas and brandies are aged for varying amounts from 2 to 10 years or even more.

In the past, alcoholic distillates, such as bourbon and whisky, for example, have been aged in wood (typically oak) barrels or casks over long periods of time. The beverages are aged in the wooden containers in order to remove unwanted components and to impart certain colours, flavours, aromas, fragrances and mouth feel to enhance the smoothness and taste of the beverage. During the aging process, the distillates can react with components in the wood, such as lignins, tannins, and carbohydrates.

For numerous reasons, alcoholic distillates were traditionally aged in wood barrels that had been used previously for storing other alcoholic beverages, such as wine and fortified wine (including for example, port and sherry), so called "aged" or "conditioned" wood barrels. It has been recognised for some time that aging of alcoholic distillates in different conditioned wood barrels provides for differences in the final aged product, that being that the wood and its former contents plays a significant part in the aging process and the ultimate characteristics of the final aged product.

Changes in the industry of alcoholic beverage production have resulted in producers of alcoholic distillates experiencing a shortage in supply of suitable and/or desirable conditioned wood barrels. Taking the Scotch whisky industry as an example, early whisky makers in Scotland typically used old sherry barrels from Spain for aging their whisky. However, in the mid-nineteenth century, changes in commerce, consumer taste and production regulations resulted in a significant reduction in sherry barrels reaching Scotland and being available for use in the production of whisky.

The Scottish whisky industry has attempted to address the shortage in sherry barrels in a number of ways. One way is to source old barrels that have been used for alcoholic beverages other than sherry. For example, old wine barrels or other fortified wine barrels, such as port barrels, may be used. Additionally, due to the requirement that bourbon must be aged in new oak barrels, the bourbon industry provides a significant proportion of used barrels for the production of whisky. Notably, however, the use of bourbon barrels alters the characteristics of the whisky produced. Similarly, barrels that have been used previously for wine or fortified wines other than sherry, such as port, alter the characteristics of the whisky produced. The altered characteristics of whisky aged in non-sherry barrels appeal to some, but not all, whisky consumers.

Another way the whisky industry attempted to address the shortage of sherry barrels was to use barrel conditioning methods to try and make the wood of the barrel suitable for use in the aging of whisky. A former barrel conditioning method involved "paxarette" (sometimes spelled "pajarete"). Paxarette is a Spanish sweet condensed white wine made generally with Pedro Ximenez grapes and finished by mixing the wine with essences, called arrope or sancocho, which are produced by boiling must down to a fifth and a third respectively.

The whisky and other alcoholic distillate industries are significantly affected by the shortage in supply of suitable and/or desirable conditioned wood barrels. There is therefore a need for new processes which meet the supply requirements of suitable and/or desirable conditioned wood barrels for these industries. As the time involved in traditionally conditioning wood barrels is too long to meet commercial needs, there is a need for processes which involve the rapid conditioning of wood barrels.

SUMMARY

The present inventors have developed processes for the rapid conditioning of wood barrels. In particular, the inventors have developed processes suitable for the production of wood barrels that impart the same or similar sensory and/or chemical characteristics of traditional neutral and/or conditioned barrels to a beverage when the barrels are used for the production of the beverage. Further, the processes are suitable for the production of wood barrels that impart customised and/or defined sensory and/or chemical characteristics to a beverage when the barrels are used for the production of the beverage.

In one aspect, there is provided a process for conditioning a wood barrel, the process comprising:
  (a) subjecting the wood barrel to heat to increase the temperature of the wood;
  (b) contacting the heated internal surface of the wood barrel with a fluid additive;
  (c) optionally subjecting the interior of the wood barrel to a pressurised environment to facilitate absorbing the fluid additive into the wood;
  (d) optionally subjecting the wood barrel to further heating;
  (e) optionally repeating at least one of steps (b), (c) and (d); and
  (f) allowing the wood barrel to cool, or cooling the wood barrel, to provide a conditioned wood barrel.

In another aspect, there is provided a process for wood barrel conditioning, the process comprising:
(i) providing a bladder and a liquid additive within the interior of a wood barrel for a predetermined time to facilitate absorbing the additive into the wood, wherein the bladder reduces the interior volume of the wood barrel such that the liquid additive is in contact with the internal surface of the barrel.

In another aspect, there is provided a conditioned wood barrel produced by the processes described herein.

In another aspect, there is provided use of a wood barrel as described herein for the production of an aged alcoholic distillate.

BRIEF DESCRIPTION OF DRAWINGS

Preferred embodiments of the present disclosure will be further described and illustrated, by way of example only, with reference to the accompanying drawings in which.

DESCRIPTION OF EMBODIMENTS

Figure 1:
FIG. 1 shows the set-up of oak stave soaks in new make spirit (60%).

The present disclosure describes the following various non-limiting examples, which relate to investigations undertaken to identify processes for the rapid conditioning of wood barrels. It was surprisingly found that a process of: heating a wood barrel to increase the temperature of the wood; contacting the heated wood with a fluid additive; optionally pressurising the interior of the barrel to facilitate absorbing the fluid additive into the wood; and optionally further heating the wood barrel; can be used to rapidly condition wood barrels. The processes described herein have been found to be suitable for the production of wood barrels that impart the same or similar sensory and/or chemical characteristics of traditional neutral and/or conditioned barrels to a beverage when the barrels are used for the production of the beverage. Even further, the processes described herein may be used for the production of wood barrels that impart customised and/or defined sensory and/or chemical characteristics to a beverage when the barrels are used for the production of the beverage.

General Definitions and Terms

Unless specifically defined otherwise, all technical and scientific terms used herein shall be taken to have the same meaning as commonly understood by one of ordinary skill in the art (e.g., production of alcoholic distillates, wine production, coopering, etc.).

Unless otherwise required by context, singular terms shall include pluralities and plural terms shall include the singular. Thus, as used in this specification and the appended claims, the singular forms "a", "an" and "the" include plural referents unless the context clearly indicates otherwise.

The term "and/or", e.g., "X and/or Y" is be understood to mean either "X and Y" or "X or Y" and provides explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Throughout this specification the word "whisky", is intended to include "whisky" and "whiskey" and may be used interchangeably.

Throughout this specification the words "condition/conditioning/condition" with respect to wood barrels is intended to include "mature/matured/maturing" "season/seasoning/seasoned" and "age/aging/aged" and may be used interchangeably with any one or more of these.

The term "about" as used herein refers to a range of +/−5% of the specified value.

Throughout this specification, various aspects and components are presented in a range format. The range format is included for convenience and should not be interpreted as an inflexible limitation on the scope of the disclosure. Accordingly, the description of a range should be considered to have specifically disclosed all the possible sub-ranges as well as individual numerical values within that range, unless specifically indicated. For example, description of a range such as from 1 to 5 should be considered to have specifically disclosed sub-ranges such as from 1 to 3, from 1 to 4, from 1 to 5, from 2 to 4, from 2 to 5, from 3 to 5 etc., as well as individual and partial numbers within the recited range, for example, 1, 2, 3, 4, 5, 5.5 and 6, unless where integers are required or implicit from context. This applies regardless of the breadth of the disclosed range. Where specific values are required, these will be indicated in the specification.

Any embodiment herein shall be taken to apply mutatis mutandis to any other embodiment unless specifically stated otherwise.

The present disclosure is not to be limited in scope by the specific embodiments described herein, which are intended for the purpose of exemplification only. Functionally-equivalent steps, products and methods are clearly within the scope of the disclosure, as described herein.

Throughout this specification, unless specifically stated otherwise or the context requires otherwise, reference to a single step, product, group of steps or group of products shall be taken to encompass one and a plurality (i.e., one or more) of those steps, products, groups of steps or groups of products.

Requirement for Wood Barrels

As described above, alcoholic distillate industries are significantly affected by the shortage in supply of suitable and/or desirable conditioned wood barrels. New processes which involve rapid wood conditioning and provide suitable and desirable wood barrels are required.

Suitable and/or desirable wood barrels may be those that have the same or similar sensory aspects and/or chemical characteristics of "neutral", or "traditionally conditioned" wood barrels.

Neutral wood barrels are those first filled with wine and stored for many years such that the wine has caused the barrel to become "neutral" whereby it no longer imparts oak flavour or colour. It is generally recognised in the wine industry that in order to generate a neutral barrel, wine must be in contact with the wood for a period of three to five years. It is generally recognised in the alcoholic distillate industry, including the whisky industry, that in order to generate a neutral barrel, wine must be in contact with the wood for a period of at least ten years. Neutral barrels can be used for aging alcoholic distillates to improve the quality through oxygenation of distillate components, concentration of flavours as some of the alcohol evaporates and removal of undesirable or immature components by absorption into the wood.

Traditionally conditioned wood barrels are those barrels that have been used for one or more years to produce wine (but have not progressed to neutral barrels), fortified wine, such as sherry or port, or alcoholic distillates such as bourbon. Barrels that have been used for multiple and different beverages (e.g., firstly wine, and subsequently fortified wine) are also traditionally conditioned barrels. Traditionally conditioned barrels can be used for aging alcoholic distillates to improve the quality through the addition of flavours, colours and aromas imparted from the first and/or second beverage soaked into the wood and the wood itself, as well as through oxygenation, concentration and removal of undesirable or immature components as in the use of neutral barrels.

Using current techniques, the production of neutral and traditionally conditioned barrels takes many years as it requires the first and/or second liquid fill to remain in the barrel for a long period of time, typically many years. For example, the process to make sherry means that generally a sherry barrel is only available for use, theoretically, after three to thirty years. In practice, however, sherry producers are able to re-use sherry barrels many times over and are therefore reluctant to release the sherry barrels to distillers. Taking wine barrels as another example, for the alcoholic distillate industry, waiting times of three or more years is undesirable and is insufficient to meet the current market demands.

The present inventors have developed processes for the rapid conditioning of wood barrels. It was surprisingly found that a process of: heating a wood barrel to increase the temperature of the wood; contacting the heated wood with a fluid additive; optionally pressurising the interior of the barrel to facilitate absorbing the fluid additive into the wood; and optionally further heating the wood barrel; can be used to rapidly condition wood barrels. The processes described herein have been found to be suitable for the production of wood barrels that impart the same or similar sensory and/or chemical characteristics of traditional neutral and/or conditioned barrels to a beverage when the barrels are used for the production of the beverage. Even further, the processes described herein may be used for the production of wood barrels that impart customised and/or defined sensory and/or chemical characteristics to a beverage when the barrels are used for the production of the beverage.

In one embodiment the wood barrels are neutral. In another embodiment the wood barrel has been used for about 5 to about 8 years for wine. In another embodiment the wood barrel has been used for at least 10 years with spirits. In yet another embodiment, the wood barrel has been used for about 5 to about 8 years for wine and at least 10 years with spirits.

In a first aspect, the present disclosure provides a process for conditioning a wood barrel, the process comprising or consisting of:
  (a) subjecting the wood barrel to heat to increase the temperature of the wood;
  (b) contacting the heated internal surface of the wood barrel with a fluid additive;

(c) optionally subjecting the interior of the wood barrel to a pressurised environment to facilitate absorbing the fluid additive into the wood;
(d) optionally subjecting the wood barrel to further heating;
(e) optionally repeating at least one of steps (b), (c) and (d); and
(f) allowing the wood barrel to cool, or cooling the wood barrel, to provide a conditioned wood barrel.

In one embodiment of the first aspect the process does not involve the use of a vacuum, for example before, during and/or after step (a), (b), (c), (d), (e) and/or (f).

In a second aspect, the present disclosure provides a process for conditioning a wood barrel, the process comprising:
(i) providing a bladder and a liquid additive within the interior of a wood barrel for a predetermined time to facilitate absorbing the additive into the wood, wherein the bladder reduces the interior volume of the wood barrel such that the liquid additive is in contact with the internal surface of the barrel.

In one embodiment of the second aspect the process does not involve the use of a vacuum, for example before, during and/or after step (a), (b), (c), (d), (e) and/or (f).

In a further embodiment, the process of the above first aspect and second aspect may be combined together in any order. For example, in one embodiment the process according to the second aspect, or any embodiments or examples of the second aspect, are provided prior to the process according to the first aspect, or any embodiments or examples of the first aspect. In other words, in this embodiment step (i) of the first aspect may constitute a pre-treatment step to steps (a) to (f) of the first aspect.

Wood Barrels

The process of the present disclosure may use any size and shape barrel. Examples of barrels that may be used include, but are not limited to: pipes, butts, hogsheads, American standard barrels (ASB), puncheons, dumpy puncheons, Bordeaux type, Burgundy type, gallons, rundlets, tierces, tuns, firkins, kilderkins, foudre and vats.

The barrels may comprise any wood that is suitable for use in the production of beverages, and particularly in the production of alcoholic beverages. The wood of barrels transmits different intricate flavours to the wine or alcoholic distillate. Different species of wood differ in their levels of flavours, compounds and porous effects. Suitable wood includes, but is not limited to: oak, chestnut, cherry, acacia, ash, mulberry, maple, hickory, redwood, cedar and walnut.

Barrels used for aging are often made of oak, including: French common oak (*Quercus robur* or *Quercus petraea*), Spanish oak (*Quercus pyrenaica*), American white oak (*Quercus alba*), Japanese oak (Mizunara oak) and Chinese oak.

In some embodiments, the barrel is comprised of: oak, chestnut, cherry, acacia, ash, mulberry, maple, hickory, redwood, cedar and/or walnut. In some embodiments, the barrel is comprised of oak. In some embodiments, the barrel is comprised of American oak. In some embodiments, the barrel is comprised of European oak. In some embodiments, the barrel is comprised of American and/or European oak. In some embodiments, the European oak is French oak. In some embodiments, the European oak is Hungarian oak.

The process of the present disclosure may use new wood barrels or previously used wood barrels. New wood barrels are often referred to as "virgin" oak barrels as the barrel is comprised of wood that has not previously been used for making an alcoholic beverage. New wood barrels may be used in their current size and shape or they may be re-coopered to a new size and shape.

In some embodiments, the barrel is a new wood barrel. In some embodiments, the barrel is comprised of virgin wood.

Previously used wood barrels are wood barrels that have been used one or more times to produce wine, fortified wine, such as sherry or port, or alcoholic distillates such as bourbon. Similarly to new wood barrels, old wood barrels may be used in their current size and shape or they may be re-coopered to a new size and shape. Previously used barrels may be traditionally conditioned barrels as set out above. Previously used barrels includes barrels that have been re-coopered from staves obtained from a previously used wood barrel.

In some embodiments, the barrel is a used wood barrel. In some embodiments, the barrel has been used for wine production. In some embodiments, the barrel has been used for fortified wine production. In some embodiments, the barrel has not been used for fortified wine production. In some embodiments, the barrel has been used for sherry production. In some embodiments, the barrel has been used for alcoholic distillate production. In some embodiments, the barrel has been used for bourbon production.

Pre-Treating Old Barrels: Cleaning and Rejuvenation

In the process of the present disclosure, if old wood barrels are used, these are generally cleaned and/or rejuvenated first. The cleaning and/or rejuvenation process for old barrels involves any one or more steps required to clean and/or rejuvenate the barrel. Such steps include, but are not limited to, subjecting the internal surface of the wood barrel to hot water or steam, shaving some or all of the internal surface, re-shaping or re-sizing the barrel, toasting the internal surface of the barrel, and/or charring the internal surface of the barrel. Such steps may be performed in any order as determined appropriate by a person skilled in the art.

In some embodiments, the process comprises or consists of any one or more of the following steps, in any order:
contacting the internal surface of the wood barrel with hot water or steam;
shaving the internal surface of the barrel;
re-shaping or re-sizing the barrel; and/or
toasting and/or charring the internal surface of the barrel.

In one embodiment the process comprises shaving and charring, for example charring for about 30 seconds, optionally longer.

Contacting the internal surface of the wood barrel with hot water or steam may be used to moisten the wood, sanitise the barrel and/or remove the unwanted former contents. If the barrel has previously been used for wine production, sanitising with hot water or steam is generally performed in the process of the present disclosure. Contacting the barrel with steam may be performed at high temperature and/or at high pressure. The amount of time this step is performed will depend on the condition of the barrel and would be readily determined by a person skilled in the art.

In some embodiments, the process includes contacting the internal surface of the wood barrel with high pressure steam. In some embodiments, the process includes contacting the internal surface of the wood barrel with hot water. In some embodiments, the process includes contacting the internal surface of the wood barrel with hot water, wherein the water temperature is above about 70° C. and up to above about 180° C. In some embodiments, the process includes contacting the internal surface of the wood barrel with hot water, wherein the water temperature is above about: 70° C., 80° C., 90° C., 100° C., 110° C., 120° C., 130° C., 140° C., 150°

C., 160° C., 170° C. or 180° C. In some embodiments, the process includes contacting the internal surface of the wood barrel with hot water, wherein the water temperature is between about 80° C. to about 120° C. In some embodiments, the process includes contacting the internal surface of the wood barrel with hot water, wherein the water temperature is between about 80° C. to about 110° C.

Shaving the internal surface of the barrel may be performed to remove the layer of wood that has been toasted or charred previously. Removing the previous toasted or charred layer exposes a layer of fresh wood which may itself contact the contents added to the barrel later or may be toasted and/or charred. The shaving may be to remove a thin layer of wood, for example, about 2-3 mm or up to about 5 mm, or the shaving may be to remove a greater layer of wood, for example, up to about 10 mm or up to about 20 mm. The shaving may be on all staves of the barrel. The shaving may be on some of the staves of the barrel. The shaving may be on parts of the staves of the barrel.

In some embodiments, the process includes shaving the internal surface of the barrel. In some embodiments, the process includes shaving the internal surface of the barrel to remove a wood layer of up to about 5 mm. In some embodiments, the process includes shaving the internal surface of the barrel to remove a wood layer of up to about 3 mm.

In some embodiments, the process includes toasting the internal surface of the barrel and/or charring the internal surface of the barrel. Heating the interior of the barrel gently "toasts" the internal surface of the barrel to alter the wood chemistry and provide a number of beneficial effects. Toasting mellows the tannins in the wood, as well as changes the flavours the barrel might impart on the later contents from raw wood to more spicy, vanilla notes; toasting helps release vanillin from the cellulose in the wood. There are varying degrees of toasting, from a light toast to a heavy toast and the level of toasting impacts the characteristics of the final aged product. Essentially, the heavier the toast, the stronger the flavours of the barrel.

A person skilled in the art will be able to determine the level of toasting required for their purpose. A person skilled in the art will also be able to determine the amount of heat and length of time required for their desired level of toasting. Generally, toasting is achieved by heating the interior of the barrel to a temperature of at least about 160° C. to about 220° C., or at least about 180° C. to about 210° C. In some embodiments, toasting is achieved by heating the interior of the barrel to a temperature of at least about 160° C., 170° C., 180° C., 190° C., 200° C., 210° C. or 200° C. Generally, toasting is achieved by heating the interior of the barrel for up to about 5 minutes to up to about 120 minutes. In some embodiments, toasting is achieved by heating the interior of the barrel for up to about 120 minutes, up to about 90 minutes, up to about 60 minutes, up to about 30 minutes, up to about 15 minutes, up to about 10 minutes, or up to about 5 minutes. In some embodiments, toasting is achieved by heating the interior of the barrel for at least about 20 minutes up to about 100 minutes. In some embodiments, toasting is achieved by heating the interior of the barrel for at least about 30 minutes up to about 90 minutes.

In some embodiments, the process includes toasting the internal surface of the barrel. In some embodiments, toasting the internal surface of the barrel is by open flame (e.g., gas, wood) or radiant heat (e.g., electrical, gas). In some embodiments, toasting the internal surface of the barrel is by open flame. In some embodiments, toasting the internal surface of the barrel is by gas open flame. In some embodiments, toasting the internal surface of the barrel is by wood open flame. In some embodiments, toasting the internal surface of the barrel is by radiant heat. In some embodiments, toasting the internal surface of the barrel is by electricity generated radiant heat. In some embodiments, toasting the internal surface of the barrel is by gas radiant heat.

Charring is also performed on barrels to create flavour, colour and different aromas. Charring a barrel requires the interior of the barrel to catch fire for a short period of time to create a char layer on the internal surface of the barrel. As the heat from this process gradually penetrates into the wood, a number of complex reactions within the wood occur and the chemistry is significantly modified in the interior wood layers. The char layer acts as a filter to remove unwanted compounds (for example, sulfur compounds) and to break down the oak cell walls so the later barrel contents can extract flavour from the wood. Charred barrels impart a dark colour, smoky notes as well as caramel, honey and spicy accents to the later barrel contents. Charred barrels are more commonly used for aging alcoholic distillates than for wine or fortified wine.

A person skilled in the art will be able to determine the level of charring required for their purpose. A person skilled in the art will also be able to determine the length of time required for their desired level of charring. Generally, the interior of the barrel is set on fire for up to about 10 seconds to up to about 10 minutes. In some embodiments, the interior of the barrel is set on fire for up to about 30 seconds to up to about 5 minutes. In some embodiments, the interior of the barrel is set on fire for up to about 30 seconds to up to about 3 minutes. In some embodiments, the interior of the barrel is set on fire for up to about 10 minutes, 8 minutes, 6 minutes, 5 minutes, 4 minutes, 3 minutes, 2 minutes, 1 minute, 45 seconds, 30 seconds, or 10 seconds.

In some embodiments, the process includes charring the internal surface of the barrel. In some embodiments, charring the internal surface of the barrel is by open flame. In some embodiments, the open flame is a gas flame. In some embodiments, the open flame is a wood flame.

In some embodiments, the process includes toasting the internal surface of the barrel and charring the internal surface of the barrel. In some embodiments, the process includes toasting the internal surface of the barrel and charring the internal surface of the barrel by open flame. In some embodiments, open flame is a gas flame. In some embodiments, the open flame is a wood flame.

As would be understood by a person skilled in the art, in order to perform the cleaning and/or rejuvenating steps, the barrel may need to be dis-assembled, partially or completely. If the barrel is dis-assembled, re-assembly is required. Additionally, in order to provide a barrel of the desired size and shape, the cleaning and/or rejuvenating steps may include a re-coopering step wherein the barrel is re-sized and re-shaped. Re-sizing and re-shaping barrels is well within the skill set of a person skilled in the art.

In some embodiments, the process includes contacting the internal surface of the wood barrel with high pressure steam; shaving the internal surface of the barrel; re-shaping or re-sizing the barrel; and toasting and/or charring the internal surface of the barrel. In some embodiments, the process includes shaving the internal surface of the barrel; re-shaping or re-sizing the barrel; and toasting and/or charring the internal surface of the barrel. In some embodiments, the process includes contacting the internal surface of the wood barrel with high pressure steam; re-shaping or re-sizing the barrel; and toasting and/or charring the internal surface of the barrel. In some embodiments, the process includes contacting the internal surface of the wood barrel with high pressure steam; shaving the internal surface of the barrel; and toasting and/or charring the internal surface of the barrel. In some embodiments, the process includes shaving the internal surface of the barrel; and toasting and/or charring the internal surface of the barrel.

Pre-Treating New Barrels

In the process of the present disclosure, if new wood barrels are used, the process may further comprise or consist of any one or more of the steps of: contacting the internal surface of the wood barrel to hot water or steam; toasting the internal surface of the barrel; and/or charring the internal surface of the barrel. Such steps may be performed in any order as determined appropriate by a person skilled in the art. Such steps are as described above for old barrels.

Rapid Conditioning of Wood Barrels

Once any optional pre-treatment steps have been performed, the process for conditioning a wood barrel of the first aspect comprises or consists of:
  (a) subjecting the wood barrel to heat to increase the temperature of the wood;
  (b) contacting the heated internal surface of the wood barrel with a fluid additive;
  (c) optionally subjecting the interior of the wood barrel to a pressurised environment to facilitate absorbing the fluid additive into the wood;
  (d) optionally subjecting the wood barrel to further heating;
  (e) optionally repeating at least one of steps (b), (c) and (d); and
  (f) allowing the wood barrel to cool, or cooling the wood barrel, to provide a conditioned wood barrel.

The fluid additive may be any additive that is desired to be absorbed into the wood barrel. The fluid additive may be a gas or a liquid. The additive may be the additive alone, or the additive may be an additive in a delivery vehicle, such as a delivery liquid or delivery gas. The delivery liquid can be any suitable liquid for delivering the additive, including, but not limited to, an aqueous or alcoholic liquid. The delivery gas can be any suitable gas for delivering the additive, including, but not limited to, air, oxygen, nitrogen and argon.

One or more of the fluid additives may be concentrated prior to use. In one embodiment one or more fluid additives are added in the form of liquid droplets or particles optionally with a carrier liquid or carrier gas. In another embodiment one or more fluid additives are introduced in the form of an atomised spray. In yet another embodiment, one or more fluid additives are introduced in the form of droplets, liquids or an atomised spray in a mixture comprising one or more carrier liquids and/or one or more carrier gases. The use of a spray, particles or atomisation may ensure that all of the fluid additive is absorbed directly into the barrel without any residual run off.

In one embodiment there is an additional atomised application of one or more fluid additives post pressurising (for example after optional step (C)). This may be followed by a return to radiant heat source which can concentrate and oxidise the infusion of the fluid additive.

Gas additives include, but are not limited to, seasoned gases and wood smoke. The gas additive may be wood smoke. The wood used for wood smoke may be any wood which provides the desired characteristic, attribute or flavour, including, but not limited to: sandalwood, eucalypt, oak, chestnut, cherry, acacia, ash, mulberry, maple, hickory, redwood, cedar, walnut and mixtures thereof. The gas additive may be a peat smoke. The peat smoke may be prepared by heating or burning peat. The gas additive may be a seasoned gas. Seasoned gases may be a gas which incorporates any desirable characteristic, attribute or flavour, for example, botanicals. A seasoned gas may be prepared in any way suitable as determined by a person skilled in the art. An exemplary preparation method includes heating or burning a material containing the desirable characteristic, attribute or flavour and capturing the "seasoned" gas that results. A seasoned gas may be prepared by heating or burning botanicals.

The gas additive may be used alone or in combination with a delivery gas. The delivery gas may be air, oxygen, nitrogen or argon. One or more gas additives may be used in the process of the present disclosure. When more than one gas additive is used, the gas additives may be used concomitantly or sequentially, that is, the process may involve contacting the heated internal surface of the barrel with the gas additives at the same time or one after the other.

In some embodiments, the fluid additive is a gas. In some embodiments, the gas is wood smoke. In some embodiments, the gas is peat smoke. In some embodiments, the gas is a seasoned gas. In some embodiments, the seasoned gas is a botanical seasoned gas.

Liquid additives include, but are not limited to, beverages, particularly alcoholic beverages, flavours and colours. The liquid additive may be an alcoholic liquid, including but not limited to: wine, fortified wine, an alcoholic distillate or mixtures thereof. The wine may be any suitable red wine or white wine. The fortified wine may be any suitable fortified wine, including but not limited to: sherry, port, madeira, marsala, vermouth and dessert wines. The alcoholic distillate may be any suitable alcoholic distillate, including but not limited to: whisky, bourbon, rum, brandy, cognac, vodka, tequila, mescal, schnapps and gin.

The liquid additive may be a flavour, for example: a concentrated fruit (such as grape) syrup or must, fruit flavour or essence (such as: strawberry, raspberry, blackberry, blueberry, cherry, cranberry, fig, orange, lemon, lime, apple, pear, peach, nectarine, grape, mango, passionfruit, plum, banana, pineapple, coconut), chocolate, caramel, spice (such as: cinnamon, ginger, star anise, clove, allspice, peppercorns, cardamom pods, vanilla beans), nut (such as: pecans, walnuts, almonds), herb (such as: mint, rosemary, parsley thyme, basil, dill, lemongrass), botanical (such as: hibiscus, elderflower, lavender and other edible flowers), an extract of any one or more of these, and mixtures thereof. As would be understood by a person skilled in the art, a liquid additive may need to be prepared before use. For example, when the liquid additive is a botanical, an exemplary preparation method includes steeping the plant material in a liquid for a period of time such that characteristics, attributes and/or flavours are extracted into the liquid. The plant material is removed and the remaining liquid is used as, or part of, the additive in the process of the present disclosure.

The liquid additive may be a colour. The colour may be a natural colour and/or an artificial colour. Colours include, but are not limited to: carmine E120 (red), E150a-d (caramel), annatto E160b (red), elderberry juice E163 (red), lycopene E160d (red), quinolone yellow E104 (yellow), carmoisine E122 (red), ponceau 4R E124 (red), patent blue V E131 (blue), brilliant blue FCF E133 (blue), indigotine E132 (indigo), fast green E143 (turquoise), erythrosine E127 (pink), allura red E129 (red), tartrazine E102 (yellow), and sunset yellow E110 (orange).

The liquid additive may be used alone or in combination with a delivery liquid. The delivery liquid can be any suitable liquid for delivering the additive, including, but not limited to, an aqueous or alcoholic liquid. One or more liquid additives may be used in the process of the present disclosure. When more than one liquid additive is used, the liquid additives may be used concomitantly or sequentially, that is, the process may involve contacting the heated internal surface of the barrel with the liquid additives at the same time or one after the other.

The liquid additive may also be heated prior to contacting the wood barrel. Heating the liquid additive can be performed to, for example, concentrate the liquid additive and/or change or modify the liquid additive. The change or modification of the liquid additive includes oxidisation of components within the liquid additive. When the liquid additive is heated prior to use, the liquid additive may be heated to any desired temperature and will be dependent on the particular liquid additive.

The liquid additive may be heated to from about 40° C. to about 200° C. prior to contacting the heated internal surface of the wood barrel. In some embodiments, the liquid additive is heated to a temperature of at or at least about: 40° C., 50° C., 60° C., 70° C., 80° C., 90° C., 100° C., 110° C., 120° C., 130° C., 140° C., 150° C., 160° C., 170° C., 180° C., 190° C., or 200° C. prior to contacting the heated internal surface of the wood barrel. The liquid additive may be heated to a temperature within a range provided by any two of these previous temperature values. In some embodiments, the liquid additive is heated to from: about 60° C. to about 75° C., about 60° C. to about 100° C., about 40° C. to about 70° C., or about 100° C. to about 150° C.

In some embodiments, the fluid additive is a liquid additive. In some embodiments, the liquid additive is an alcoholic liquid. In some embodiments, the liquid additive is a wine or a fortified wine or an alcoholic distillate. In some embodiments, the liquid additive is a wine. In some embodiments, the liquid additive is a fortified wine. In some embodiments, the liquid additive is an alcoholic distillate. In some embodiments, the liquid additive is a flavour. In some embodiments, the liquid additive is a concentrated fruit syrup or must, or fruit flavour or essence. In some embodiments, the liquid additive is a botanical. In some embodiments, the liquid additive is a colour. In some embodiments, the liquid additive is a caramel colour.

In step (a), subjecting the wood barrel to heat is to increase the temperature of the wood. Increasing the temperature of the wood opens the pores of the wood to allow for absorption of a fluid additive. Without being bound by theory, it is thought that in order for the wood to absorb the fluid additive, the temperature of the wood is required to be about 100° C. or above. Raising the temperature of the wood such that the wood can absorb the fluid additive may be achieved by heating the interior of the barrel to a temperature of between about 100° C. to about 250° C. In some embodiments, the internal barrel temperature is about: 100° C., 110° C., 120° C., 130° C., 140° C., 150° C., 160° C., 170° C., 180° C., 190° C., 200° C., 210° C., 220° C., 240° C., or 250° C. or above. The internal barrel temperature may be within a range provided by any two of these previous temperature values. In some embodiments, the internal barrel temperature is from: about 100° C. to about 150° C., about 120° C. to about 150° C., about 120° C. to about 200° C., about 150° C. to about 200° C., about 160° C. to about 190° C., or about 160° C. to about 180° C. In one embodiment the internal barrel temperature is about 160° C.

As would be understood by a person skilled in the art, any suitable method may be used to subject the wood barrel to heat in step (a). Methods include, but are not limited to: heating the wood barrel with fire (e.g. wood, gas), radiant heat (e.g. electrical, gas) steam and/or water. In some embodiments, heating the wood barrel is with fire. In some embodiments, heating the wood barrel is with a wood fire. In some embodiments, heating the wood barrel is with a gas fire. In some embodiments, heating the wood barrel is with radiant heat. In some embodiments, heating the wood barrel is with steam. In some embodiments, heating the wood barrel is with water.

In step (a), subjecting the wood barrel to heat is for any amount of time as determined to be appropriate by a person skilled in the art. Subjecting the wood barrel to heat may be for a time of between about 30 seconds and about 120 minutes. In some embodiments, subjecting the wood barrel to heat is for up to about 30 seconds or 60 seconds, or up to about: 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 105, 110, 115 or 120 minutes. In some embodiments, subjecting the wood barrel to heat is for up to about: 2 minutes, 5 minutes, 10 minutes, 15 minutes, 20 minutes, 30 minutes, or 60 minutes. In some embodiments, heating the barrel is for: up to about 2 minutes to up to about 5 minutes, about 5 minutes to up to about 10 minutes, about 5 minutes to up to about 20 minutes, about 10 minutes to up to about 30 minutes, or about 30 minutes to up to about 60 minutes.

In step (b), the heated internal surface of the barrel is contacted with a fluid additive. The contact may be by any suitable method as determined by a person skilled in the art. Suitable methods include, but are not limited to, spraying, pouring, dipping and coating. In some embodiments, the contact comprises spraying the additive onto the internal surface of the wood barrel. In some embodiments, the contact comprises coating the additive onto the internal surface of the wood barrel. One or more of the fluid additives may be concentrated prior to use. One or more of the fluid additives may be in the form of a liquid or dispersed particles or droplets. In one embodiment the method of contact of one or more fluid additives is as a spray. In another embodiment the method of contact of one or more fluid additives is as an atomised spray. In yet another embodiment there is an additional application of a fluid additive following optional step (c), wherein the additional application comprises contacting one or more fluid additives as a spray, optionally an atomised spray and optionally with a carrier liquid and/or gas. The fluid additive may be introduced as a spray, for example an atomised spray, using a method known to the person skilled in the art, for example an appropriately configured nozzle that provides appropriately sized droplets. In one embodiment at least fluid additive is added as a spray, optionally an atomised spray.

The amount of fluid additive used in step (b) will be any amount as determined to be appropriate by a person skilled in the art. The additive amount may be such that all of the additive is absorbed into the wood on contact. Alternatively, the additive amount may be such that not all of the additive is absorbed into the wood on contact and surplus additive is removed or allowed to run off. For both gas and liquid additives, the amount of additive may be from: about 100 mL to about 5 L, about 100 mL to about 3 L, about 100 mL to about 2 L, about 100 mL to about 1 L, or about 500 mL to about 1 L. In some embodiments, the amount of additive is about: 100 mL, 500 mL, 1 L, 1.5 L, 2 L, 2.5 L, 3 L, 3.5 L, 4 L, 4.5 L, or 5 L.

In step (b), the internal barrel temperature is between about 100° C. to about 250° C. In some embodiments, the internal barrel temperature is about: 100° C., 110° C., 120° C., 130° C., 140° C., 150° C., 160° C., 170° C., 180° C., 190° C., 200° C., 210° C., 220° C., 240° C., or 250° C. or above. The internal barrel temperature may be within a range provided by any two of these previous temperature values. In some embodiments, the internal barrel temperature is from: about 100° C. to about 150° C., about 120° C. to about 150° C., about 120° C. to about 200° C., about 150° C. to about 200° C., about 160° C. to about 190° C., or about 160° C. to about 180° C.

Step (c) is an optional step, i.e., the process of the present disclosure may, or may not, involve step (c). In one embodiment the process comprises or further consists of step (c), which may be provided according to any of the embodiments or examples as described herein. When step (c) is performed, the interior of the wood barrel is subjected to a pressurised environment to facilitate absorbing the fluid additive into the wood. As would be understood by a person skilled in the art, any suitable method may be used to provide the pressurised environment in step (c). Methods include, but are not limited to, sealing both ends of the barrel and increasing the internal pressure and placing the barrel in an enclosed chamber and increasing the internal pressure of the chamber and the barrel within the chamber.

In some embodiments, step (c) is performed and the interior of the wood barrel is subjected to a pressurised environment to facilitate absorbing the fluid additive into the wood. In some embodiments, the pressurised environment in step (c) is achieved by sealing both ends of the barrel and increasing the internal pressure. In some embodiments, the pressurised environment in step (c) is achieved by placing the barrel in an enclosed chamber and increasing the internal pressure of the chamber and the barrel within the chamber.

In step (c), the internal pressure of the wood barrel is between about 10 psi to about 100 psi. In some embodiments, the internal pressure of the wood barrel is about: 10, 15, 20, 25, 30, 35, 40, 45, 50, 55, 60, 65, 70, 75, 80, 85, 90, 95 or 100 psi. The internal pressure may be within a range provided by any two of these previous values. In some embodiments, the internal pressure is from about 15 psi to about 40 psi, about 20 psi to about 30 psi, about 20 psi to about 40 psi, about 15 psi to about 30 psi, about 30 psi to about 50 psi, about 20 psi to about 50 psi, or about 30 psi to about 70 psi.

In step (c), the pressurised environment is maintained for any amount of time as determined to be appropriate by a person skilled in the art. The pressurised environment may be maintained for a time of between about 30 seconds and about 120 minutes. In some embodiments, the pressurised environment is maintained for up to about 30 seconds or 60 seconds, or up to about: 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 105, 110, 115 or 120 minutes. In some embodiments, the pressurised environment is maintained for up to about 2 minutes, about 5 minutes, about 10 minutes, or about 20 minutes. In some embodiments, the pressurised environment is maintained for about 30 seconds to up to about 2 minutes, about 1 minute to up to about 5 minutes, about 5 minutes to up to about 10 minutes, or about 10 minutes to up to about 20 minutes.

In an alternative form, when step (c) is performed, the interior of the wood barrel is subjected to a reduced pressure environment to facilitate absorbing the fluid additive into the wood. As would be understood by a person skilled in the art, any suitable method may be used to provide the reduced pressure environment in (c). Methods include, but are not limited to, sealing both ends of the barrel and applying a vacuum to reduce the internal pressure of the wood barrel and placing the barrel in an enclosed chamber and applying a vacuum to reduce the internal pressure of the chamber and the barrel within the chamber. In one embodiment, a vacuum is not used before, during and/or after step (c).

In step (c), when the fluid additive is a liquid additive, the additive may be completely absorbed into the wood or the liquid additive may not be completely absorbed into the wood. In other words, in step (c), the amount of liquid additive used may be an amount such that all of the liquid additive is absorbed into the wood, or the amount of liquid additive used may be an amount such that some of the liquid additive is absorbed into the wood and some of the liquid additive remains on the surface of the barrel as excess. When the liquid additive is not completely absorbed into the wood it may be necessary to remove the excess additive. Removing the excess liquid additive may be achieved by any suitable method, including, but not limited to, allowing the excess liquid additive to run off, tilting the barrel to force the liquid additive to run off, and using a vacuum to remove the excess liquid additive. In some embodiments, the liquid additive is completely absorbed into the barrel in step (c). In some embodiments, the liquid additive is not completely absorbed into the barrel in step (c). In some embodiments, in step (c) the liquid additive is not completely absorbed into the barrel in step (c) and excess liquid additive is removed.

Step (d) is an optional step, i.e., the process of the present disclosure may, or may not, involve step (d). In one embodiment the process comprises or further consists of step (d), which may be provided according to any of the embodiments or examples as described herein. When step (d) is performed, the wood barrel is subjected to further heating. When the additive is a liquid additive, the further heating may, but not necessarily, oxidise and/or concentrate the liquid additive within the wood. As would be understood by a person skilled in the art, any suitable method may be used to heat the wood barrel in step (d). Methods include, but are not limited to, fire (e.g. wood, gas), radiant heat (e.g. electrical, gas) steam, and electrical.

In some embodiments, step (d) is performed and the barrel is subjected to further heating. In some embodiments, heating the barrel in step (d) is with fire. In some embodiments, heating the barrel in step (d) is with a wood fire. In some embodiments, heating the barrel in step (d) is with a gas fire. In some embodiments, heating the barrel in step (d) is with radiant heat. In some embodiments, heating the barrel in step (d) is with steam. In some embodiments, heating the barrel in step (d) oxidises and/or concentrates the liquid additive within the wood. In some embodiments, heating the barrel in step (d) oxidises the liquid additive within the wood. In some embodiments, heating the barrel in step (d) concentrates the liquid additive within the wood. In some embodiments, heating the barrel in step (d) oxidises and concentrates the liquid additive within the wood.

In step (d), heating the wood barrel is for any amount of time as determined to be appropriate by a person skilled in the art. Heating the barrel may be for a time of between about 30 seconds and about 120 minutes. In some embodiments, heating the barrel is for up to about 30 seconds or 60 seconds, or up to about: 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 105, 110, 115 or 120 minutes. In some embodiments, heating the barrel is for: up to about 2 minutes, 5 minutes, 10 minutes, 15 minutes, 20 minutes, 30 minutes, or 60 minutes. In some embodiments, heating the barrel is for: up to about 2 minutes to up to about 5 minutes, about 5 minutes to up to about 10 minutes, about 5 minutes to up to about 20 minutes, about 10 minutes to up to about 30 minutes, or about 30 minutes to up to about 60 minutes.

The process according to the present disclosure may comprise or consist of performing any one or more of steps (b), (c) and (d) more than once. Performing step (b) optionally with step (c) and/or (d) delivers further fluid additive to the barrel and further fluid additive is absorbed into the wood. The process may include performing step (b) more than once. The process may include performing step (c) more than once. The process may include performing step (d) more than once. The process may include performing steps (b) and (c) more than once. The process may include performing steps (b) and (d) more than once. The process may include performing steps (c) and (d) more than once. The process may include performing steps (b), (c) and (d) more than once. The process according to the present disclosure may include performing any one of steps (b), (c) and (d) two or three or four or five or six or seven or eight or nine or ten times.

In some embodiments, the process comprises performing steps (b) and (c) two or three or four times each. In some embodiments, the process comprises performing steps (b) and (c) two times each. In some embodiments, the process comprises performing steps (b) and (c) three times each. In some embodiments, the process comprises performing steps (b) and (c) four times each. In some embodiments, the process comprises performing steps (b), (c) and (d) two or three or four times each. In some embodiments, the process comprises performing steps (b), (c) and (d) two times each. In some embodiments, the process comprises performing steps (b), (c) and (d) three times each. In some embodiments, the process comprises performing steps (b), (c) and (d) four times each. In addition to step (a), the process may comprise or further consist of an embodiment as described above.

In step (e), allowing the wood barrel to cool, or cooling the wood barrel is to provide a conditioned wood barrel. In one embodiment the process comprises or further consists of step (e), which may be provided according to any of the embodiments or examples as described herein. In step (e), the wood barrel may be allowed to cool. This may be achieved by leaving the barrel at room temperature for a period of time sufficient for the wood barrel to cool to room temperature. In step (e), the wood barrel may be cooled. This may be achieved by placing the barrel in a room with a temperature lower than that of room temperature for a period of time sufficient for the wood barrel to reach a desired temperature, e.g. room temperature. Alternatively, this may be achieved by using a cooling means, including, but not limited to water, air or other gas.

In one embodiment vacuum is not used before, during and/or after step (a), (b), (c), (d), (e) and/or (f).

The process may be adapted by those skilled in the art.

In one embodiment the process comprises one or more of the following steps:
 shaving the wood barrel;
 charring the barrel optionally for about 30 seconds;
 for step (a) subjecting the wood barrel to heat to increase the temperature of the wood, optionally to provide an internal temperature of about 160° C. in the wood barrel;
 for step (b) contacting the heated internal surface of the wood barrel with a fluid additive;
 for step (c) subjecting the interior of the wood barrel to a pressurised environment of about 20 PSI, optionally for about 10 minutes;
 repeating step (b) by introducing a fluid additive which may or not be the same as an earlier fluid additive;
 for step (d) subjecting the wood barrel to further heating, for example for about 10 minutes;
 repeating step (b) by introducing a fluid additive which may or not be the same as an earlier fluid additive;
 repeating step (c) by subjecting the interior of the wood barrel to a pressurised environment of about 20 PSI, optionally for about 10 minutes;
 repeating step (d) subjecting the wood barrel to further heating, for example for about 10 minutes; and/or
 repeating step (b) by introducing a fluid additive which may or not be the same as an earlier fluid additive In one embodiment the process comprises:
 optionally shaving the wood barrel;
 optionally charring the barrel, optionally for about 30 seconds;
 for step (a) subjecting the wood barrel to heat to increase the temperature of the wood, optionally to provide an internal temperature of about 160° C. in the wood barrel;
 for step (b) contacting the heated internal surface of the wood barrel with a fluid additive;
 for step (c) subjecting the interior of the wood barrel to a pressurised environment of about 20 PSI, optionally for about 10 minutes;
 repeating step (b) by introducing a fluid additive which may or not be the same as an earlier fluid additive;
 for step (d) subjecting the wood barrel to further heating, for example for about 10 minutes;
 repeating step (b) by introducing a fluid additive which may or not be the same as an earlier fluid additive;
 repeating step (c) by subjecting the interior of the wood barrel to a pressurised environment of about 20 PSI, optionally for about 10 minutes; and
 repeating step (b) by introducing a fluid additive which may or not be the same as an earlier fluid additive In another embodiment the process comprises:
 optionally shaving the wood barrel;
 optionally charring the barrel, optionally for 30 seconds;
 for step (a) subjecting the wood barrel to heat to increase the temperature of the wood, optionally to provide an internal temperature of about 160° C. in the wood barrel;
 for step (b) contacting the heated internal surface of the wood barrel with a fluid additive;
 for step (c) subjecting the interior of the wood barrel to a pressurised environment of about 20 PSI, optionally for about 10 minutes;
 repeating step (b) by introducing a fluid additive which may or not be the same as an earlier fluid additive;
 for step (d) subjecting the wood barrel to further heating, for example about 10 minutes;
 repeating step (b) by introducing a fluid additive which may or not be the same as an earlier fluid additive;
 repeating step (d) subjecting the wood barrel to further heating, for example about 10 minutes; and
 repeating step (b) by introducing a fluid additive which may or not be the same as an earlier fluid additive.

Conditioning of Wood Barrels Using Bladder

Once any optional pre-treatment steps have been performed, a process for conditioning a wood barrel may comprise:
 (i) providing a bladder and a liquid additive within the interior of a wood barrel for a predetermined time to facilitate absorbing the additive into the wood, wherein the bladder reduces the interior volume of the wood barrel such that the liquid additive is in contact with the internal surface of the barrel.

In step (i), a bladder is added to the interior of a wood barrel to reduce the interior volume of the wood barrel. Reducing the interior volume of the barrel by use of a bladder is advantageous when it is desired for a liquid, such as a liquid additive, to be in contact with the internal surface of the barrel. As the interior volume is reduced through the use of a bladder, less liquid, such as a liquid additive, is required to contact the internal surface of the barrel. This is particularly advantageous when it is desired for the liquid to be in contact with a large proportion, or all, of the internal surface of the barrel.

In some embodiments, the bladder occupies a volume in the interior of the wood barrel sufficient for the liquid additive to be in contact with all of the internal surface of the barrel. In some embodiments, the bladder occupies a volume in the interior of the wood barrel sufficient for the liquid additive to be in contact with: at least about 70%, at least about 75%, at least about 80%, at least about 85%, at least about 90%, or at least about 95% of the internal surface of the barrel. In some embodiments, the bladder occupies a volume in the interior of the wood barrel sufficient for the liquid additive to be in contact with at least about 80% of the internal surface of the barrel. In some embodiments, the bladder occupies a volume in the interior of the wood barrel sufficient for the liquid additive to be in contact with at least about 90% of the internal surface of the barrel.

Furthermore, the use of a bladder in the interior of the barrel can facilitate absorption of the liquid additive into the wood through the application of pressure. Without being bound by theory, the application of pressure can increase the rate of absorption and increase the amount of liquid additive absorbed by a wood barrel. In some embodiments, the bladder occupies a volume in the interior of the wood barrel sufficient to apply pressure to the liquid additive to facilitate absorbing the additive into the wood.

The bladder used may be any bladder suitable as determined by a person skilled in the art. The bladder used may be made of any suitable material, including, but not limited to: a non-reactive material and a food grade material (e.g., food grade plastic, food grade polyester, food grade plastic coated polyester, food grade rubber, food grade silicon rubber, food grade metal, glass). A non-reactive material is a material that is generally regarded as not reactive or not reactive unless under severe conditions. A food grade material is a material that doesn't contaminate food with harmful materials on coming in direct contact or lying nearby. In some embodiments, the bladder is comprised of a non-reactive material. In some embodiments, the bladder is comprised of a food grade material. In some embodiments, the bladder is comprised of a food grade plastic. In some embodiments, the bladder is comprised of a food grade plastic coated polyester. In some embodiments, the bladder is comprised of a food grade silicon rubber.

The bladder may be a fixed size and shape or the bladder may be an expandable bladder, i.e., the size and shape is adjustable. In some embodiments, the bladder is of fixed size and shape. In some embodiments, the bladder is an expandable bladder. A bladder of fixed size and shape may, in some instances, have the benefit of ease of use in that the bladder is simply inserted into the interior of the barrel without any adjustment. An expandable bladder may, in some instances, have the benefit of being able to be used in a range of barrel sizes and shapes as it is easily adjustable. An expandable bladder also has the benefit of being able to be adjusted during the process of the present disclosure. For example, the use of an expandable bladder allows for the bladder to occupy a first interior volume of the barrel and be adjusted during the process to occupy a second interior volume. As would be understood by a person skilled in the art, the process may comprise adjusting the volume occupied by the bladder one, two, three or more times during the process.

The bladder may contain any contents suitable as determined by a person skilled in the art. The bladder may contain, for example, a gas or a liquid. The gas may be any gas, including, but not limited to, air, nitrogen, argon and helium. The liquid may be any liquid, including, but not limited to, water, wine or other alcoholic liquid. In some embodiments, the bladder contains a gas. In some embodiments, the bladder contains air. In some embodiments, the bladder contains nitrogen. In some embodiments, the bladder contains a liquid. In some embodiments, the bladder contains water.

In the process of the present disclosure, the bladder may be added to the barrel prior to adding the liquid additive to the barrel or the liquid additive may be added to the barrel prior to adding the liquid additive to the barrel. When the bladder is an expandable bladder, the bladder may be adjusted to the desired size and shape prior to being added to the barrel or the bladder may be adjusted to the desired size and shape when the bladder is in the barrel. In some embodiments, the process comprises adding the bladder to the wood barrel prior to adding the liquid additive to the wood barrel in step (i). In some embodiments, the process comprises adding the liquid additive to the wood barrel prior to adding the bladder to the wood barrel in step (i). In some embodiments, the process comprises adjusting an expandable bladder to the desired size and shape prior to being added to the barrel. In some embodiments, the process comprises adjusting an expandable bladder to the desired size and shape when the bladder is in the barrel.

The internal surface of the wood barrel is contacted with the liquid additive for a predetermined time sufficient to facilitate absorbing the additive into the wood. The period of time will depend on a variety of factors including, for example, the particular liquid additive used, type of wood, temperature, pressure (both environmental and that applied by the bladder), and the desired level of absorption desired.

A person skilled in the art will readily be able to determine the period of time required for the internal surface of the wood barrel to be contacted with the liquid additive in step (i). The period of time may be for a period of from about one day to about 10 years. In some embodiments, the period of time is for up to about: 1, 2, 3, 4, 5, 6, 7, 8, 9, 10, 20, 30, 40, 50, 60, 70, 80, 90, 100, 110, 120, 130, 140, 150, 200, 250, 300, 350, or 365 days. In some embodiments, the period of time is for up to about: 1, 2, 3, 4, 5, 6, 7, 8, 9, 10, 20, 30, 40, 50, 60, 70, 80, 90, 100, 110, 120, 130, 140, 150, 200, 250, 300, or 350 weeks. In some embodiments, the period of time is for up to about: 1, 2, 3, 4, 5, 6, 7, 8, 9, 10, 11, 12, 13, 14, 15, 16, 17, 18, 19, 20, 21, 22, 23, 24, 30, 36, 42, 48, 56, 62, 68, or 74 months. In some embodiments, the period of time is for up to about 1, 2, 3, 4, 5, 6, 7, 8, 9, or 10 years. In some embodiments, the period of time is from: about 2 months to about 24 months, about 1 month to about 6 months, or about 1 week to about 120 weeks. In some embodiments, the period of time is for up to: one week, one month, six months, one year, two years, three years, or 5 years.

In yet another aspect of the present disclosure, the step (i) may be performed prior to the steps of (a) to (f). That being, the step (i) may constitute pre-treatment steps to steps (a) to (f). The third aspect therefore provides a process for wood barrel conditioning, the process comprising:
  (i) providing a bladder and a liquid additive within the interior of a wood barrel for a predetermined time to facilitate absorbing the additive into the wood, wherein the bladder reduces the interior volume of the wood barrel such that the liquid additive is in contact with the internal surface of the barrel;
  (a) subjecting the wood barrel to heat to increase the temperature of the wood;
  (b) contacting the heated internal surface of the wood barrel with a fluid additive;
  (c) optionally subjecting the interior of the wood barrel to a pressurised environment to facilitate absorbing the fluid additive into the wood;
  (d) optionally subjecting the wood barrel to further heating;
  (e) optionally repeating at least one of steps (b), (c) and (d); and
  (f) allowing the wood barrel to cool, or cooling the wood barrel, to provide a conditioned wood barrel.

As would be understood by a person skilled in the art, in the above process, the bladder is removed from the interior of the barrel following step (i) and prior to step (a). In some embodiments, the liquid additive is removed from the interior of the barrel following step (i) and prior to step (a). In some embodiments, the liquid additive is not removed from the interior of the barrel following step (i) and prior to step (a).

The processes of the present disclosure are used for the production of wood barrels. The wood barrels may impart the same or similar sensory and/or chemical characteristics of traditional neutral wood barrels and/or traditional conditioned wood barrels to a beverage when the barrels are used for the production of the beverage. Traditional neutral wood barrels and traditional conditioned wood barrels include those as described earlier in this disclosure.

In some embodiments, the wood barrels impart the same or similar sensory characteristics of traditional neutral and/or conditioned wood barrels to a beverage when the barrels are used for the production of the beverage. In some embodiments, the wood barrels impart the same or similar chemical characteristics of traditional neutral and/or conditioned wood barrels to a beverage when the barrels are used for the production of the beverage. In some embodiments, the wood barrels impart the same or similar sensory and chemical characteristics of traditional neutral and/or conditioned wood barrels to a beverage when the barrels are used for the production of the beverage.

The sensory and/or chemical characteristics are any relevant sensory and/or chemical characteristic as determined by a person skilled in the art. Sensory and/or chemical characteristics include, but are not limited to, one or more of: aroma attributes, taste/flavour attributes, mouthfeel, and combinations thereof.

Wood volatiles are volatile compounds derived from the wood of the barrel and are important contributors to a beverage's aroma and flavour. Such compounds include, but are not limited to, one or more of: cis-lactone, trans-lactone, guaiacol, 4-methylguaiacol, 4-ethylguaiacol, 4-methylphenol, vanillin, furfural, 5-methylfurfural, eugenol, 4-ethylphenol, iso-eugenol, 5-hydroxy-methylfurfural, syringaldehyde, coniferaldehyde, sinapaldehyde, and mixtures thereof.

Typical wine volatiles are volatile compounds derived from wine and are important contributors to a beverage's aroma and flavour. Typical wine volatiles include, but are not limited to, one or more of: esters, nor-isoprenoids, oxidation aldehydes and/or monoterpenes. Specific examples of wine volatiles include, but are not limited to one or more of: alpha-terpineol, beta-ionone, damascenone, ethyl decanoate, ethyl hexanoate, ethyl octanoate, geraniol, linalool, naphthalene, nerol, rose oxide, and trimethyl dihydronapthalene (TDN), and mixtures thereof.

During the fermentation of wine, a wide range of wine compounds are formed (fermentation derived wine compounds) including ethyl esters, acetates and alcohols. Fermentation derived wine volatiles are volatile fermentation compounds derived from wine and are major contributors to the aroma and flavour profile of a beverage. Specific examples of fermentation derived wine volatiles include, but are not limited to, one or more of: ethyl acetate, 2-methylbutyl acetate, 3-methylbutyl acetate, ethyl propanoate, hexyl acetate, ethyl 2-methylpropanoate, 2-phenylethyl acetate, ethyl butanoate, 2-methylpropanol, ethyl 2-methylbutanoate, butanol, ethyl 3-methylbutanoate, 2-methylbutanol, ethyl hexanoate, 2-methylbutanol, 3-methylbutanol, 2-methylpropyl acetate, hexanol, 2-methylbutyl acetate, acetic acid, propanoic acid, 2-methylpropanoic acid, butanoic acid, 2-methylbutanoic acid, 3-methylbutanoic acid, hexanoic acid, 2-phenylethanol, octanoic acid, decanoic acid and mixtures thereof.

Colour is another characteristic. The colour characteristics of a beverage may be due to a number of factors. The colour of a beverage may be the result of the natural colour of the beverage, the wood of the barrel, the wine or other beverage soaked into the wood of the barrel, colour additives, and a combination thereof. In some instances it may be desirable for a beverage to have a particular colour.

Characteristics imparted by wood barrels to a beverage may be determined by any suitable method (or combination of methods), including for example: sensory analysis, e.g., sensory panel analysis (including e.g., taste, smell and visual) gas chromatography/mass spectrometry (GC-MS), liquid chromatography/mass spectrometry (LC-MS), UV spectrometry, UV-Vis spectrometry, IR spectrometry, and NMR spectrometry of the beverage. Selecting an appropriate method for determining sensory and/or chemical characteristics is well within the skill of a person skilled in the art. In one embodiment, the characteristics are determined by sensory analysis. In one embodiment, the characteristics are determined by gas chromatography/mass spectrometry (GC-MS). In another embodiment, the characteristics are determined by gas chromatography/mass spectrometry (LC-MS). In another embodiment, the characteristics are determined by UV spectrometry. In another embodiment, the characteristics are determined by UV-Vis spectrometry. In another embodiment, the characteristics are determined by NMR spectrometry.

In some embodiments, the processes of the present disclosure provide wood barrels that impart any one or more sensory and/or chemical characteristics to a beverage within about 0.05% to about 80% to that of traditional neutral wood barrels and/or traditional conditioned wood barrels. In some embodiments, the wood barrels impart any one or more sensory and/or chemical characteristics to a beverage within about, or at least about: 0.05, 1, 2, 3, 4, 5, 6, 7, 8, 9, 10, 15, 20, 25, 30, 35, 40, 45, 50, 60, 70 and 80% to that of traditional neutral wood barrels and/or traditional conditioned wood barrels. The wood barrels may impart any one or more sensory and/or chemical characteristics to a beverage within a range provided by any two of these previous values. The values may apply jointly or separately to each sensory and/or chemical characteristic, i.e., where more than one sensory and/or chemical characteristic is imparted to the beverage, the value may be the same or different for each sensory and/or chemical characteristic.

In some embodiments, the wood barrels impart at least: 3, 4, 5, 6, 7, 8, 9, 10, 11, 12, 13, 14, 15, 20, 25, 30, 40 or 50 sensory and/or chemical characteristics to a beverage within about, or at least about, 0.05, 1, 2, 3, 4, 5, 6, 7, 8, 9, 10, 15, 20, 25, 30, 35, 40, 45, 50, 60, 70 and 80% to that of traditional neutral wood barrels and/or traditional conditioned wood barrels. The wood barrels may impart the sensory and/or chemical characteristics to a beverage within a range provided by any two of these previous values. In some embodiments, the wood barrels impart: 3 to 20, 5 to 15, 5 to 10, 3 to 10, or 50 to 20 sensory and/or chemical characteristics to a beverage within about, or at least about: 0.05, 1, 2, 3, 4, 5, 6, 7, 8, 9, 10, 15, 20, 25, 30, 35, 40, 45, 50, 60, 70 and 80% to that of traditional neutral wood barrels and/or traditional conditioned wood barrels.

In some embodiments, the wood barrels impart any one or more sensory and/or chemical characteristics to a beverage within about 0.05 to about 50% to that of traditional neutral wood barrels and/or traditional conditioned wood barrels. In some embodiments, the wood barrels impart any one or more sensory and/or chemical characteristics to a beverage within about 5 to about 10% to that of traditional neutral wood barrels and/or traditional conditioned wood barrels. In some embodiments, the wood barrels impart any one or more sensory and/or chemical characteristics to a beverage within about 5 to about 20% to that of traditional neutral wood barrels and/or traditional conditioned wood barrels. In some embodiments, the wood barrels impart any one or more sensory and/or chemical characteristics to a beverage within about 10 to about 20% to that of traditional neutral wood barrels and/or traditional conditioned wood barrels. In some embodiments, the wood barrels impart any one or more sensory and/or chemical characteristics to a beverage within about 5 to about 30% to that of traditional neutral wood barrels and/or traditional conditioned wood barrels. In some embodiments, the wood barrels impart any one or more sensory and/or chemical characteristics to a beverage within about 1 to about 10% to that of traditional neutral wood barrels and/or traditional conditioned wood barrels.

In some embodiments, the processes of the present disclosure provide a barrel that imparts the same or similar sensory and/or chemical characteristics of a barrel produced through a traditional conditioning process with wine to a beverage when the barrel is used for the production of the beverage. The traditional conditioning process may have involved the use of a red wine, a white wine, a fortified wine or an alcoholic distillate. In some embodiments, the traditional conditioning process involved the use of red wine. In some embodiments, the traditional conditioning process involved the use of white wine. In some embodiments, the traditional conditioning process involved the use of fortified wine. In some embodiments, the traditional conditioning process involved the use of sherry. In some embodiments, the traditional conditioning process involved the use of port. In some embodiments, the traditional conditioning process involved the use of Apera. In some embodiments, the traditional conditioning process involved the use of tawny.

In another embodiment, the processes of the present disclosure provide a barrel that imparts the same or similar sensory and/or chemical characteristics of a barrel produced through a traditional conditioning process with an alcoholic distillate to a beverage when the barrel is used for the production of the beverage. In some embodiments, the traditional conditioning process involved the use of bourbon. In some embodiments, the traditional conditioning process involved the use of rum. In some embodiments, the traditional conditioning process involved the use of whisky. In some embodiments, the traditional conditioning process involved the use of brandy. In some embodiments, the traditional conditioning process involved the use of cognac. In some embodiments, the traditional conditioning process involved the use of vodka. In some embodiments, the traditional conditioning process involved the use of tequila. In some embodiments, the traditional conditioning process involved the use of mescal. In some embodiments, the traditional conditioning process involved the use of schnapps. In some embodiments, the traditional conditioning process involved the use of gin.

Although some embodiments of the present disclosure provide wood barrels that impart the same or similar sensory and/or chemical characteristics of traditional neutral wood barrels and/or traditional conditioned wood barrels to a beverage, wood barrels of the present disclosure do not have to impart the same or similar sensory and/or chemical characteristics of traditional neutral wood barrels and/or traditional conditioned wood barrels to a beverage.

The processes of the present disclosure can also be used for the production of wood barrels that impart customised and/or defined sensory and/or chemical characteristics to a beverage when the barrel is used for the production of the beverage. For example, the processes of the present disclosure allow a person skilled in the art to identify desired and particular sensory and/or chemical characteristics and then, using a process of the present disclosure, produce a wood barrel that would impart the desired and particular sensory and/or chemical characteristics to a beverage in the production of the beverage. In the present disclosure, customised wood barrels produced according to the processes herein are also referred to, and considered as, conditioned wood barrels.

The wood barrels produced by the processes of the present disclosure may be used for any purpose or function. Uses of the conditioned wood barrels include, but are not limited to, production of a beverage. The beverage may be an alcoholic beverage. The alcoholic beverage may be an alcoholic distillate. Alcoholic beverages, such as: vodka, tequila, mescal, rum, bourbon, whisky, brandy, cognac, gin, schnapps, and the like, may be aged in the conditioned wood barrels following distillation in order to improve the taste, smoothness, and/or other sensory aspects and characteristics of the alcoholic beverage. The alcoholic beverage may be aged in the wood barrel for any period of time as desired for the production of the alcoholic beverage. For example, vodkas, tequilas, mescals, rums, bourbons, whiskies, brandies, cognacs, gins, and schnapps may be aged for one, or two, or three, or four, or five, or more years prior to being sold for consumption. The alcoholic beverage may also be a wine, including, but not limited to, red wine, white wine and fortified wine (including for example, port and sherry). Wine may be aged in the conditioned barrels in order to improve and/or alter the taste, smoothness, and/or other sensory and characteristics aspects of the wine. Wine may be aged for one, or two, or three, or four, or five, or more years prior to being sold for consumption.

In some embodiments, the wood barrel is used for the production of an alcoholic beverage. In some embodiments, the wood barrel is used for the production of an aged alcoholic beverage. In some embodiments, the wood barrel is used for the production of an aged alcoholic distillate. In some embodiments, the wood barrel is used for the production of an aged: vodka, tequila, mescal, rum, bourbon, whisky, brandy, cognac, gin or schnapps. In some embodiments, the wood barrel is used for the production of an aged vodka. In some embodiments, the wood barrel is used for the production of an aged tequila or mescal. In some embodiments, the wood barrel is used for the production of an aged rum, bourbon or whisky. In some embodiments, the wood barrel is used for the production of an aged brandy, cognac or schnapps. In some embodiments, the wood barrel is used for the production of an aged gin. In some embodiments, the wood barrel is used for the production of an aged rum. In some embodiments, the wood barrel is used for the production of an aged bourbon. In some embodiments, the wood barrel is used for the production of an aged whisky. In some embodiments, the wood barrel is used for the production of an aged wine. In some embodiments, the wood barrel is used for the production of an aged red wine, white wine or fortified wine. In some embodiments, the wood barrel is used for the production of an aged red wine. In some embodiments, the wood barrel is used for the production of an aged white wine. In some embodiments, the wood barrel is used for the production of an aged fortified wine. In some embodiments, the wood barrel is used for the production of an aged port. In some embodiments, the wood barrel is used for the production of an aged sherry.

The alcoholic beverage may be aged in the wood barrel for any period of time as desired for the production of the alcoholic beverage. The period of time may be for a period of from about one day to about 10 years. In some embodiments, the period of time is for up to about: 1, 2, 3, 4, 5, 6, 7, 8, 9, 10, 20, 30, 40, 50, 60, 70, 80, 90, 100, 110, 120, 130, 140, 150, 200, 250, 300, 350, or 365 days. In some embodiments, the period of time is for up to about: 1, 2, 3, 4, 5, 6, 7, 8, 9, 10, 20, 30, 40, 50, 60, 70, 80, 90, 100, 110, 120, 130, 140, 150, 200, 250, 300, or 350 weeks. In some embodiments, the period of time is for up to about: 1, 2, 3, 4, 5, 6, 7, 8, 9, 10, 11, 12, 13, 14, 15, 16, 17, 18, 19, 20, 21, 22, 23, 24, 30, 36, 42, 48, 56, 62, 68, or 74 months. In some embodiments, the period of time is for up to about: 1, 2, 3, 4, 5, 6, 7, 8, 9, or 10 years. In some embodiments, the period of time is from about 2 months to about 24 months, about 1 month to about 6 months, or about 1 week to about 120 weeks. In some embodiments, the period of time is for up to one week, one month, six months, one year, 2 years, 3 years, 4, years, 5 years, 10 years, 15 years, or 20 years.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

EXAMPLES

Example 1 Fortified Infusion Process

This example investigates the transfer of key characteristics from barrels prepared according to the present disclosure to whisky distillate.

Set-Up

A subset of eight barrel variants (Tables 1 and 2) were prepared according to the processes of the present disclosure. Wood samples of the processed barrel variants were then exposed to a single malt whisky distillate for a duration of about 2 weeks to provide barrel variant whisky samples. The barrel variant whisky samples were subjected to chemical analysis, comparative to a control barrel whisky sample. Five barrel variant whisky samples were subjected to chemical analysis for oak volatiles, wine volatiles and fermentation derived wine volatiles and also colorimetric analysis. Three barrel variant whisky samples were subjected to chemical analysis for wine volatiles and fermentation derived wine volatiles.

The control barrel was an American oak barrel used for the production of McWilliams Apera for 20+ years. The barrel variants are outlined in Tables 1 and 2.

TABLE 1

| Barrel variants prepared according to the present disclosure | | | | | | | |
|---|---|---|---|---|---|---|---|
| Barrel ID | Source | Oak | Addition | Bending | Post bend temp (° C.) | Charring seconds | Post char ext. temp (° C.) |
| T5V1 | Ex Red Wine | American | Premium Apera | Fire | 180 ext.[1]/ 60 int.[2] | 25 | 64 |
| T5V2 (Extra PSI time) | Ex Red Wine | American | Premium Apera | Fire | 165 ext./ 60 int. | 25 | 62 |
| T5V3 (Extra PSI time/½ fire time) | Ex Red Wine | American | Premium Apera | Fire | 170 ext./ 60 int. | 25 | 63 |
| T5V4 (½ fire time) | Ex Red Wine | American | Premium Apera | Fire | 160 ext./ 63 int. | 25 | 65 |
| T5V8 | Ex White Wine | French | Premium Apera | Fire | 158 ext./ 64 int. | 25 | 64 |
| T5V9 | Ex Bourbon | American | Premium Apera | Fire | 154 ext./ 60 int. | 25 | 63 |
| T5V11 | Virgin | American | Premium Apera | Fire | 164 ext./ 62 int. | 25 | 64 |
| T5V12[3] | Ex Red Wine | American | Premium Apera | Fire | 167 ext./ 67 int. | 25 | 68 |

TABLE 1-continued

Barrel variants prepared according to the present disclosure

| Barrel ID | Source | Oak | Addition | Bending | Post bend temp (° C.) | Charring seconds | Post char ext. temp (° C.) |
|---|---|---|---|---|---|---|---|
| T5V13 (Control) | Old Ex McWilliams Apera | American | N/A | Fire | | 25 | |

[1]External
[2]Internal
[3]Premium fortified/heat treated and added at 67 degrees + no post pressure fire heat treating

TABLE 2

Barrel variants prepared according to the present disclosure (continued)

| Barrel ID | Apera Application (AA) 1 | 20 PSI air pressure (min) | AA2 | Fire | AA3 | Fire | AA4 | No. of Apera applications | mL[1] |
|---|---|---|---|---|---|---|---|---|---|
| T5V1 | Yes | 5 | Yes | 10 | Yes | 10 | Yes | 4 | 1273 |
| T5V2 (Extra PSI time) | Yes | 10 | Yes | 10 | Yes | 10 | Yes | 4 | 1273 |
| T5V3 (Extra PSI time/½ fire time) | Yes | 10 | Yes | 10 | Yes | | | 3 | 955 |
| T5V4 (½ fire time) | Yes | 5 | Yes | 10 | Yes | | | 3 | 955 |
| T5V8 | Yes | 5 | Yes | 10 | Yes | 10 | Yes | 4 | 1273 |
| T5V9 | Yes | 5 | Yes | 10 | Yes | 10 | Yes | 4 | 1273 |
| T5V11 | Yes | 5 | Yes | 10 | Yes | 10 | Yes | 4 | 1273 |
| T5V12[2] | Yes | 5 | Yes | | | | | 2 | 636 |
| T5V13 (Control) | | | | | | | | | |

[1]Total volume of Apera applied
[2]Premium fortified/heat treated and added at 67 degrees + no post pressure fire heat treating A series of six stave samples (three samples from two representative staves), taken 0-12 mm deep from the internal stave surface of each barrel variant were soaked in 500 ml of new make whisky spirit at 60% ABV for 14 days; representing a 3×100% new oak equivalent concentration (FIG. 1). Two replicates of each barrel variant were set up to assess repeatability.

Once the soak was completed, subsamples were taken for respective chemical analysis.

Chemical Analysis

Chemical analysis was undertaken on the whisky samples produced from the use of the barrel variants. All chemical analyses were conducted on a single replicate from the whisky soak sample.

Oak Volatiles

Oak flavour analysis was conducted using gas chromatography/mass spectrometry (GC-MS) and deuterium-labelled standards to determine the concentrations of the following compounds in the barrel variant whisky samples:

4-Ethylguaiacol
4-Ethylphenol
4-Methylguaiacol
5-Methylfurfural
Cis-Oak Lactone
Eugenol
Furfural
Guaiacol
Trans-Oak Lactone
Vanillin Typical Wine Volatiles Wine volatiles spanning a range of typical aroma and flavour compounds (esters, nor-isoprenoids and monoterpenes) were evaluated using GC-MS to identify the concentrations of the volatile compounds in the barrel variant whisky samples. These compounds included:

alpha-terpineol
beta-ionone
Damascenone
Ethyl decanoate
Ethyl hexanoate
Ethyl octanoate
Geraniol
Linalool
Naphthalene
Nerol
Rose oxide
TDN Fermentation Derived Wine Volatiles Fermentation-derived wine volatiles analysis was performed on an Agilent 7890A gas chromatograph equipped with a Gerstel MPS2 multi-purpose sampler and coupled to an Agilent 5975C VL mass selective detector.

The sample vial and its contents were heated to 40° C. for 5 minutes with agitation. The SPME fibre (polyacrylate) was exposed to the headspace in the sample for 15 minutes and was then desorbed in the injector (splitless mode) for 15 minutes. The injector temperature was set at 260° C.

Compounds analysed included:
Ethyl acetate
2-methylpropanol
Acetic acid
Butanol
Ethyl propanoate
Ethyl-2-methylpropanoate
3-methylbutanol
2-methylbutanol
Propanoic acid
2-methylpropyl acetate
Ethyl butanoate
2-methylpropanoic acid
Ethyl-2-methylbutanoate
Ethyl-3-methylbutanoate
Butanoic acid
3-methylbutyl acetate
2-methylbutyl acetate
Hexanol
3-methylbutanoic acid
2-methylbutanoic acid
Hexyl acetate
Hexanoic acid
2-phenylethanol
Octanoic acid
2-phenylethyl acetate
Decanoic acid The raw data from Agilents' ChemStation software (v E.02.02.1431) was converted into MassHunter data files and processed using MassHunter Workstation Software for Quantitative Analysis (v B.04.00). The concentration of analytes in the samples were determined using stable isotope dilution analysis (SIDA) and are reported in µg/L.

Colorimetric Analysis

Colorimetric analysis was conducted using a Cary 60 UV-Vis spectrophotometer through use of CIELab methodology with the following set parameters in accordance with method OIV-MA-AS2-11 "Determination of chromatic characteristics according to CIELab" (taken from the Compendium of International Analysis Methods).

TABLE 3

Specifications for colour measurements using the CIE lab system

| Cell size | Illuminant | Observer | Scales | Differences | Interval | Wavelengths |
|---|---|---|---|---|---|---|
| 10 mm | D65 | 10° | CIELab | dL*a*b* | 5 nm | 780 to 380 nm |

Results
Oak Volatiles

Figure 2:
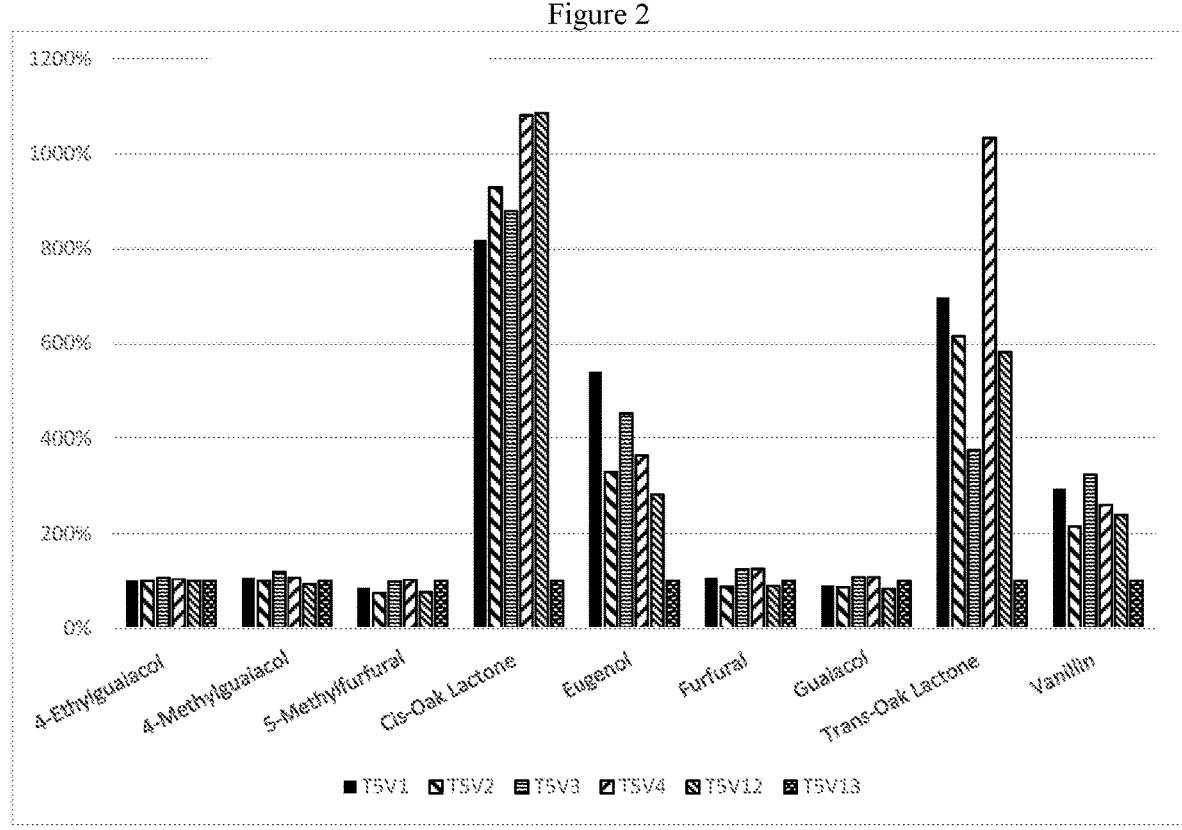
FIG. 2 shows the normalised results of the oak volatiles analysis.
Figure 3:
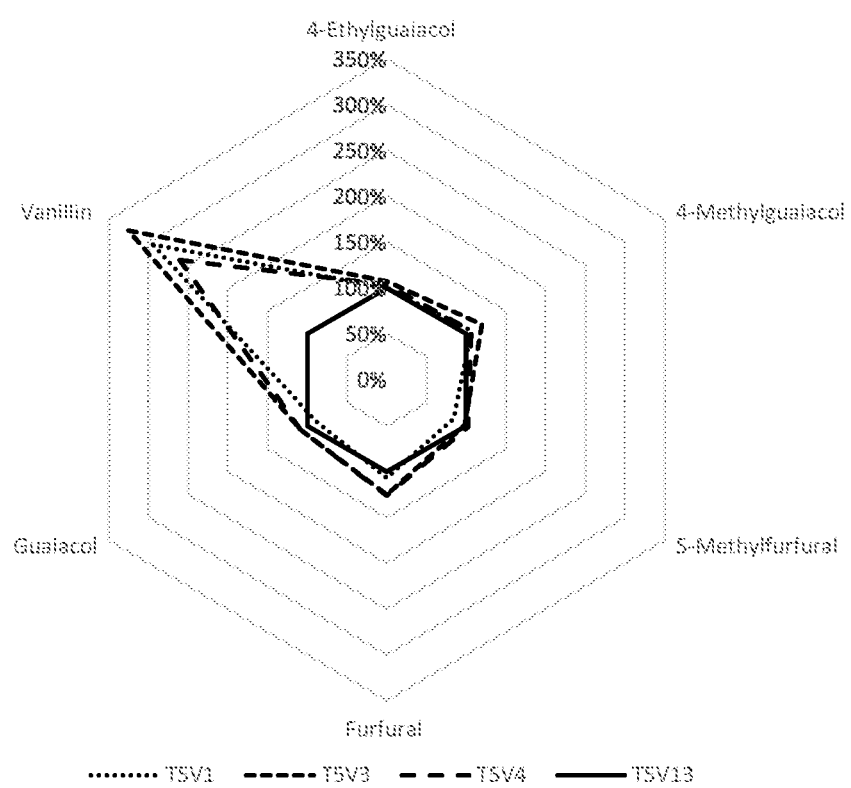
FIG. 3 shows a spider graph of the normalised results of the oak volatiles analysis.

Oak volatile analysis (oak flavour compounds) for the barrel variant whisky samples are presented in FIG. 2 and a spider graph of the analysis is presented in FIG. 3. Cis-oak lactone, trans-oak lactone and eugenol have not been included in FIG. 3. Data has been normalized to that of the control barrel whisky sample (T5V13) for comparative purposes. The complete raw and normalized data can be found in Tables 4 and 5.

TABLE 4

Oak volatiles raw data

| Sample description | Units | T5V1 | T5V2 | T5V3 | T5V4 | T5V12 | T5V13 |
|---|---|---|---|---|---|---|---|
| 4-Ethyl-guaiacol | µg/L | 28 | 28 | 30 | 29 | 28 | 28 |
| 4-Ethyl-phenol | µg/L | 18 | 16 | 17 | 15 | 14 | <10 |
| 4-Methyl-guaiacol | µg/L | 16 | 15 | 18 | 16 | 14 | 15 |
| 5-Methyl-furfural | µg/L | 1126 | 984 | 1311 | 1367 | 1013 | 1334 |
| Cis-Oak Lactone | µg/L | 1039 | 1180 | 1116 | 1373 | 1379 | 127 |
| Eugenol | µg/L | 124 | 76 | 104 | 84 | 65 | 23 |
| Furfural | µg/L | 8161 | 6694 | 9568 | 9642 | 6804 | 7645 |
| Guaiacol | µg/L | 42 | 41 | 51 | 51 | 39 | 47 |
| Trans-Oak Lactone | µg/L | 146 | 129 | 79 | 217 | 122 | 21 |
| Vanillin | µg/L | 1352 | 989 | 1493 | 1197 | 1103 | 459 |

TABLE 5

Oak volatiles normalized data. Values shown as a percentage.

| Sample description | Units | T5V1 | T5V2 | T5V3 | T5V4 | T5V12 | T5V13 |
|---|---|---|---|---|---|---|---|
| 4-Ethyl-guaiacol | µg/L | 100.00 | 100.00 | 107.14 | 103.57 | 100.00 | 100.00 |
| 4-Ethyl-phenol | µg/L | N/A | N/A | N/A | N/A | N/A | N/A |
| 4-Methyl-guaiacol | µg/L | 106.67 | 100.00 | 120.00 | 106.67 | 93.33 | 100.00 |
| 5-Methyl-furfural | µg/L | 84.41 | 73.76 | 98.28 | 102.47 | 75.94 | 100.00 |
| Cis-Oak Lactone | µg/L | 818.11 | 929.13 | 878.74 | 1081.10 | 1085.83 | 100.00 |
| Eugenol | µg/L | 539.13 | 330.43 | 452.17 | 365.22 | 282.61 | 100.00 |
| Furfural | µg/L | 106.75 | 87.56 | 125.15 | 126.12 | 89.00 | 100.00 |
| Guaiacol | µg/L | 89.36 | 87.23 | 108.51 | 108.51 | 82.98 | 100.00 |
| Trans-Oak Lactone | µg/L | 695.24 | 614.29 | 376.19 | 1033.33 | 580.95 | 100.00 |
| Vanillin | µg/L | 294.55 | 215.47 | 325.27 | 260.78 | 240.31 | 100.00 |

Some of the oak flavour compounds including cis-oak lactone, eugenol, trans-oak lactone and vanillin were significantly higher in all variant barrel whisky samples comparative to the control barrel whisky sample, with variant barrel whisky samples showing between 2-to-10-fold concentration differences. However, the remaining oak volatiles including 4-ethylguaiacol, 4-methylguaiacol, 5-methylfurfural, furfural and guaiacol, were relatively consistent in the variant barrel whisky samples comparative to the control barrel whisky sample.

Typical Wine Volatiles

Typical wine volatiles analysis (flavour and aroma) of the spirit samples are presented in FIGS. 4 to 7. Data has been normalized to that of the control barrel whisky sample (T5V13) for comparative purposes. The complete raw and normalized data can be found in Tables 6-9.

TABLE 6

Typical wine volatiles raw data

| Sample description | Units | T5V1 | T5V2 | T5V3 | T5V4 | T5V12 | T5V13 |
|---|---|---|---|---|---|---|---|
| alpha-terpineol | µg/L | 11 | <10 | 13 | 10 | 12 | 11 |
| beta-ionone | µg/L | <10 | <10 | <10 | <10 | <10 | <10 |
| Damascenone | µg/L | 61 | 60 | 64 | 59 | 59 | 55 |
| Ethyl decanoate | µg/L | 1602 | 1452 | 1769 | 1545 | 1490 | 1583 |
| Ethyl hexanoate | µg/L | 255 | 212 | 273 | 231 | 235 | 259 |
| Ethyl octanoate | µg/L | 793 | 723 | 810 | 741 | 757 | 935 |
| Geraniol | µg/L | <10 | <10 | <10 | <10 | <10 | <10 |
| Linalool | µg/L | 33 | 30 | 38 | 31 | 34 | 30 |
| Naphthalene | µg/L | <5 | <5 | <5 | 6 | <5 | <5 |
| Nerol | µg/L | <10 | <10 | <10 | <10 | <10 | <10 |
| Rose oxide | µg/L | <10 | <10 | <10 | <10 | <10 | <10 |
| TDN | µg/L | <10 | <10 | <10 | <10 | <10 | <10 |

TABLE 7

Typical wine volatiles raw data.

| Sample description | Units | T5V8 | T5V9 | T5V11 | T5V13 |
|---|---|---|---|---|---|
| alpha-terpineol | µg/L | <10 | <10 | <10 | <10 |
| beta-ionone | µg/L | <10 | <10 | <10 | <10 |
| Damascenone | µg/L | 230 | 244 | 233 | 274 |
| Ethyl decanoate | µg/L | 5842 | 6073 | 4533 | 7301 |
| Ethyl hexanoate | µg/L | 997 | 905 | 841 | 1126 |
| Ethyl octanoate | µg/L | 3266 | 3259 | 2748 | 4160 |
| Geraniol | µg/L | <10 | <10 | <10 | <10 |
| Linalool | µg/L | 116 | 119 | 87 | 132 |
| Naphthalene | µg/L | <5 | <5 | <5 | <5 |
| Nerol | µg/L | <10 | <10 | <10 | <10 |
| Rose oxide | µg/L | <10 | <10 | <10 | <10 |
| TDN | µg/L | <10 | <10 | <10 | <10 |

TABLE 8

Typical wine volatiles normalized data. Values shown as a percentage.

| Sample description | Units | T5V1 | T5V2 | T5V3 | T5V4 | T5V12 | T5V13 |
|---|---|---|---|---|---|---|---|
| alpha-terpineol | µg/L | 100.00 | N/A | 118.18 | 90.91 | 109.09 | 100.00 |
| beta-ionone | µg/L | N/A | N/A | N/A | N/A | N/A | N/A |
| Damascenone | µg/L | 110.91 | 109.09 | 116.36 | 107.27 | 107.27 | 100.00 |
| Ethyl decanoate | µg/L | 101.20 | 91.72 | 1111.75 | 97.60 | 94.13 | 100.00 |
| Ethyl hexanoate | µg/L | 98.46 | 81.85 | 105.41 | 89.19 | 90.73 | 100.00 |
| Ethyl octanoate | µg/L | 84.81 | 77.33 | 86.63 | 79.25 | 80.96 | 100.00 |
| Geraniol | µg/L | N/A | N/A | N/A | N/A | N/A | N/A |
| Linalool | µg/L | 110.00 | 100.00 | 126.67 | 103.33 | 113.33 | 100.00 |
| Naphthalene | µg/L | N/A | N/A | N/A | N/A | N/A | N/A |
| Nerol | µg/L | N/A | N/A | N/A | N/A | N/A | N/A |
| Rose oxide | µg/L | N/A | N/A | N/A | N/A | N/A | N/A |
| TDN | µg/L | N/A | N/A | N/A | N/A | N/A | N/A |

TABLE 9

Typical wine volatiles normalized data. Values shown as a percentage.

| Sample description | Units | T5V8 | T5V9 | T5V11 | T5V13 |
|---|---|---|---|---|---|
| alpha-terpineol | µg/L | N/A | N/A | N/A | 100.00 |
| beta-ionone | µg/L | N/A | N/A | N/A | N/A |
| Damascenone | µg/L | 83.90 | 89.10 | 85.00 | 100.00 |
| Ethyl decanoate | µg/L | 80.00 | 83.20 | 62.10 | 100.00 |
| Ethyl hexanoate | µg/L | 88.50 | 80.40 | 74.70 | 100.00 |
| Ethyl octanoate | µg/L | 78.50 | 78.30 | 66.10 | 100.00 |
| Geraniol | µg/L | N/A | N/A | N/A | N/A |
| Linalool | µg/L | 87.90 | 90.20 | 65.90 | 100.00 |
| Naphthalene | µg/L | N/A | N/A | N/A | N/A |
| Nerol | µg/L | N/A | N/A | N/A | N/A |
| Rose oxide | µg/L | N/A | N/A | N/A | N/A |
| TDN | µg/L | N/A | N/A | N/A | N/A |

With the exception of alpha terpineol (barrel variant whisky sample T5V2), ethyl octanoate (barrel variant whisky samples T5V2 and T5V11), ethyl decanoate (barrel variant whisky sample T5V11) and linalool (barrel variant whisky sample T5V11), all compounds in the variant barrel whisky samples were within ±30% concentration of the control barrel whisky sample. Overall there is a reasonable level of consistency in wine volatiles achieved for the variant barrel whisky samples, with profiles showing a degree of representation of that within the control barrel whisky sample.

Figure 4:
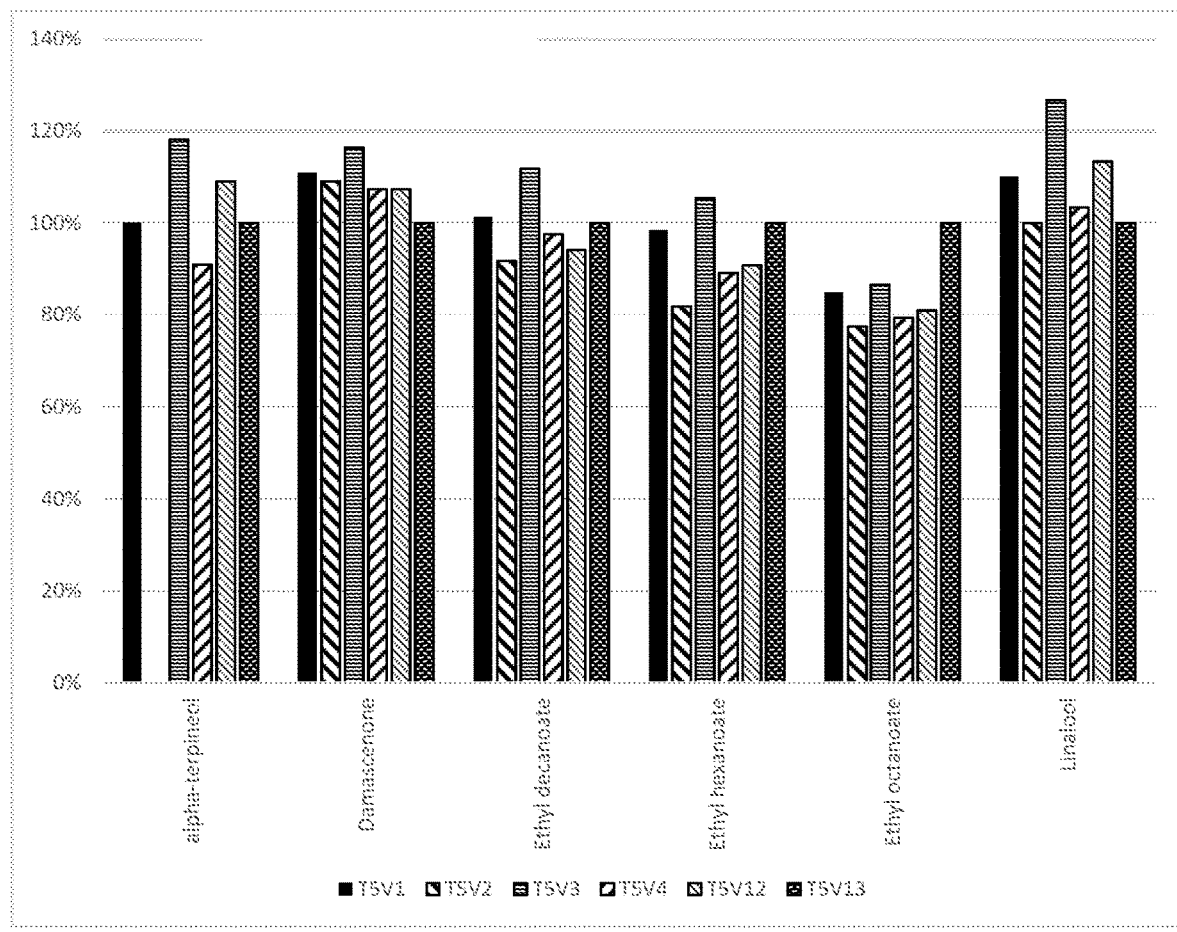
FIG. 4 shows the normalised results of the wine volatiles analysis for T5V1, T5V2, T5V3, T5V4, T5V12 and T5V13.
Figure 5:
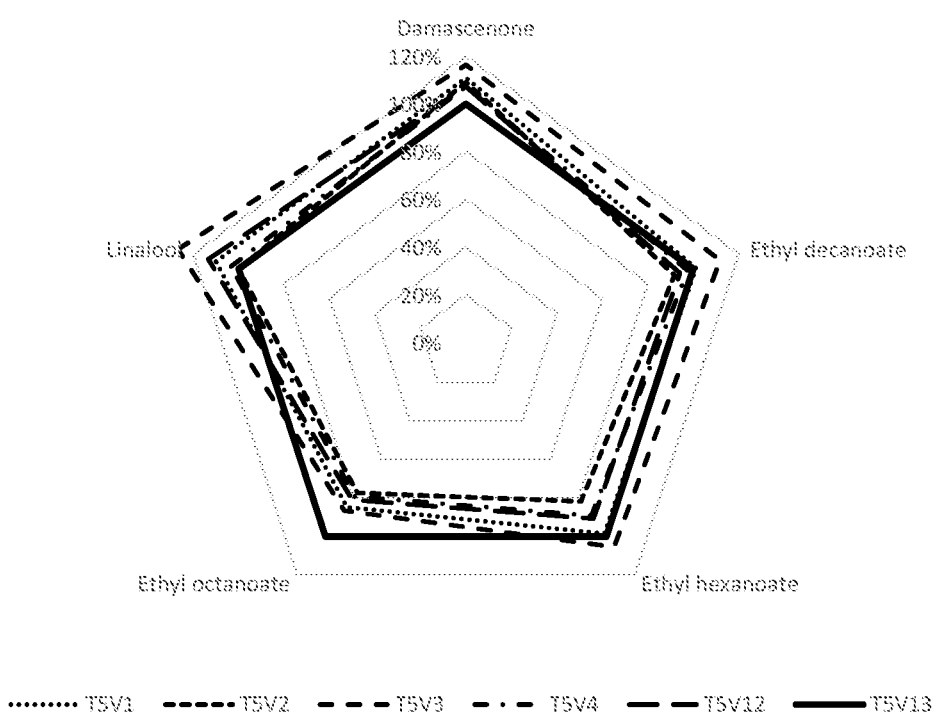
FIG. 5 shows a spider graph of the normalised results of the wine volatiles analysis for T5V1, T5V2, T5V3, T5V4, T5V12 and T5V13.
Figure 6:
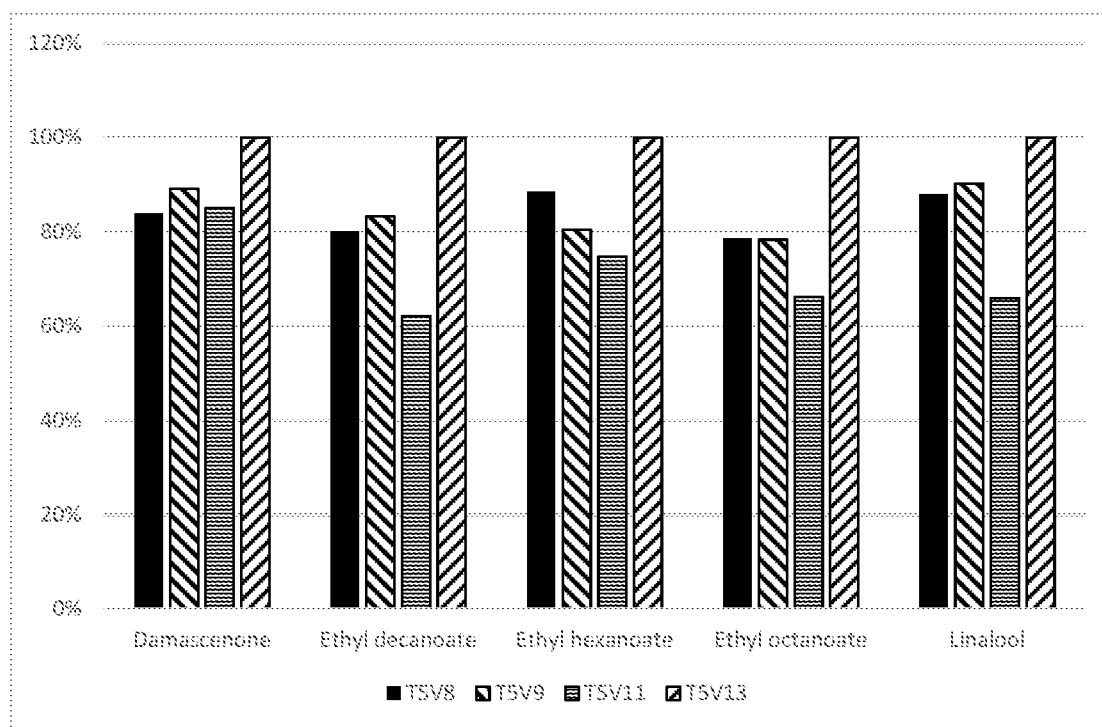
FIG. 6 shows the normalised results of the wine volatiles analysis for T5V8, T5V9, T5V11 and T5V13.
Figure 7:
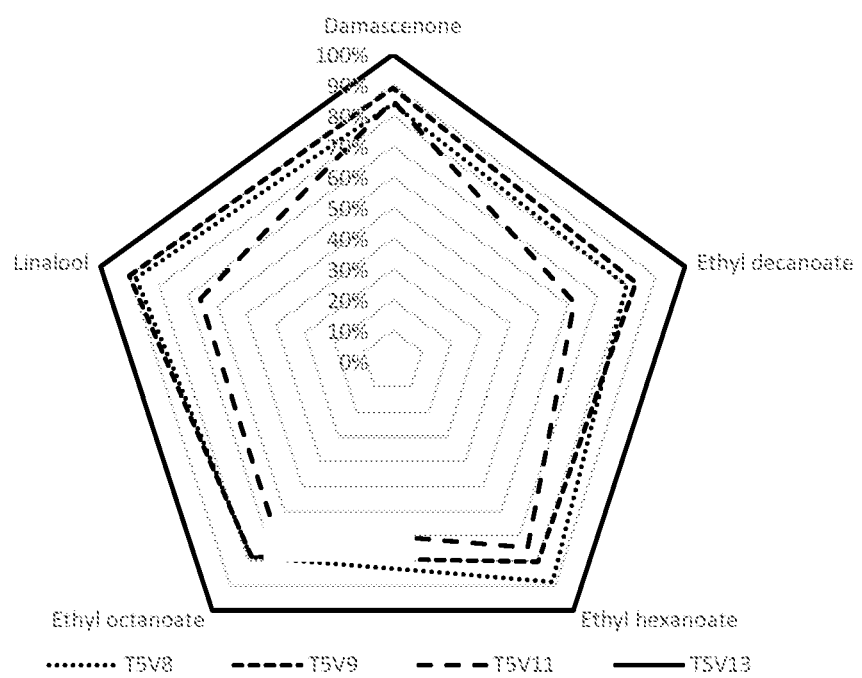
FIG. 7 shows a spider graph of the normalised results of the wine volatiles analysis for T5V8, T5V9, T5V11 and T5V13.

Alpha-terpineol is not shown in FIG. 4 for T5V2 as the concentration in this sample fell below the LOQ (<10 µg/L). Comparatively, the concentration of alpha-terpineol in the control was 11 µg/L and thus the discrepancy as shown through normalization is not as pronounced as that displayed within FIG. 4.

Fermentation-Derived Wine Volatiles

Figure 8:
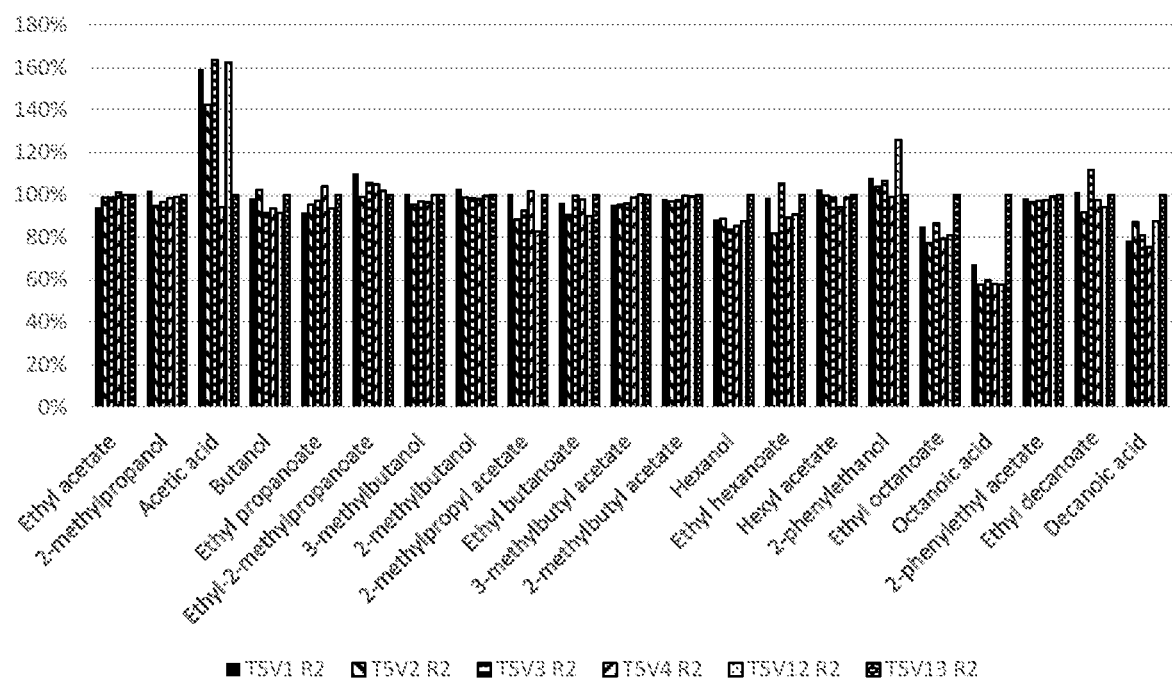
FIG. 8 shows the normalised results of the fermentation derived wine volatiles analysis for T5V1, T5V2, T5V3, T5V4, T5V12 and T5V13.
Figure 9:
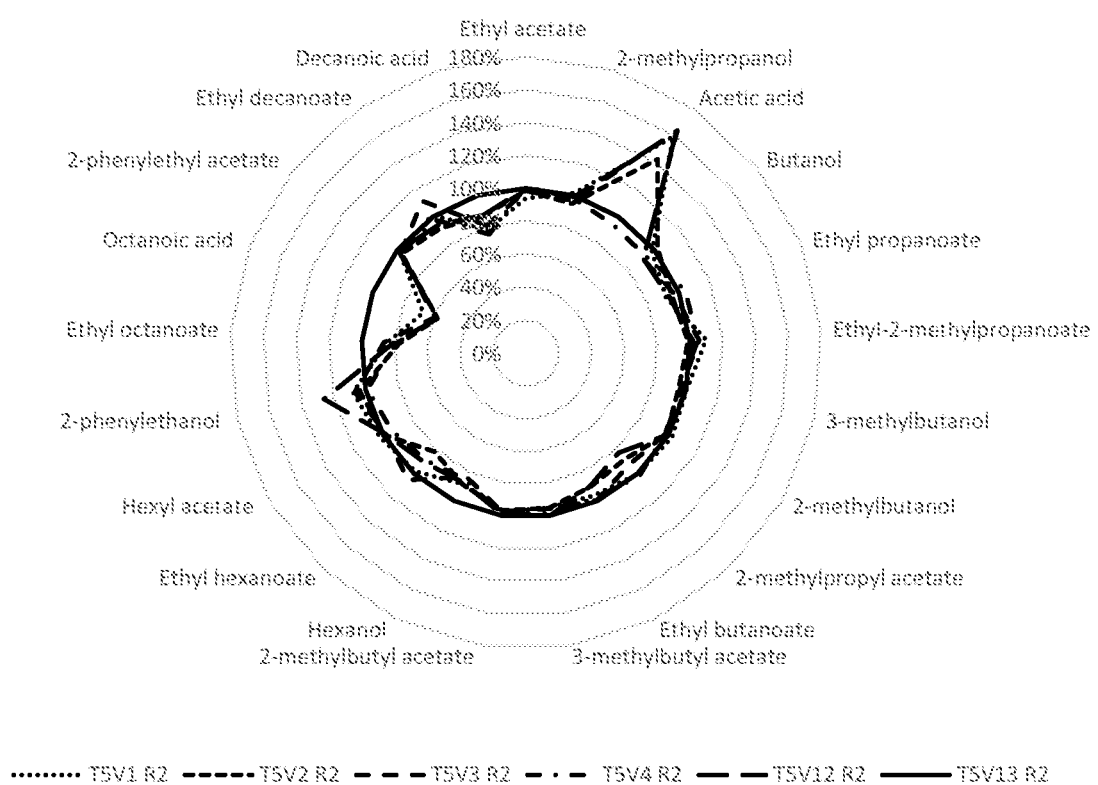
FIG. 9 shows a spider graph of the normalised results of the wine volatiles analysis for T5V1, T5V2, T5V3, T5V4, T5V12 and T5V13.
Figure 10:
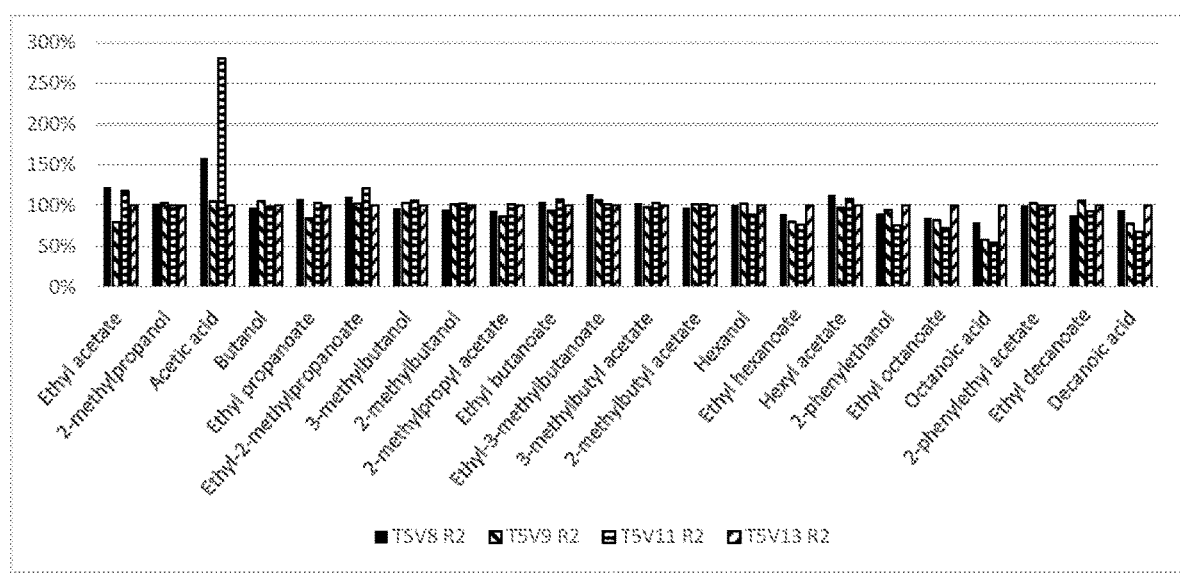
FIG. 10 shows the normalised results of the fermentation derived wine volatiles analysis for T5V8, T5V9, T5V11 and T5V13.

Results from the analysis of the fermentation derived wine volatiles in the whisky samples are presented in FIGS. 8 to 10. Data has been normalized to that of the control barrel whisky sample (T5V13) for comparative purposes. The complete raw and normalized data can be found in Tables 10 to 13.

TABLE 10

| Fermentation derived wine volatiles raw data | | | | | | | | |
|---|---|---|---|---|---|---|---|---|
| Sample Name | Units | T5V1 R2 | T5V2 R2 | T5V3 R2 | T5V4 R2 | T5V12 R2 | T5V13 R2 | LOQ |
| Ethyl acetate | µg/L | 48804 | 51239 | 51173 | 52500 | 51846 | 51934 | 60.3 |
| 2-methylpropanol | µg/L | 770644 | 718077 | 731784 | 744664 | 750220 | 757201 | 937 |
| Acetic acid | µg/L | 233651 | 209326 | 240206 | 138377 | 238604 | 146860 | 2978 |
| Butanol | µg/L | 10767 | 11228 | 10011 | 10267 | 10027 | 10964 | 219 |
| Ethyl propanoate | µg/L | 233 | 242 | 247 | 264 | 238 | 254 | 6.82 |
| Ethyl-2-methylpropanoate | µg/L | 202 | 182 | 194 | 193 | 187 | 184 | 6.66 |
| 3-methylbutanol | µg/L | 1352864 | 1286311 | 1305555 | 1300509 | 1345993 | 1348028 | 213 |
| 2-methylbutanol | µg/L | 667018 | 641041 | 638757 | 636573 | 646512 | 649896 | 312 |
| Propanoic acid | µg/L | <LOQ | <LOQ | <LOQ | <LOQ | <LOQ | <LOQ | 469 |
| 2-methylpropyl acetate | µg/L | 1428 | 1257 | 1317 | 1448 | 1179 | 1424 | 13.0 |
| Ethyl butanoate | µg/L | 337 | 317 | 349 | 343 | 316 | 351 | 10.9 |
| 2-methylpropanoic acid | µg/L | <LOQ | <LOQ | <LOQ | <LOQ | <LOQ | <LOQ | 2054 |
| Ethyl-2-methylbutanoate | µg/L | <LOQ | <LOQ | <LOQ | <LOQ | <LOQ | <LOQ | 7.36 |
| Ethyl-3-methylbutanoate | µg/L | <LOQ | <LOQ | <LOQ | <LOQ | <LOQ | <LOQ | 2.76 |
| Butanoic acid | µg/L | <LOQ | <LOQ | <LOQ | <LOQ | <LOQ | <LOQ | 903 |
| 3-methylbutyl acetate | µg/L | 8558 | 8582 | 8626 | 8878 | 9006 | 9002 | 6.10 |
| 2-methylbutyl acetate | µg/L | 1894 | 1872 | 1884 | 1923 | 1914 | 1931 | 7.16 |
| Hexanol | µg/L | 2629 | 2640 | 2488 | 2537 | 2605 | 2976 | 84.1 |
| 3-methylbutanoic acid | µg/L | <LOQ | <LOQ | <LOQ | <LOQ | <LOQ | <LOQ | 206 |
| 2-methylbutanoic acid | µg/L | <LOQ | <LOQ | <LOQ | <LOQ | <LOQ | <LOQ | 175 |
| Ethyl hexanoate | µg/L | 318 | 316 | 317 | 319 | 327 | 407 | 0.190 |
| Hexyl acetate | µg/L | 125 | 122 | 120 | 115 | 120 | 122 | 0.698 |
| Hexanoic acid | µg/L | <LOQ | <LOQ | <LOQ | <LOQ | <LOQ | <LOQ | 150 |
| 2-phenylethanol | µg/L | 18602 | 17903 | 18405 | 17070 | 21736 | 17259 | 72.3 |
| Ethyl octanoate | µg/L | 1170 | 1160 | 1185 | 1185 | 1249 | 1727 | 0.317 |
| Octanoic acid | µg/L | 2956 | 2542 | 2625 | 2554 | 2538 | 4402 | 69.8 |
| 2-phenylethyl acetate | µg/L | 5439 | 5357 | 5396 | 5402 | 5499 | 5545 | 2.92 |
| Ethyl decanoate | µg/L | 2519 | 2460 | 2782 | 2757 | 2872 | 3221 | 0.683 |
| Decanoic acid | µg/L | 6278 | 6978 | 6481 | 6037 | 7017 | 8011 | 11.2 |

TABLE 11

| Fermentation derived wine volatiles normalized data. Values shown as a percentage. | | | | | | | | |
|---|---|---|---|---|---|---|---|---|
| Sample Name | Units | T5V1 R2 | T5V2 R2 | T5V3 R2 | T5V4 R2 | T5V12 R2 | T5V13 R2 | LOQ |
| Ethyl acetate | µg/L | 93.97 | 98.66 | 98.53 | 101.09 | 99.83% | 100.00 | 60.3 |
| 2-methylpropanol | µg/L | 101.78 | 94.83 | 96.64 | 98.34 | 99.08 | 100.00 | 937 |
| Acetic acid | µg/L | 159.10 | 142.53 | 163.56 | 94.22 | 162.47 | 100.00 | 2978 |
| Butanol | µg/L | 98.20 | 102.42 | 91.31 | 93.64 | 91.46 | 100.00 | 219 |
| Ethyl propanoate | µg/L | 91.67 | 95.33 | 97.19 | 104.00 | 93.56 | 100.00 | 6.82 |
| Ethyl-2-methylpropanoate | µg/L | 110.01 | 98.94 | 105.70 | 104.88 | 101.88 | 100.00 | 6.66 |
| 3-methylbutanol | µg/L | 100.36 | 95.42 | 96.85 | 96.47 | 99.85 | 100.00 | 213 |
| 2-methylbutanol | µg/L | 102.63 | 98.64 | 98.29 | 97.95 | 99.48 | 100.00 | 312 |
| Propanoic acid | µg/L | <LOQ | <LOQ | <LOQ | <LOQ | <LOQ | <LOQ | 469 |
| 2-methylpropyl acetate | µg/L | 100.28 | 88.28 | 92.51 | 101.68 | 82.82 | 100.00 | 13.0 |
| Ethyl butanoate | µg/L | 96.13 | 90.41 | 99.55 | 97.87 | 90.02 | 100.00 | 10.9 |
| 2-methylpropanoic acid | µg/L | <LOQ | <LOQ | <LOQ | <LOQ | <LOQ | <LOQ | 2054 |
| Ethyl-2-methylbutanoate | µg/L | <LOQ | <LOQ | <LOQ | <LOQ | <LOQ | <LOQ | 7.36 |
| Ethyl-3-methylbutanoate | µg/L | <LOQ | <LOQ | <LOQ | <LOQ | <LOQ | <LOQ | 2.76 |
| Butanoic acid | µg/L | <LOQ | <LOQ | <LOQ | <LOQ | <LOQ | <LOQ | 903 |
| 3-methylbutyl acetate | µg/L | 95.07 | 95.33 | 95.82 | 98.63 | 100.05 | 100.00 | 6.10 |
| 2-methylbutyl acetate | µg/L | 98.04 | 96.90 | 97.57 | 99.56 | 99.12 | 100.00 | 7.16 |
| Hexanol | µg/L | 88.35 | 88.70 | 83.58 | 85.24 | 87.51 | 100.00 | 84.1 |
| 3-methylbutanoic acid | µg/L | <LOQ | <LOQ | <LOQ | <LOQ | <LOQ | <LOQ | 206 |
| 2-methylbutanoic acid | µg/L | <LOQ | <LOQ | <LOQ | <LOQ | <LOQ | <LOQ | 175 |
| Hexyl acetate | µg/L | 102.44 | 99.52 | 98.55 | 94.11 | 98.55 | 100.00 | 0.698 |
| Hexanoic acid | µg/L | <LOQ | <LOQ | <LOQ | <LOQ | <LOQ | <LOQ | 150 |
| 2-phenylethanol | µg/L | 107.78 | 103.73 | 106.64 | 98.91 | 125.94 | 100.00 | 72.3 |
| Octanoic acid | µg/L | 67.16 | 57.74 | 59.63 | 58.01 | 57.65 | 100.00 | 69.8 |
| 2-phenylethyl acetate | µg/L | 98.09 | 96.61 | 97.30 | 97.42 | 99.17 | 100.00 | 2.92 |
| Decanoic acid | µg/L | 78.37 | 87.11 | 80.90 | 75.36 | 87.59 | 100.00 | 11.2 |

TABLE 12

Fermentation derived wine volatiles raw data

| Sample Name | Units | T5V8 R2 | T5V9 R2 | T5V11 R2 | T5V13 R2 | LOQ |
|---|---|---|---|---|---|---|
| Ethyl acetate | μg/L | 59923 | 38962 | 57841 | 49131 | 29.6 |
| 2-methylpropanol | μg/L | 745935 | 753525 | 732510 | 732976 | 430 |
| Acetic acid | μg/L | 191617 | 127423 | 340758 | 121579 | 2258 |
| Butanol | μg/L | 10048 | 10902 | 10217 | 10352 | 211 |
| Ethyl propanoate | μg/L | 277 | 218 | 267 | 258 | 6.89 |
| Ethyl-2-methylpropanoate | μg/L | 215 | 199 | 235 | 195 | 6.59 |
| 3-methylbutanol | μg/L | 1190770 | 1281911 | 1317698 | 1242508 | 846 |
| 2-methylbutanol | μg/L | 539474 | 578132 | 581955 | 567716 | 366 |
| Propanoic acid | μg/L | <LOQ | <LOQ | <LOQ | <LOQ | 475 |
| 2-methylpropyl acetate | μg/L | 1013 | 939 | 1110 | 1091 | 12.6 |
| Ethyl butanoate | μg/L | 346 | 313 | 357 | 333 | 11.8 |
| 2-methylpropanoic acid | μg/L | <LOQ | <LOQ | <LOQ | <LOQ | 990 |
| Ethyl-2-methylbutanoate | μg/L | <LOQ | <LOQ | <LOQ | <LOQ | 14.3 |
| Ethyl-3-methylbutanoate | μg/L | 48.6 | 45.5 | 43.6 | 42.8 | 1.44 |
| Butanoic acid | μg/L | <LOQ | <LOQ | <LOQ | <LOQ | 207 |
| 3-methylbutyl acetate | μg/L | 8771 | 8356 | 8784 | 8533 | 2.29 |
| 2-methylbutyl acetate | μg/L | 1817 | 1909 | 1908 | 1882 | 5.73 |
| Hexanol | μg/L | 2669 | 2714 | 2344 | 2654 | 91.7 |
| 3-methylbutanoic acid | μg/L | <LOQ | <LOQ | <LOQ | <LOQ | 212 |
| 2-methylbutanoic acid | μg/L | <LOQ | <LOQ | <LOQ | <LOQ | 181 |
| Ethyl hexanoate | μg/L | 334 | 300 | 287 | 375 | 0.729 |
| Hexyl acetate | μg/L | 116 | 100 | 111 | 103 | 1.59 |
| Hexanoic acid | μg/L | <LOQ | <LOQ | <LOQ | <LOQ | 74.6 |
| 2-phenylethanol | μg/L | 16609 | 17464 | 13974 | 18484 | 143 |
| Ethyl octanoate | μg/L | 1474 | 1429 | 1263 | 1746 | 0.323 |
| Octanoic acid | μg/L | 3836 | 2822 | 2661 | 4884 | 95.4 |
| 2-phenylethyl acetate | μg/L | 5120 | 5261 | 5136 | 5126 | 16.2 |
| Ethyl decanoate | μg/L | 2822 | 3395 | 2995 | 3214 | 0.742 |
| Decanoic acid | μg/L | 7923 | 6538 | 5724 | 8430 | 66.2 |

TABLE 13

Fermentation derived wine volatiles normalized data. Values shown as a percentage.

| Sample Name | Units | T5V8 R2 | T5V9 R2 | T5V11 R2 | T5V13 R2 | LOQ |
|---|---|---|---|---|---|---|
| Ethyl acetate | μg/L | 122 | 79.3 | 117.7 | 100.00 | 29.6 |
| 2-methylpropanol | μg/L | 101.8 | 102.8 | 99.9 | 100.00 | 430 |
| Acetic acid | μg/L | 157.6 | 104.8 | 280.3 | 100.00 | 2258 |
| Butanol | μg/L | 97.1 | 105.3 | 98.7 | 100.00 | 211 |
| Ethyl propanoate | μg/L | 107.3 | 84.4 | 103.2 | 100.00 | 6.89 |
| Ethyl-2-methylpropanoate | μg/L | 110.2 | 102.2 | 120.7 | 100.00 | 6.59 |
| 3-methylbutanol | μg/L | 95.8 | 103.2 | 106.1 | 100.00 | 846 |
| 2-methylbutanol | μg/L | 95 | 101.8 | 102.5 | 100.00 | 366 |
| Propanoic acid | μg/L | <LOQ | <LOQ | <LOQ | <LOQ | 475 |
| 2-methylpropyl acetate | μg/L | 92.9 | 86.1 | 101.8 | 100.00 | 12.6 |
| Ethyl butanoate | μg/L | 103.8 | 93.8 | 107.2 | 100.00 | 11.8 |
| 2-methylpropanoic acid | μg/L | <LOQ | <LOQ | <LOQ | <LOQ | 990 |
| Ethyl-2-methylbutanoate | μg/L | <LOQ | <LOQ | <LOQ | <LOQ | 14.3 |
| Ethyl-3-methylbutanoate | μg/L | 113.5 | 106.4 | 101.8 | 100.00 | 1.44 |
| Butanoic acid | μg/L | <LOQ | <LOQ | <LOQ | <LOQ | 207 |
| 3-methylbutyl acetate | μg/L | 102.8 | 97.9 | 102.9 | 100.00 | 2.29 |
| 2-methylbutyl acetate | μg/L | 96.5 | 101.4 | 101.4 | 100.00 | 5.73 |
| Hexanol | μg/L | 100.6 | 102.3 | 88.3 | 100.00 | 91.7 |
| 3-methylbutanoic acid | μg/L | <LOQ | <LOQ | <LOQ | <LOQ | 212 |
| 2-methylbutanoic acid | μg/L | <LOQ | <LOQ | <LOQ | <LOQ | 181 |
| Ethyl hexanoate | μg/L | 88.9 | 79.8 | 76.3 | 100.00 | 0.729 |
| Hexyl acetate | μg/L | 112.3 | 97.4 | 107.8 | 100.00 | 1.59 |
| Hexanoic acid | μg/L | <LOQ | <LOQ | <LOQ | <LOQ | 74.6 |
| 2-phenylethanol | μg/L | 89.9 | 94.5 | 75.6 | 100.00 | 143 |
| Ethyl octanoate | μg/L | 84.5 | 81.8 | 72.3 | 100.00 | 0.323 |
| Octanoic acid | μg/L | 78.6 | 57.8 | 54.5 | 100.00 | 95.4 |
| 2-phenylethyl acetate | μg/L | 99.9 | 102.6 | 100.2 | 100.00 | 16.2 |
| Ethyl decanoate | μg/L | 87.8 | 105.6 | 93.2 | 100.00 | 0.742 |
| Decanoic acid | μg/L | 94.0 | 77.6 | 67.9 | 100.00 | 66.2 |

With the exception of acetic acid, octanoic acid and decanoic acid, all of the fermentation derived wine volatiles in the barrel variant whisky samples were within a ±30% concentration of the control barrel whisky sample. All variant whisky samples, besides T5V9 and T5V12 showed a >40% concentration increase of acetic acid comparative to the control barrel whisky sample. Additionally, all barrel variant whisky samples displayed a >30% decrease in concentration of octanoic acid comparative to the control barrel whisky sample.

Overall, the wine volatiles of all barrel variant whisky samples (both flavour/aroma and fermentation derived) are within a reasonable framework of the control barrel whisky sample.

Colorimetric Analysis

Figure 11:
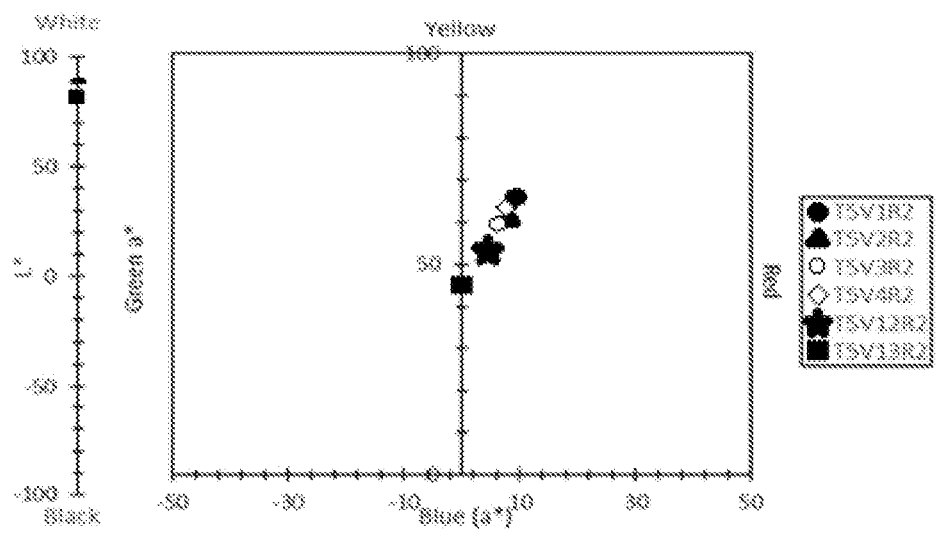
FIG. 11 shows the spatial map of the spirit sample colorimetric analysis.

A graphic of the colorimetric analysis of the new make whisky samples is presented in FIG. 11. The graphical representation (spatial map) is generated based on L*, a* and b* coordinates, which are defined by the samples clarity (black/white), red/green and yellow/blue colour components respectively. The coordinate data as well as the difference from control data is displayed in Table 14.

TABLE 14

CIELAb coordinates and calculated difference from control based on colorimetic outputs.

| Description | Symbol | T5V1 | T5V2 | T5V3 | T5V4 | T5V12 | T5V13 |
|---|---|---|---|---|---|---|---|
| Clarity | L* | 79.7 | 81.0 | 82.9 | 81.8 | 84.6 | 88.9 |
| Red/green colour component | a* | 9.65 | 8.15 | 6.81 | 7.92 | 4.7 | 0.47 |
| Yellow/blue colour component | b* | 65.41 | 60.93 | 59.72 | 63.19 | 53.31 | 45.02 |

TABLE 14-continued

CIELAb coordinates and calculated difference from control based on colorimetic outputs.

| Description | Symbol | T5V1 | T5V2 | T5V3 | T5V4 | T5V12 | T5V13 |
|---|---|---|---|---|---|---|---|
| Chroma | C* | 66.12 | 61.47 | 60.11 | 63.69 | 53.52 | 45.02 |
| Overall colorimetric difference from control (T5V13) | ΔE* | 24.19 | 19.34 | 17.12 | 20.88 | 10.27 | 0.00 |
| Difference of tone from control (T5V13) | ΔH* | 7.42 | 6.44 | 5.36 | 6.11 | 3.81 | 0.00 |

Based on the CIELab data presented above, variant barrel whisky sample T5V12 is colorimetrically closest to the control barrel whisky sample (T5V13), however based on tone differences (ΔH*) and overall colorimetric differences (ΔE*), these whisky samples are substantially similar. Variant barrel whisky samples T5V1-T5V4 show a similar degree of colour to each other with a degree of clustering as seen in FIG. 11. A person skilled in the art would understand that similar degrees of colour is desirable but not essential.

Example 2

A second set of trials was conducted covering various ex-fortified barrel variants.

Set-Up

A selection of barrel variants were prepared according to the present disclosure. A selection of barrel variant samples were subjected to chemical analysis, including for oak volatiles, aroma, wine volatiles and fermentation derived wine volatiles, and also colorimetric analysis.

The control barrel was T6V21 (uncharred) and T6V22 (charred). The barrel variants are outlined in Tables 15 and 16.

TABLE 15

Barrel variants prepared according to the present disclosure

| Barrel ID | Source | Oak | Addition | Type | Shave | Bend | Toast | Charring Time (Sec) |
|---|---|---|---|---|---|---|---|---|
| T6V10 | Single Fill Bourbon | American | Premium Apera Seppeltsfeld | 100 L | Yes | Fire | Yes | 30 |
| T6V11 | Single Fill Bourbon | American | Premium Apera Seppeltsfeld | 100 L | Yes | Fire | Yes | 30 |
| T6V12 | Single Fill Bourbon | American | Premium Apera Seppeltsfeld | 100 L | Yes | Fire | Yes | 30 |
| T6V20 | Single Fill Bourbon | American | Premium Apera Seppeltsfeld | 100 L | Yes | Fire | Yes | 30 |
| T6V21 | Old Apera Ex Seppelsfield (Control, uncharred) | | | Stave Sample | | | | |
| T6V22 | Old Apera Ex Seppelsfield (Control, charred) | | | 100 L | Yes | Yes | Yes | 30 |

TABLE 16

Barrel variants prepared according to the present disclosure (continued)

| Barrel ID | Pre Apera Temp. | Apera Application (AA) 1 | Pressure (P) 1 | AA 2 | Low Fire 1/ min | AA 3 | P2 | AA 4 | Low Fire 2 min | AA 5 | P3 | AA 6 | Total Apara | ML Applied |
|---|---|---|---|---|---|---|---|---|---|---|---|---|---|---|
| T6V10 | 160° C. Internal | Yes | 20 PSI/ 40 Min | | | | | | | | | | 1 | 500 |
| T6V11 | 160° C. Internal | Yes | 20 PSI/ 10 Min | Yes | | | | | | | | | 2 | 1000 |

TABLE 16-continued

Barrel variants prepared according to the present disclosure (continued)

| Barrel ID | Pre Apera Temp. | Apera Application (AA) 1 | Pressure (P) 1 | AA 2 | Low Fire 1/ min | AA 3 | P2 | AA 4 | Low Fire 2 min | AA 5 | P3 | AA 6 | Total Apara | ML Applied |
|---|---|---|---|---|---|---|---|---|---|---|---|---|---|---|
| T6V12 | 160° C. Internal | Yes | 20 PSI/ 10 Min | Yes | 10 | Yes | 20 PSI/ 10 Min | Yes | | | | | 4 | 2000 |
| T6V20 | 160° C. Internal | Yes | 20 PSI/ 10 Min | Yes | 10 | Yes | | | 10 | Yes | | | 4 | 2000 |
| T6V21 | | | | | | | | | | | | | | |
| T6V22 (Control) | 160° C. Internal | | | | | | | | | | | | | |

In Table 16, "Low Fire" refers to placing a barrel over a heat source for the indicated time.

A series of stave samples, taken 0-12 mm deep from the internal stave surface of each barrel variant were soaked in 500 ml of new make whisky spirit at 60% ABV for 14 days; representing a 3×100% new oak equivalent concentration. Two replicates of each barrel variant were set up to assess repeatability. Once the soak was completed, samples were taken for analysis.

Chemical Analysis

In line with the studies undertaken in Example 1, chemical analysis was performed on the samples produced from the use of the barrel variants.

Oak Volatiles

Figure 12:
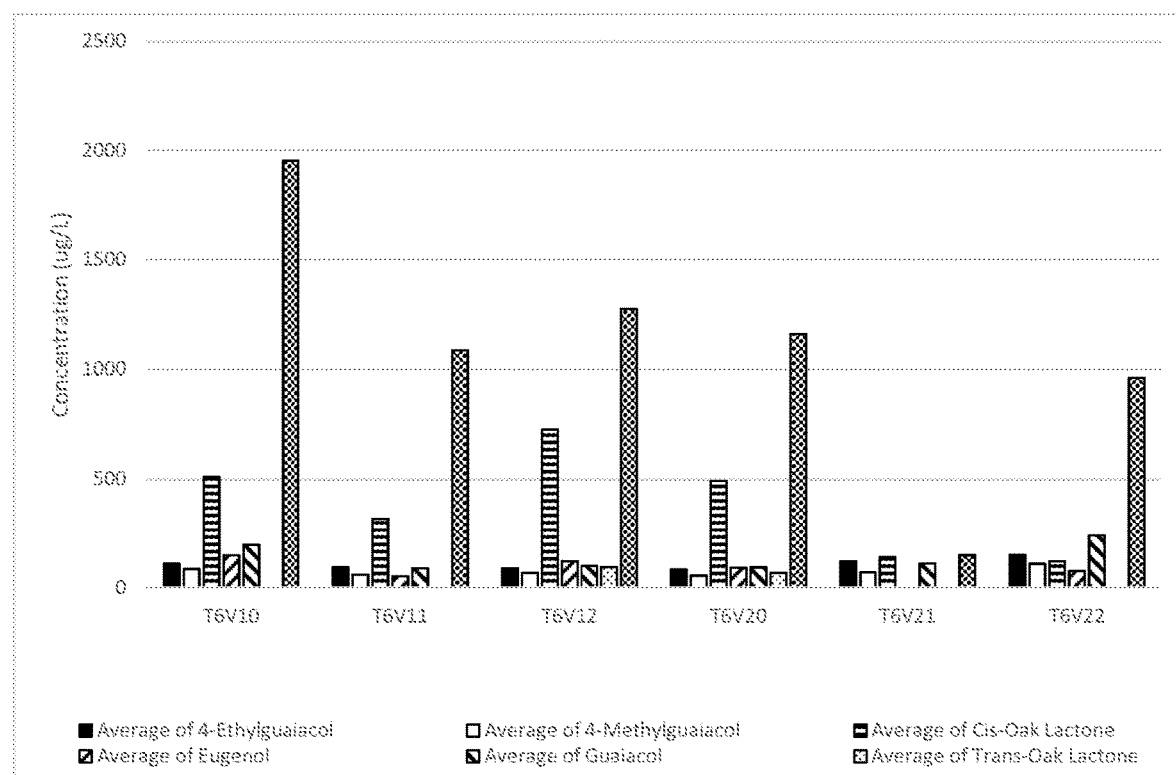
FIG. 12 shows the results of an oak analysis for a process trial.

Oak flavour analysis was conducted using gas chromatography/mass spectrometry (GC-MS) and deuterium-labelled standards to determine the concentrations of the following compounds in a selection of the barrel variant whisky samples:

4-Ethylguaiacol
4-Methylguaiacol
5-Methylfurfural
Cis-Oak Lactone
Eugenol
Furfural
Guaiacol
Trans-Oak Lactone
Vanillin The results from a process trial are shown in FIG. 12. Differences are shown in relation vanillin and cis-oak lactone (coconut), as well as furfuryl and 5-methylfurfural (caramel/butter-scotch). Variant T6V22 (ex Seppeltsfield barrel, control), shows lower levels of vanillin and cis-oak lactone, compared to other treatments, but higher levels of furfuryl and 5-methylfurfural.

Figure 13:
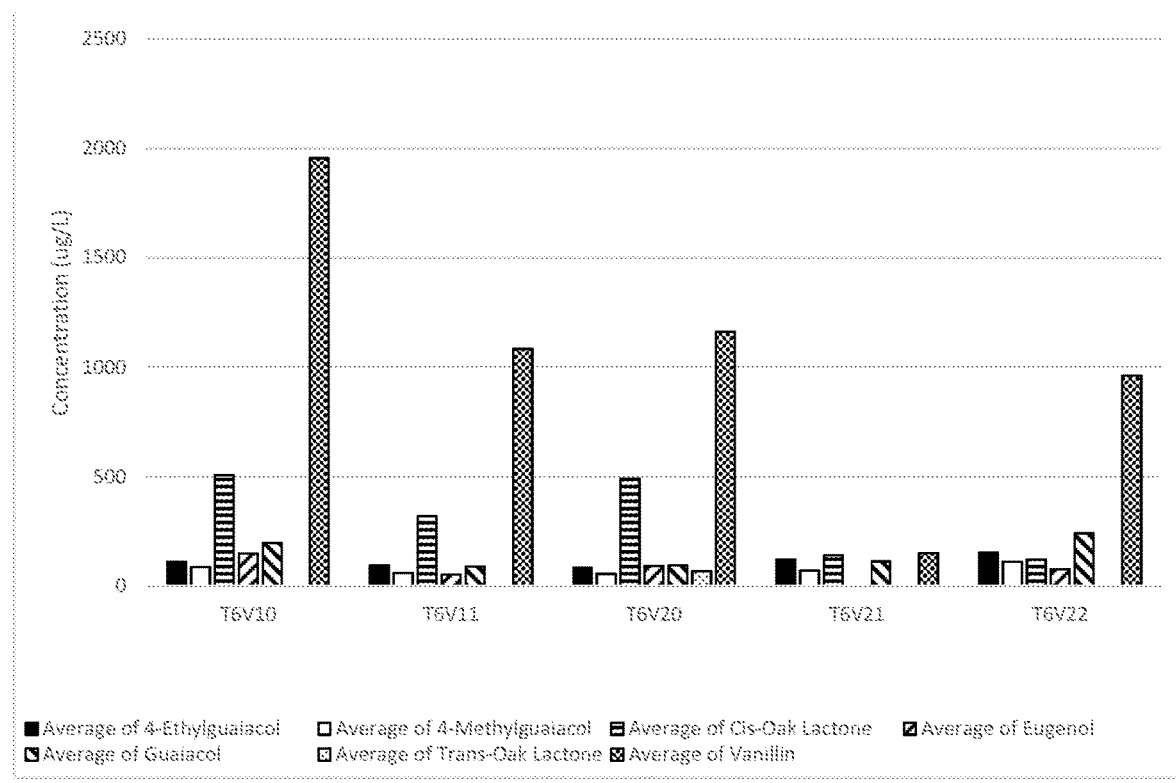
FIG. 13 shows the results of an oak analysis for a repeatability trial.

The results from a repeatability trial are shown in FIG. 13. The results show a difference in the concentration levels of vanillin, furfural and cis-oak lactone, with 2-3 fold differences across the set.

Figure 14:
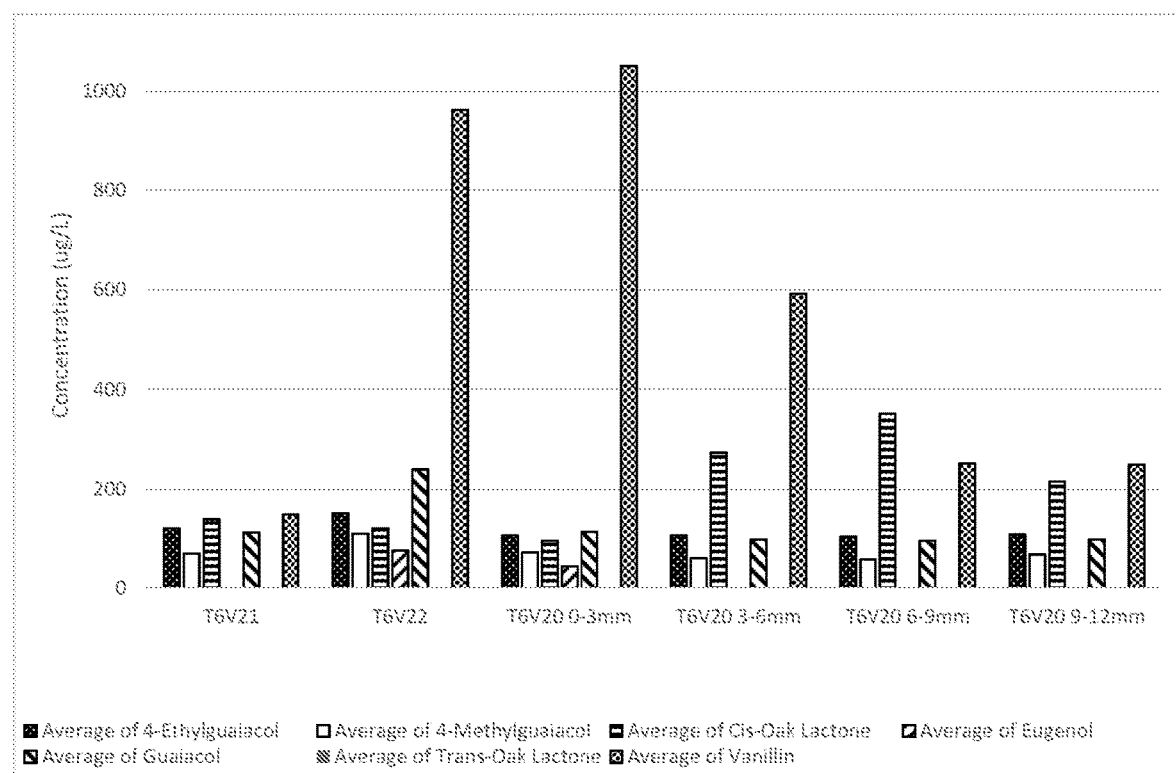
FIG. 14 shows the results of an oak analysis for stave profiling.

With regards to stave profiling (FIG. 14), differences with regards to vanillin and cis-oak lactone are shown, with the former appearing to decrease with oak depth.

Figure 15:
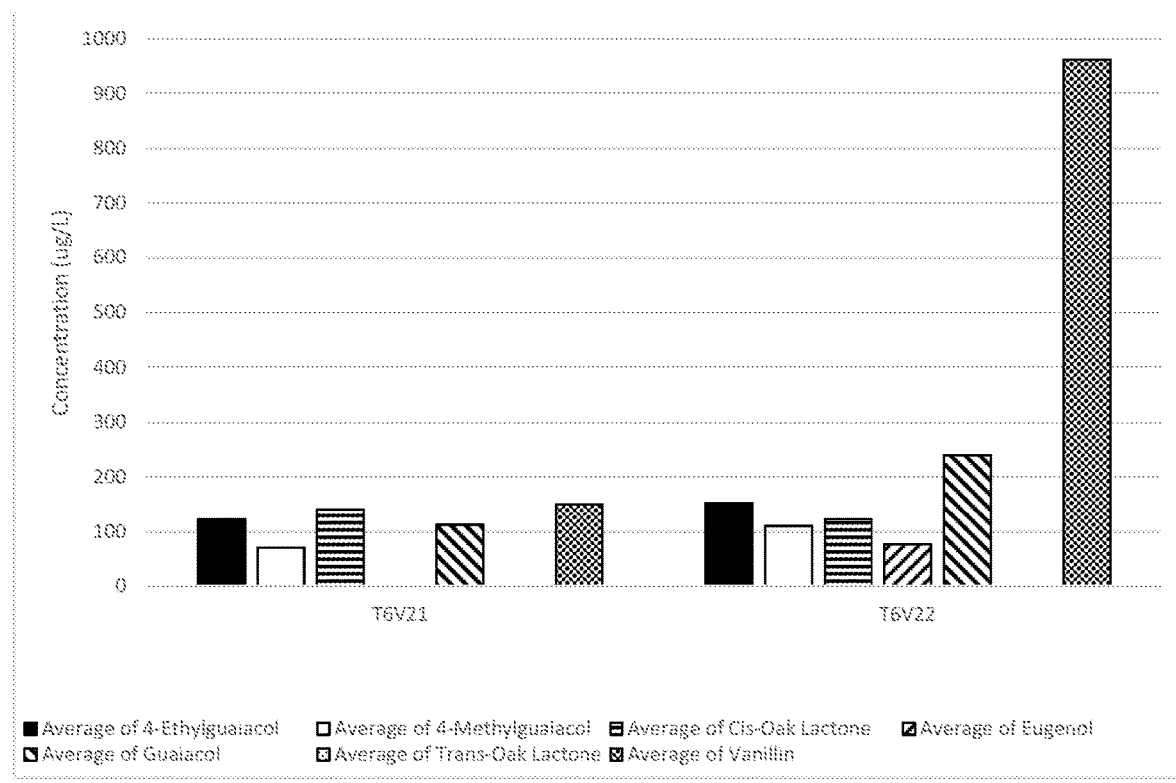
FIG. 15 shows the results of an oak analysis for the fortified study.

A study with fortified samples was also conducted (FIG. 15). The results show changes with vanillin and cis-oak lactone.

Figure 16:
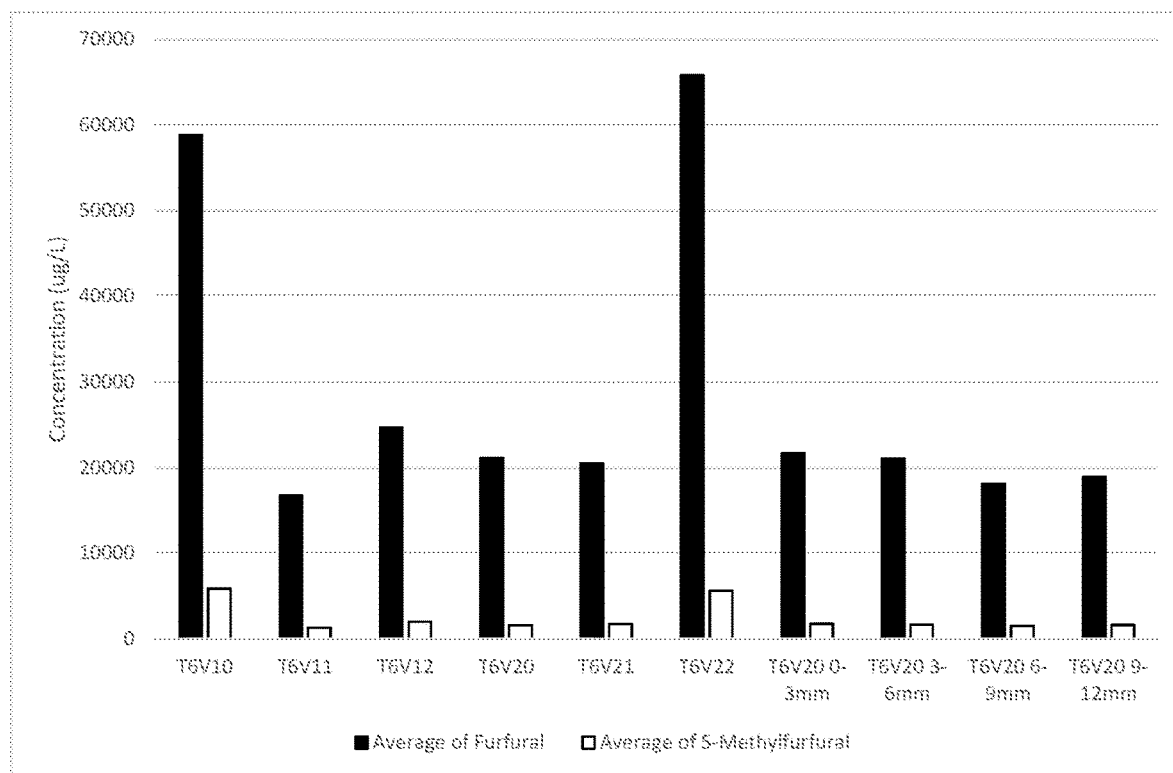
FIG. 16 shows the results of an oak analysis for the concentration of 5-methyl furfural and furfural.
Figure 17:
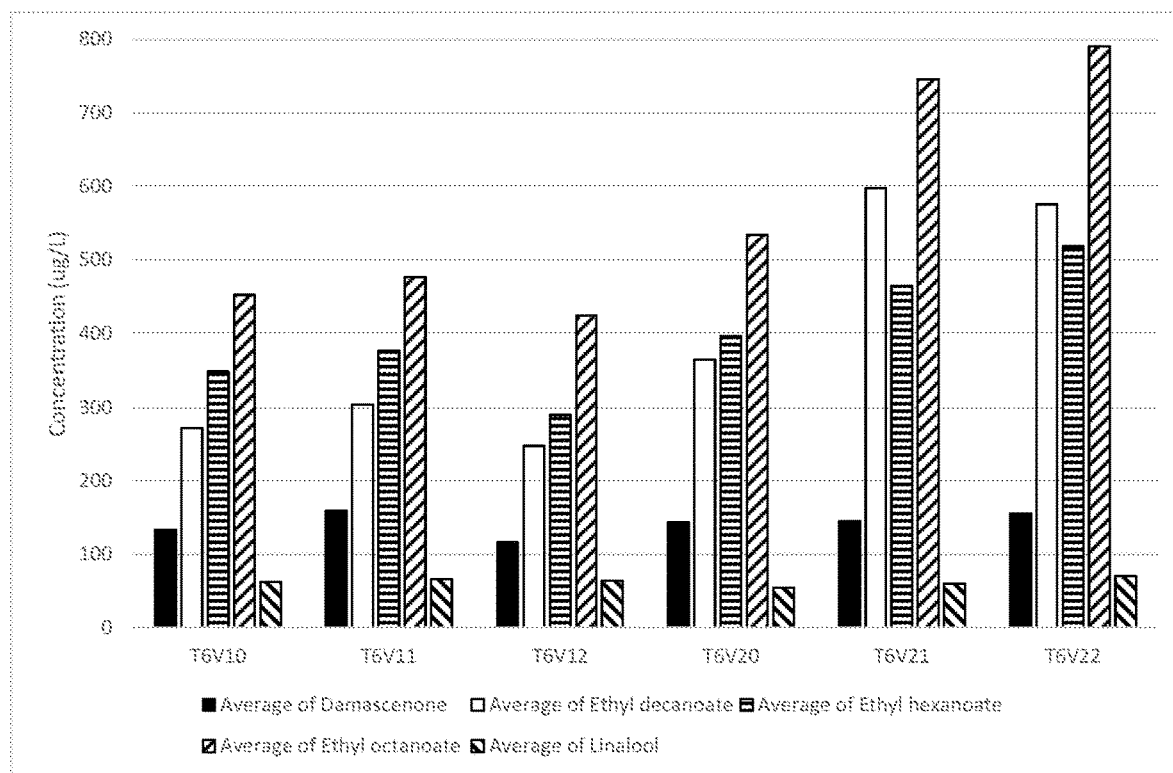
FIG. 17 shows the results of an aroma analysis for a process trial.
Figure 18:
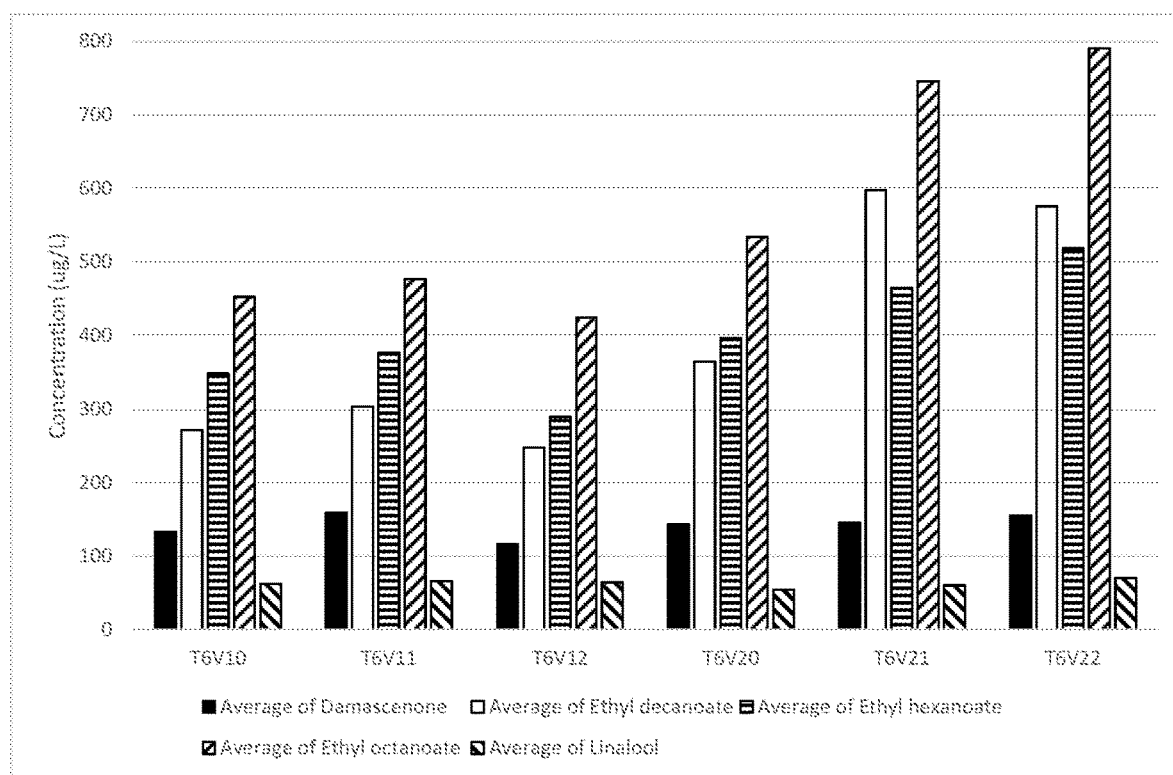
FIG. 18 shows the results of an aroma analysis for a repeatability trial.
Figure 19:
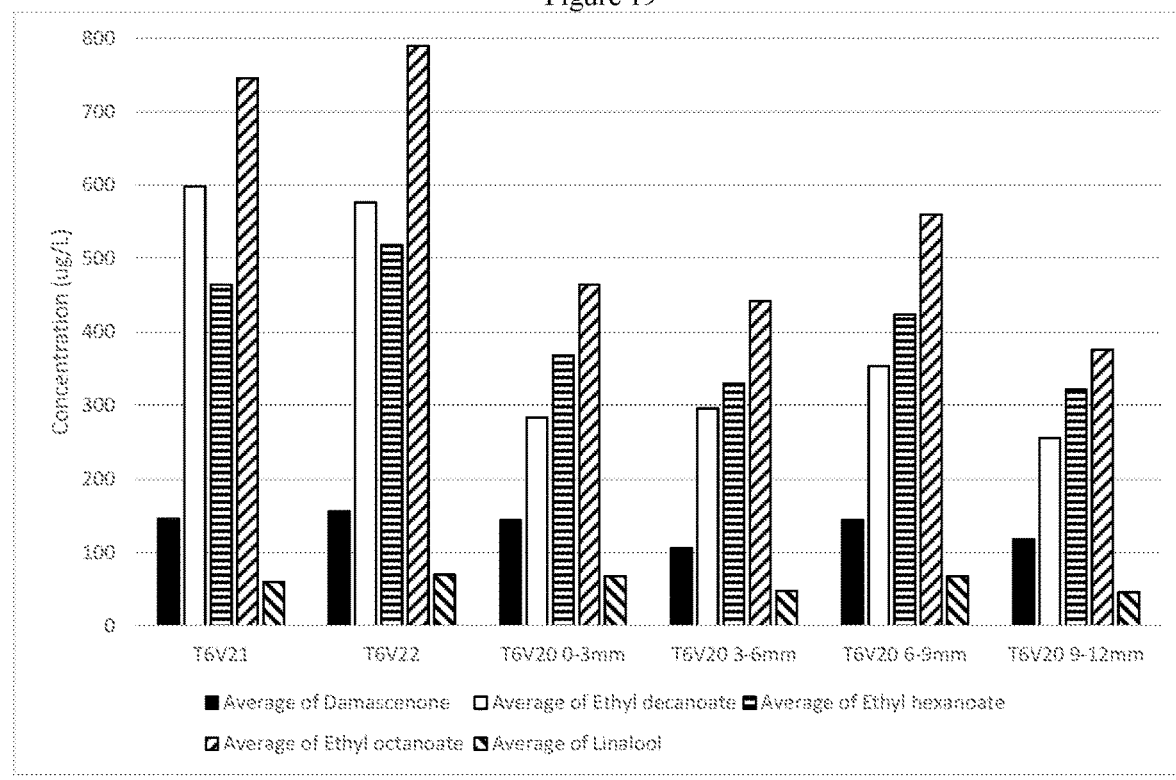
FIG. 19 shows the results of an aroma analysis for stave profiling.
Figure 20:
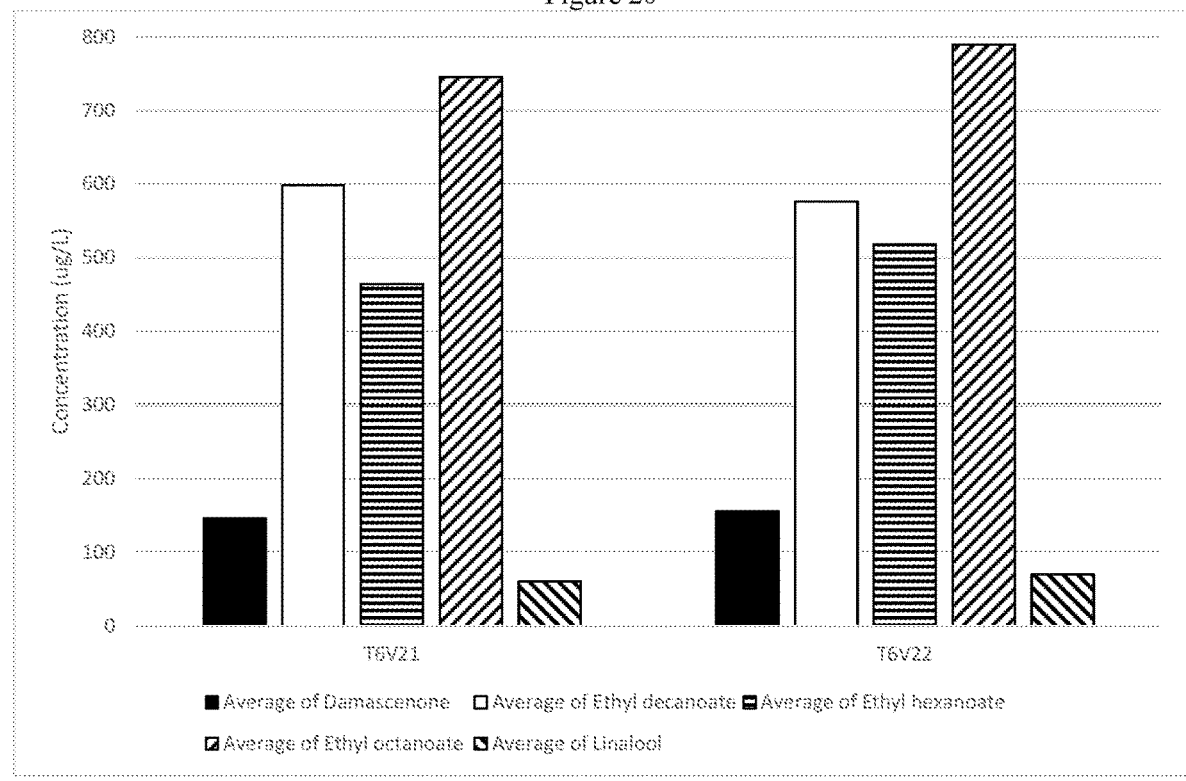
FIG. 20 shows the results of an aroma analysis for the fortified study.
Figure 21:
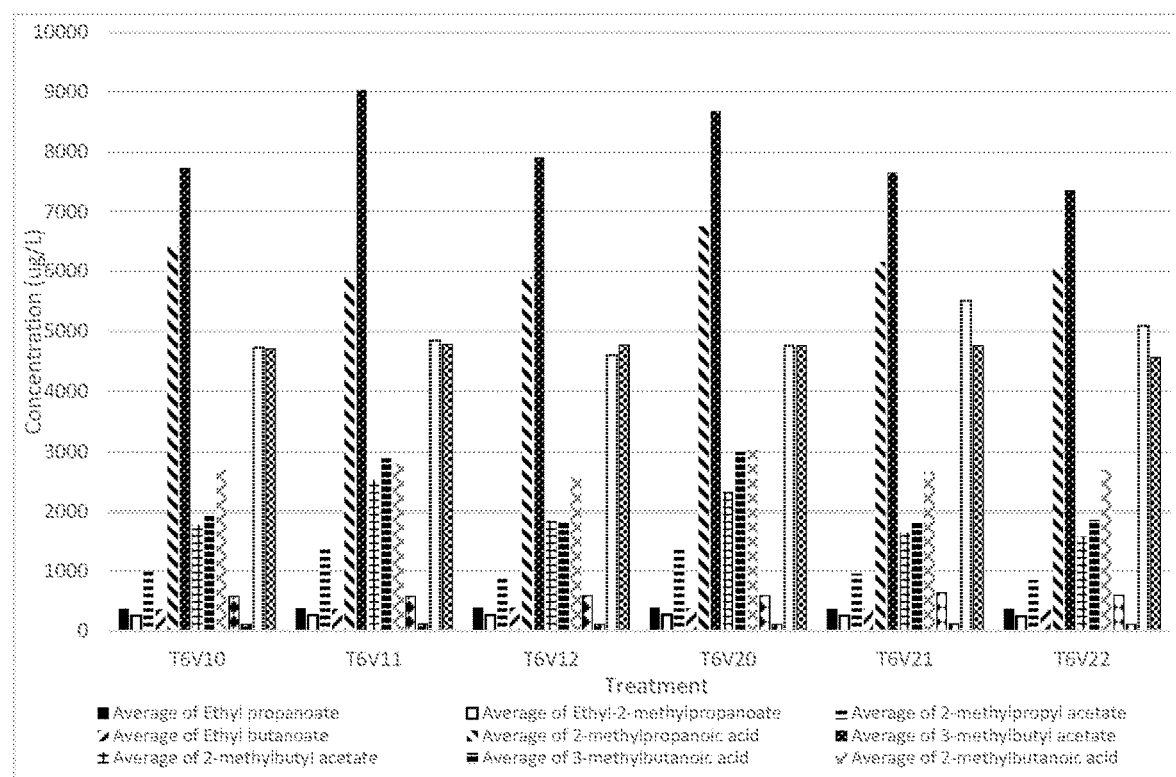
FIG. 21 shows the results of a volatile aroma analysis for a process trial.
Figure 22:
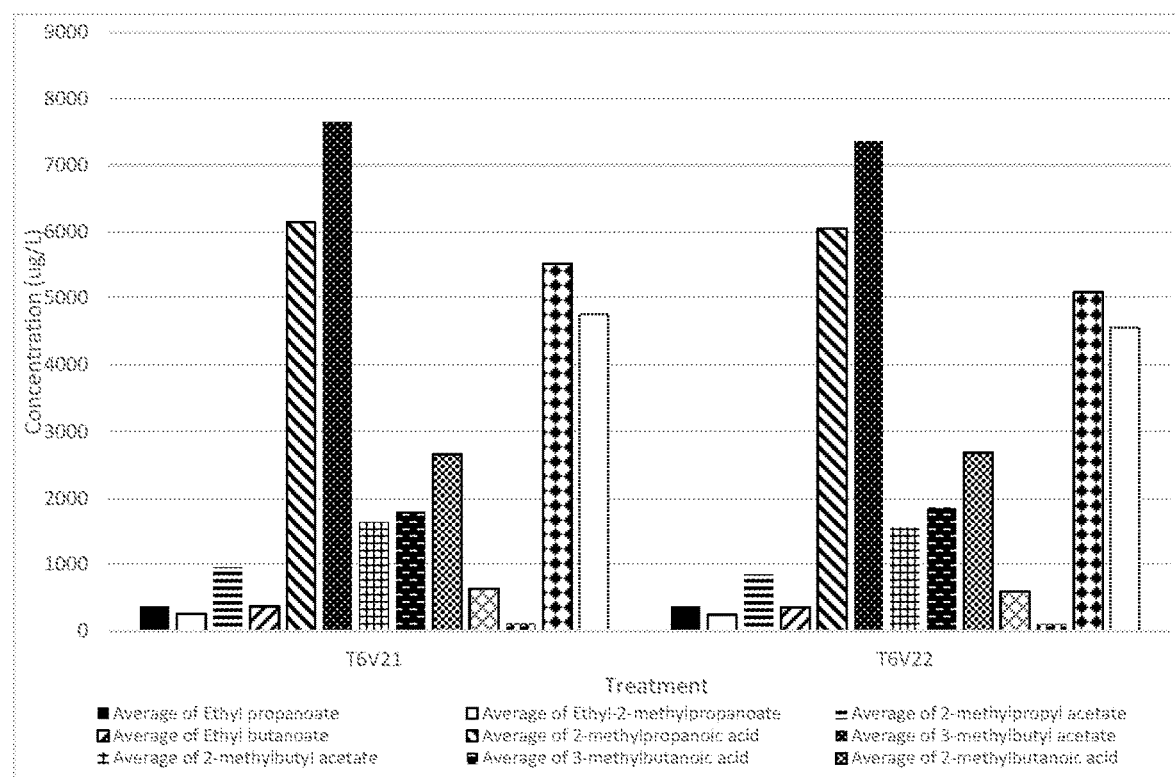
FIG. 22 shows the results of a volatile aroma analysis for a repeatability trial.
Figure 23:
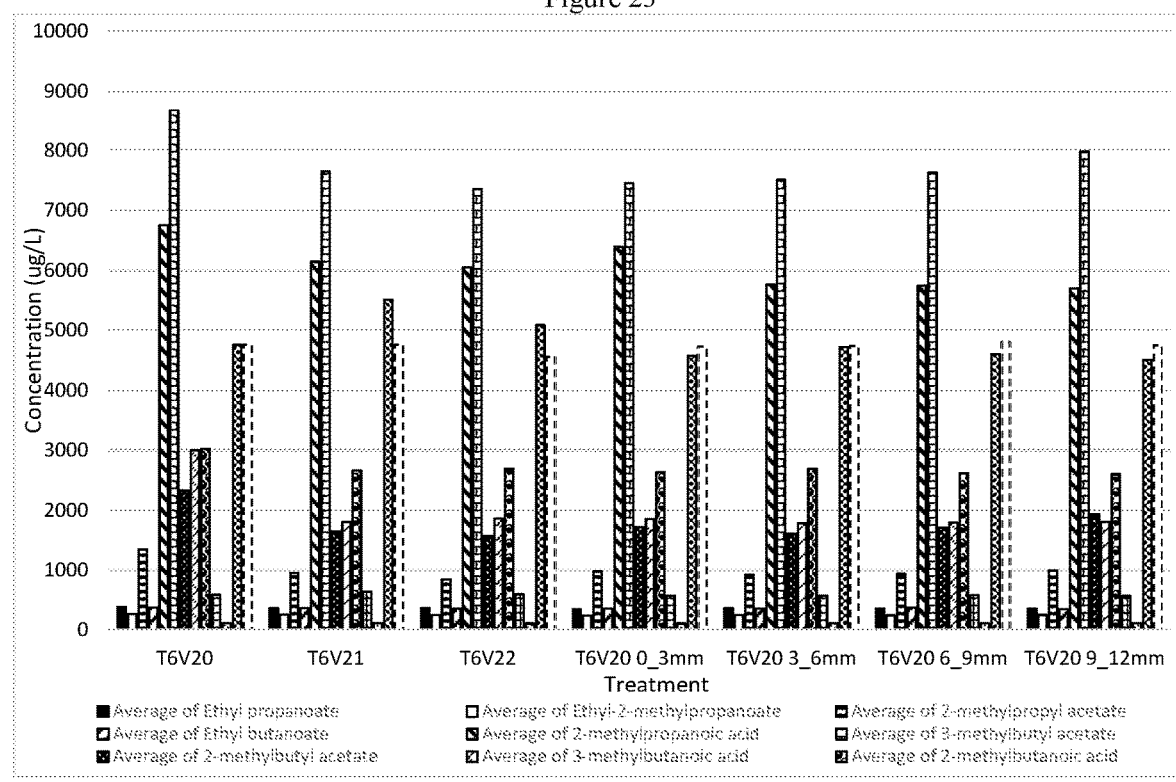
FIG. 23 shows the results of a volatile aroma analysis for stave profiling.
Figure 24:
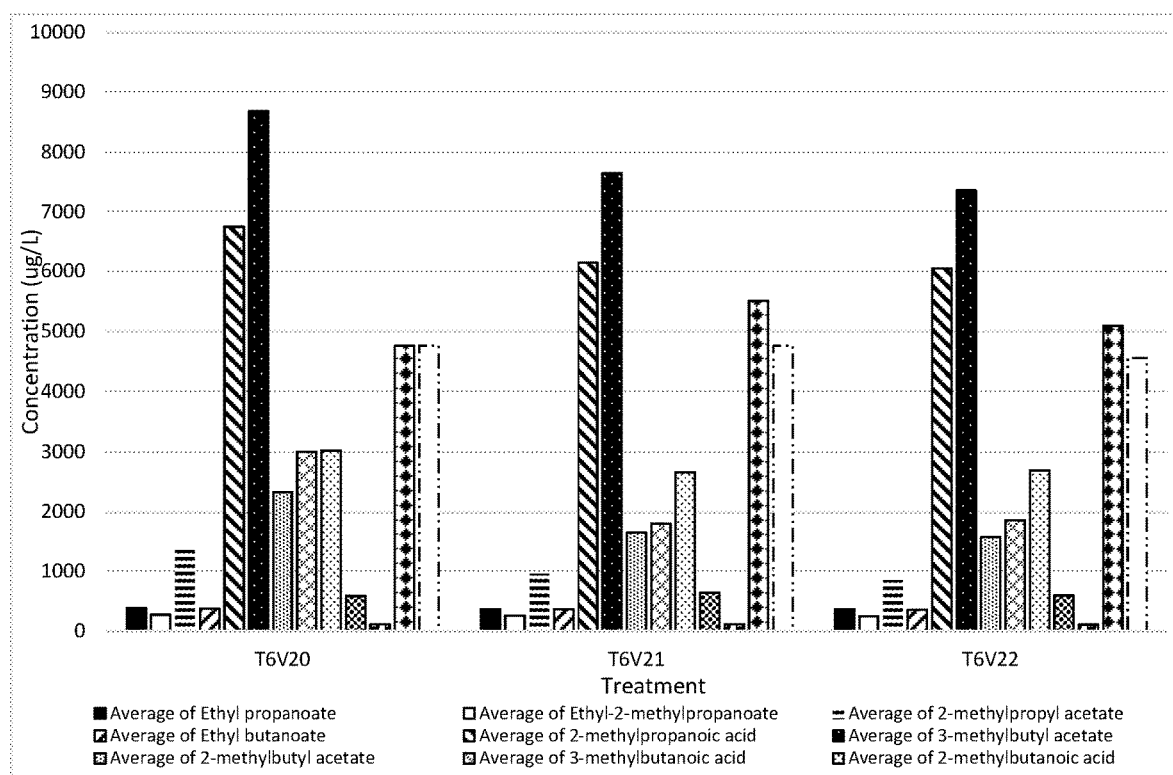
FIG. 24 shows the results of a volatile aroma analysis for the fortified study.

The concentrations for 5-methyl furfural and furfural in the tested samples is shown in FIG. 16. T6V10 sample provided a better correlation to the T6V22 sample.

Typical Wine Volatiles

Wine volatiles spanning a range of typical aroma and flavour compounds (esters, nor-isoprenoids and monoterpenes) were evaluated using GC-MS to identify the concentrations of the volatile compounds in the barrel variant samples. These compounds included:

Damascenone
Ethyl decanoate
Ethyl hexanoate
Ethyl octanoate and
Linalool

The results from: a process trial, repeatability trial, stave profiling and fortified studies are shown in FIG. 17, FIG. 18, FIG. 19 and FIG. 20, respectively.

In the process trial, the differences are noted for ethyl decanoate and ethyl octanoate (sweet, soapy).

With the stave profiling, no significant differences related to stave depth were identified.

For the fortified study, there were limited differences due to the spirit type.

Fermentation Derived Wine Volatiles

Fermentation-derived wine volatiles analysis was performed on an Agilent 7890A gas chromatograph equipped with a Gerstel MPS2 multi-purpose sampler and coupled to an Agilent 5975C VL mass selective detector.

The sample vial and its contents were heated to 40° C. for 5 minutes with agitation. The SPME fibre (polyacrylate) was exposed to the headspace in the sample for 15 minutes and was then desorbed in the injector (splitless mode) for 15 minutes. The injector temperature was set at 260° C.

Compounds analysed included:

Ethyl acetate
2-methylpropanol
Acetic acid
Ethyl propanoate
Ethyl-2-methylpropanoate
3-methylbutanol
2-methylbutanol
2-methylpropyl acetate
Ethyl butanoate
2-methylpropanoic acid
Methylbutyl acetate
2-methylbutyl acetate
3-methylbutanoic acid
2-methylbutanoic acid
Ethyl hexanoate
Hexyl acetate
Octanoic acid
2-phenylethyl acetate
Decanoic acid
Ethyl decanoate and
Ethyl octanoate.

The raw data from Agilents' ChemStation software (v E.02.02.1431) was converted into MassHunter data files and processed using MassHunter Workstation Software for Quantitative Analysis (v B.04.00). The concentration of analytes in the samples were determined using stable isotope dilution analysis (SIDA) and are reported in μg/L.

Figure 25:
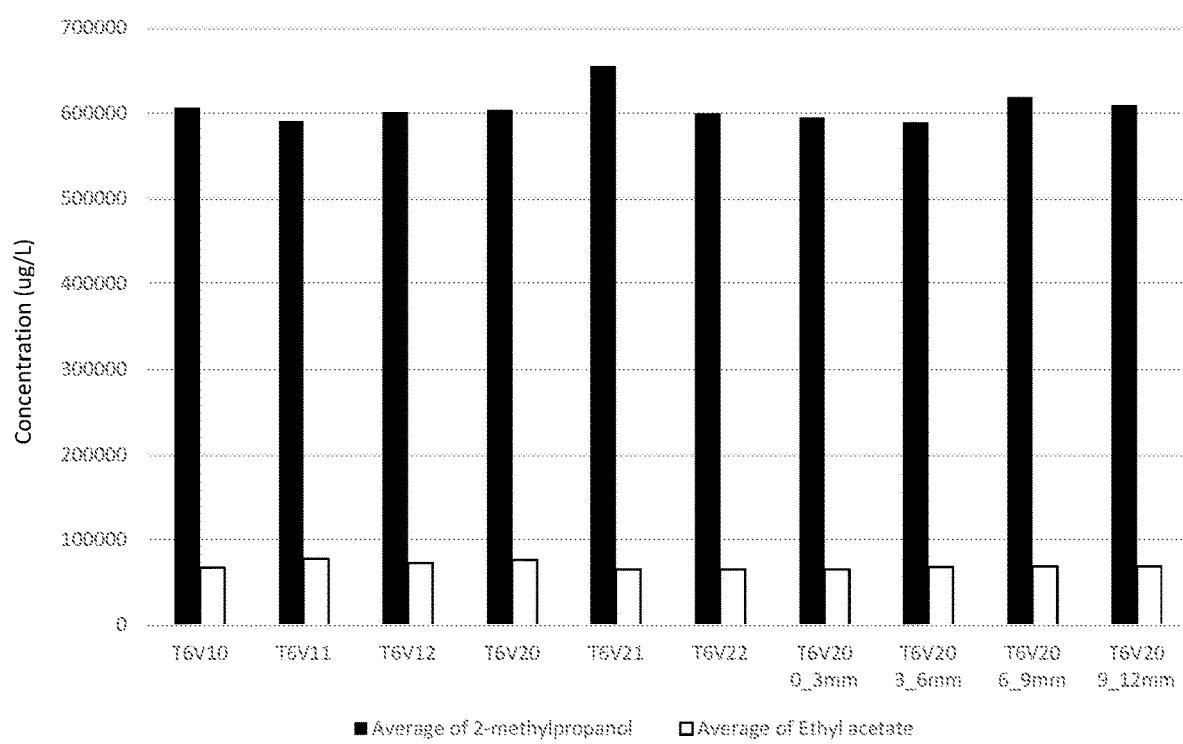
FIG. 25 shows the results of a volatile aroma analysis focused on ethyl acetate and 2-methylpropanol.
Figure 26:
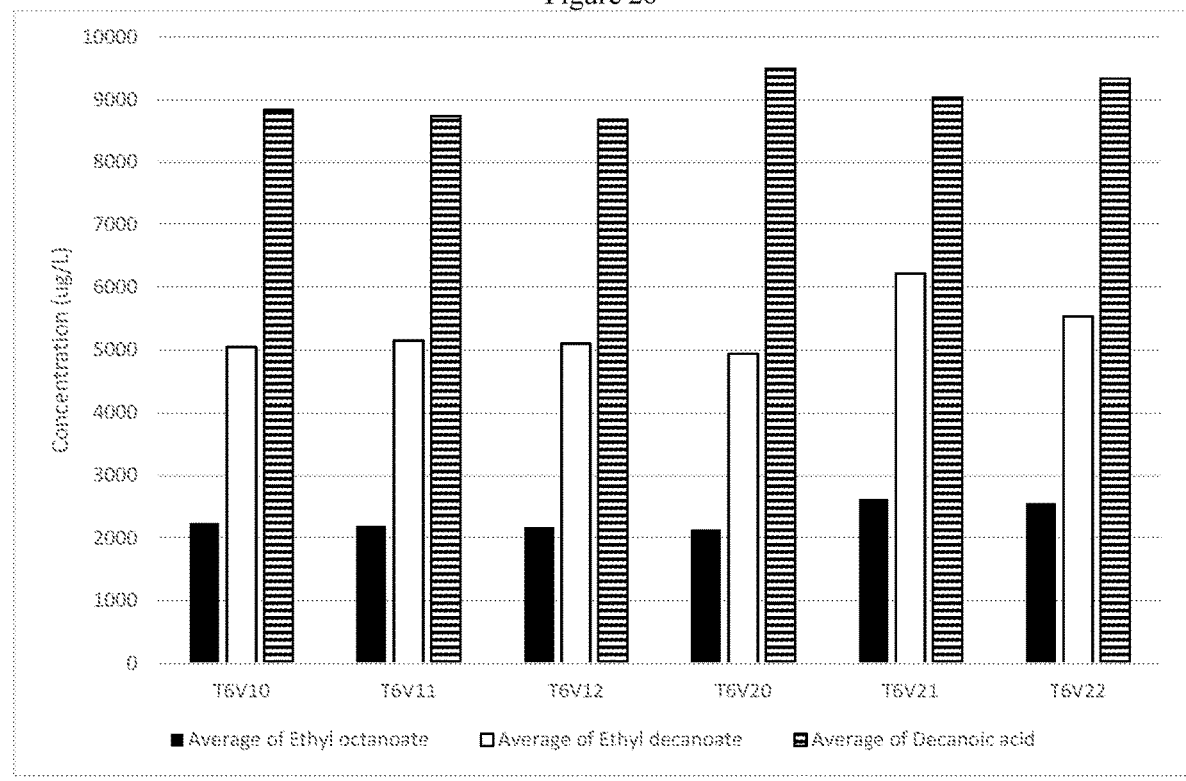
FIG. 26 shows the results of a volatile aroma analysis for a process trial focused on ethyl octanoate, ethyl decanoate and decanoic acid.

The results from: a process trial, repeatability trial, stave profiling and fortified studies are shown in FIG. 21, FIG. 22, FIG. 23 and FIG. 24, respectively. FIG. 25 focusses on the concentrations of ethyl acetate and 2-methylpropanol for the tested samples.

In the process trial a lot of the volatile compounds are present at generally similar concentrations across the sample set. The data for the repeatability trial shows that the process is relatively repeatable with regards to the analysed volatile aroma compounds. The samples for the stave profiling show that the volatile aroma profile is similar across the four incremental sections of the wood. With regards to the fortified samples, the data shows that the volatile aroma profile is generally similar across the different sample types.

Figure 27:
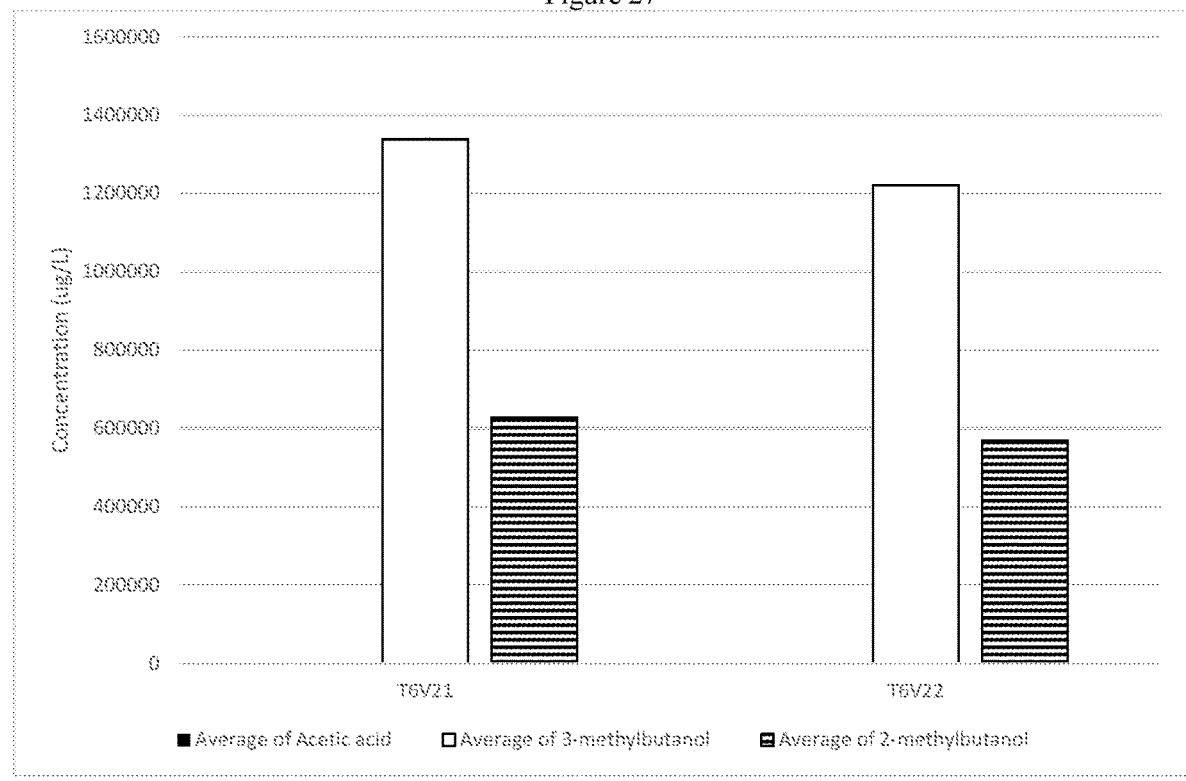
FIG. 27 shows the results of a volatile aroma analysis for a repeatability trial focused on acetic acid, 3-methylbutanol and 2-methylbutanol.
Figure 28:
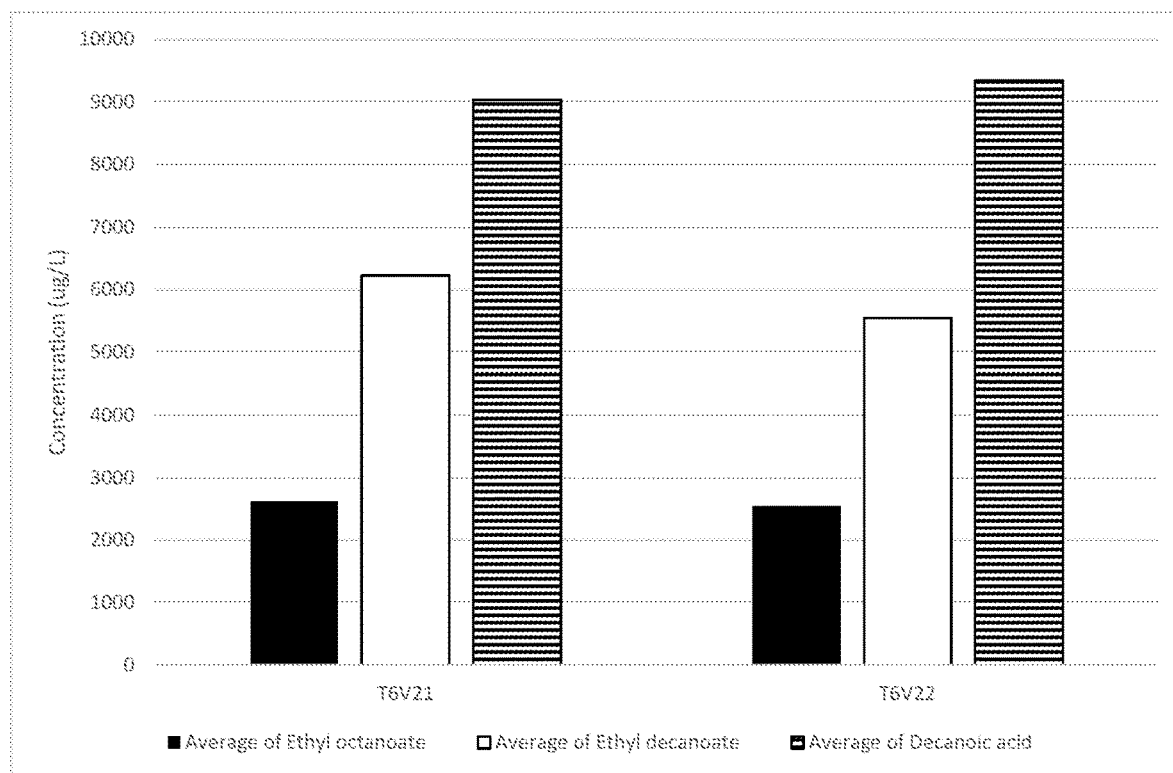
FIG. 28 shows the results of a volatile aroma analysis for a repeatability trial focused on ethyl octanoate, ethyl decanoate and decanoic acid.
Figure 29:
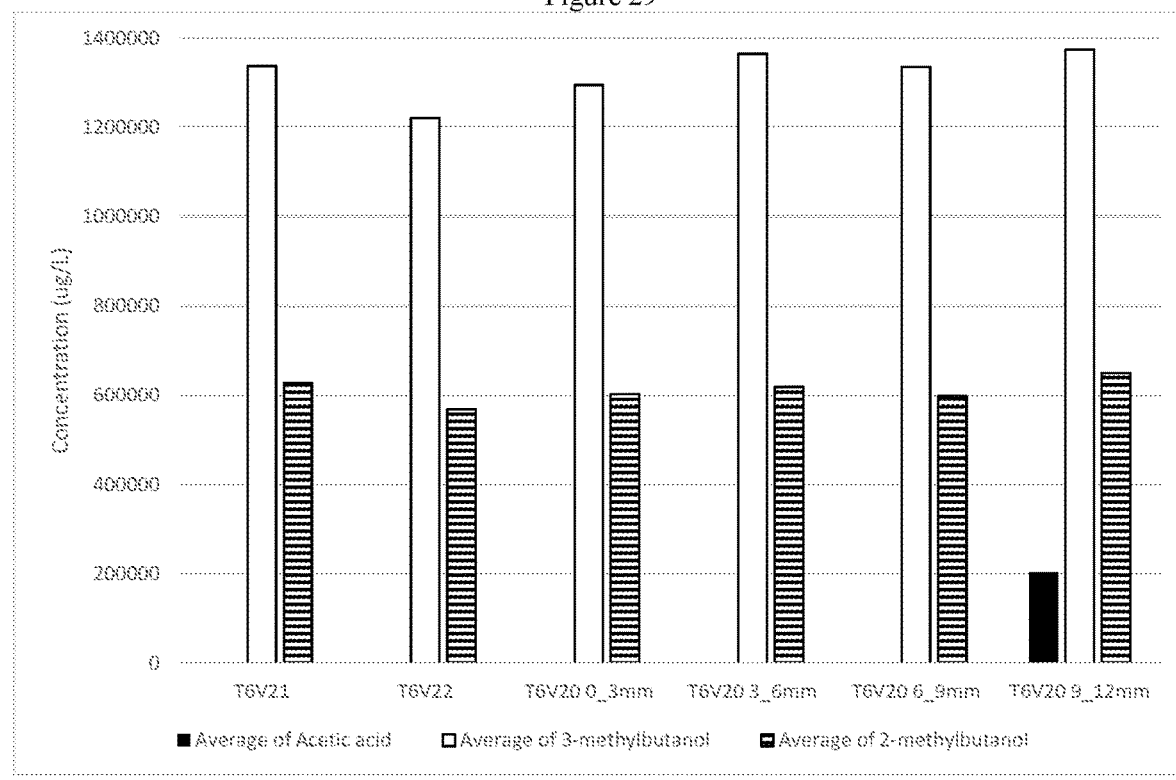
FIG. 29 shows the results of a volatile aroma analysis for stave profiling focused on acetic acid, 3-methylbutanol and 2-methylbutanol.
Figure 30:
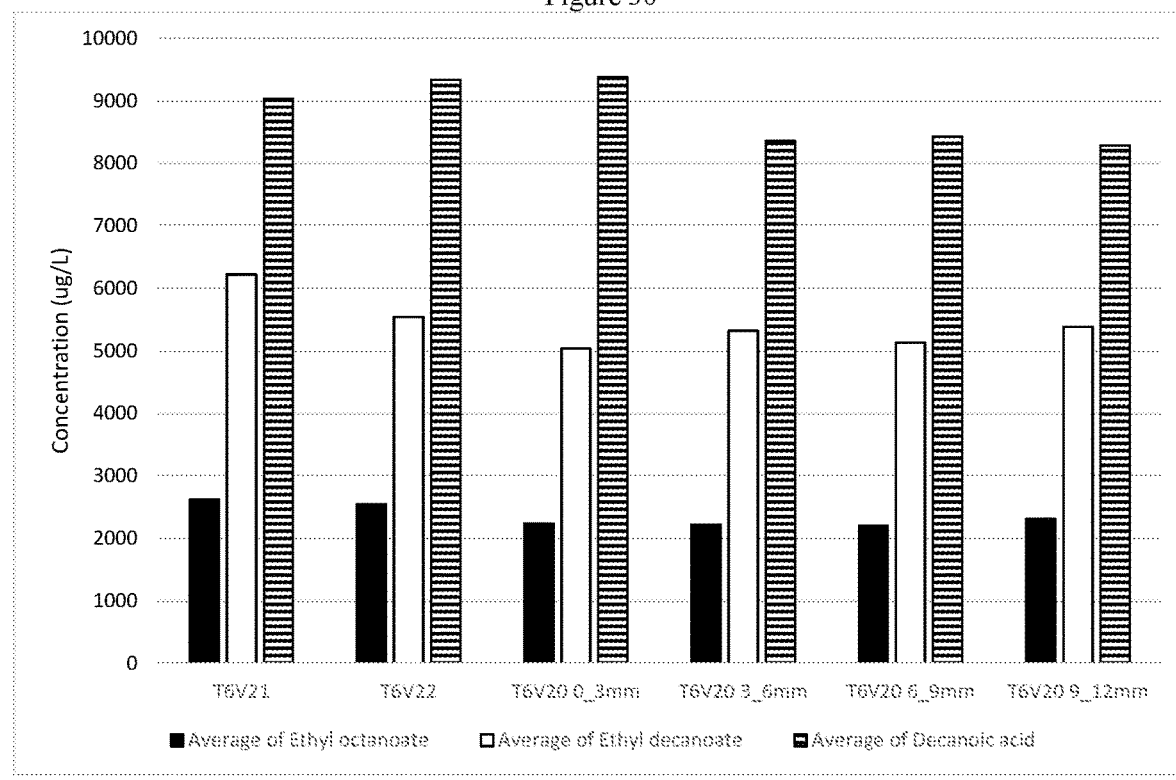
FIG. 30 shows the results of a volatile aroma analysis for stave profiling focused on ethyl octanoate, ethyl decanoate and decanoic acid.
Figure 31:
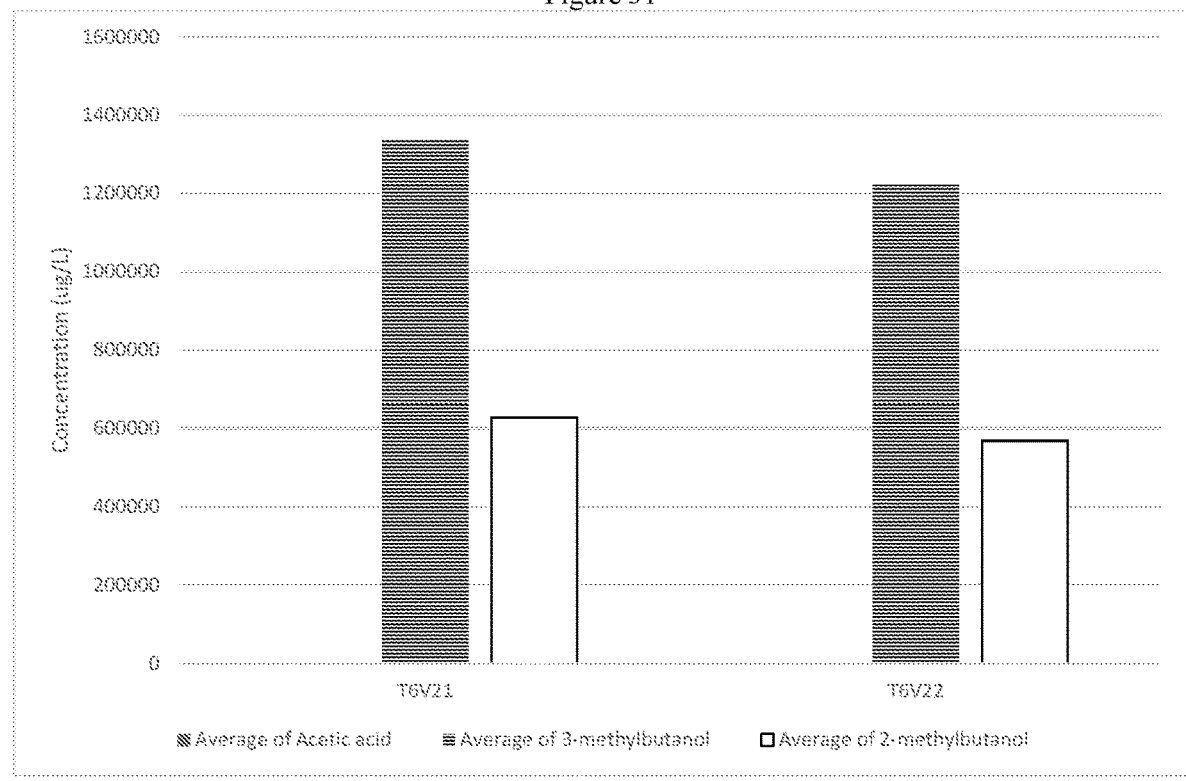
FIG. 31 shows the results of a volatile aroma analysis for the fortified study focused on acetic acid, 3-methylbutanol and 2-methylbutanol.
Figure 32:
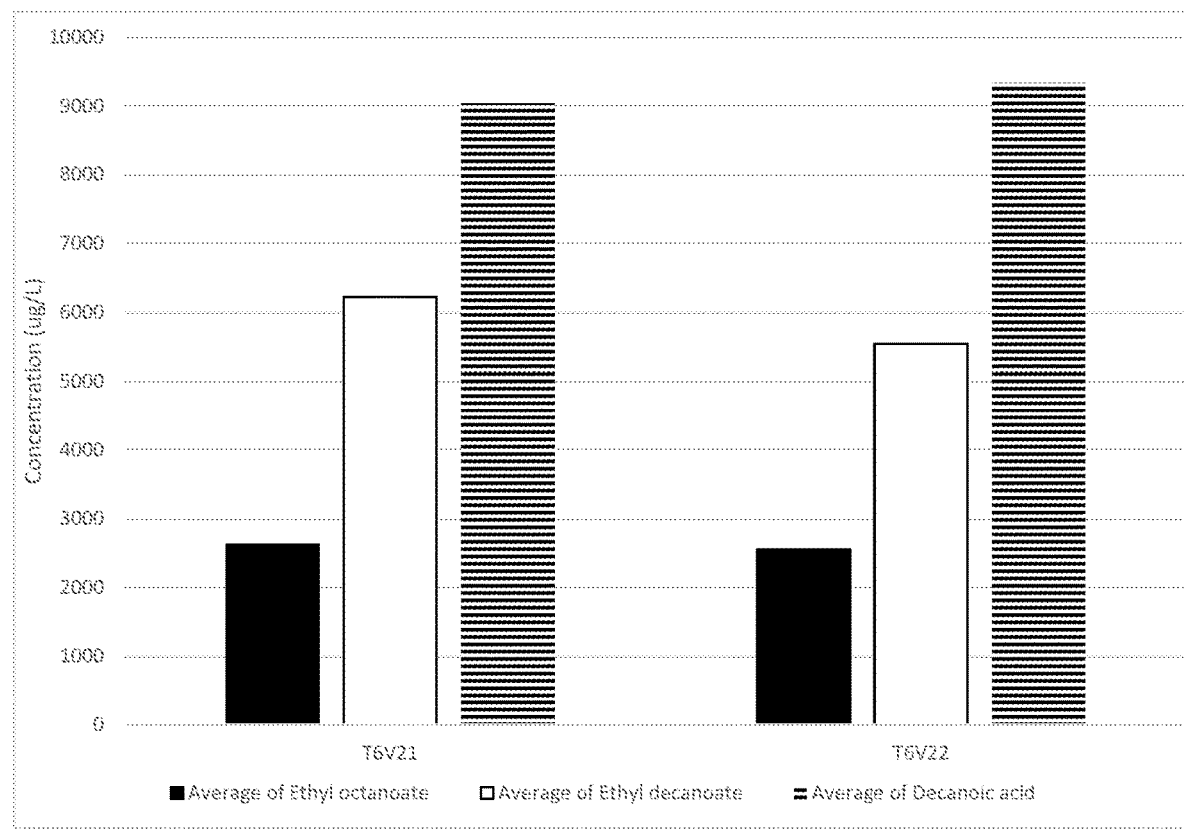
FIG. 32 shows the results of a volatile aroma analysis for the fortified study focused on ethyl octanoate, ethyl decanoate and decanoic acid.

FIG. 27, FIG. 29 and FIG. 31 show the concentrations of acetic acid, 3-methylbutanol and 2-methylbutanol in selected samples. FIG. 26, FIG. 28, FIG. 30 and FIG. 32 show the concentrations of ethyl octanoate, ethyl decanoate and decanoic acid in the selected variants.

Sensory Data

Descriptive analysis (colour, aroma and palate attributes) was carried out on selected samples.

A panel of assessors was convened to evaluate the samples. All panellists were members of the external Australian Wine Research Institute trained descriptive analysis panel and have extensive experience in beverage sensory descriptive analysis.

Assessors attended one training session to determine whether the attribute list previously used still contained appropriate descriptors for rating in the formal sessions. During this session, the assessors evaluated all the samples from the study. Spirit samples were assessed by appearance and aroma only. Aroma standards were presented, discussed and recipes adjusted as needed. These standards were also available during the booth practice session and the formal assessment sessions.

Following the training session, assessors participated in a practice session in the sensory booths under the same conditions as those for the formal sessions. After the practice session, any terms which needed adjustment were discussed and the final list of terms determined.

In formal rating sessions, samples were presented to panellists in 30 mL aliquots in 3-digit-coded, covered, ISO standard wine glasses at 22-24° C., in isolated booths under daytime lighting, with randomised presentation order. The intensity of each attribute was rated using an unstructured 15 cm line scale from 0 to 10, with indented anchor points of 'low' and 'high' placed at 10% and 90% respectively. Data was acquired using Compusense Cloud sensory evaluation software (Compusense Inc., Guelph, Canada).

Figure 33:
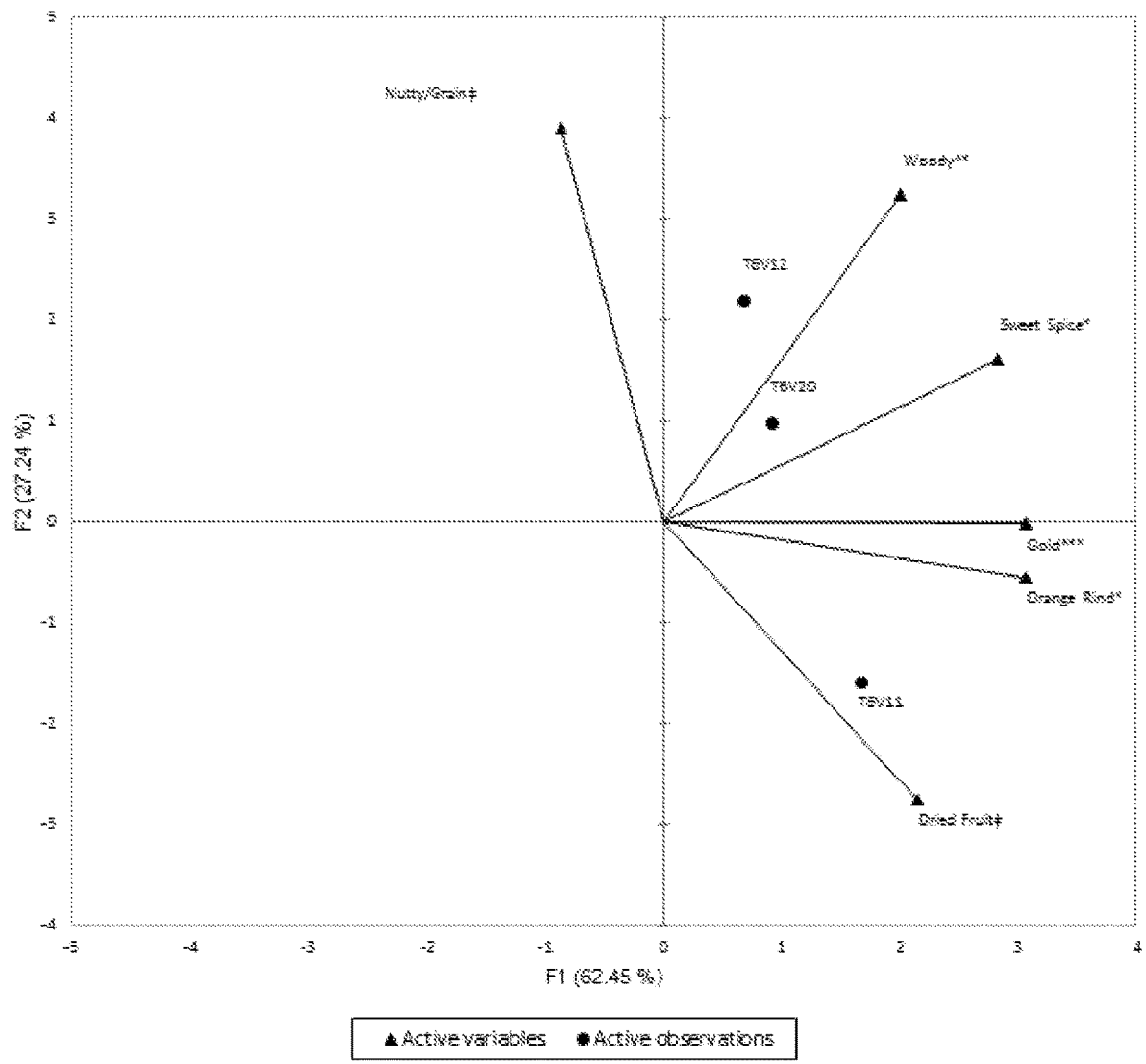
FIG. 33 shows a principle component analysis for sensory data for selected samples.
Figure 34:
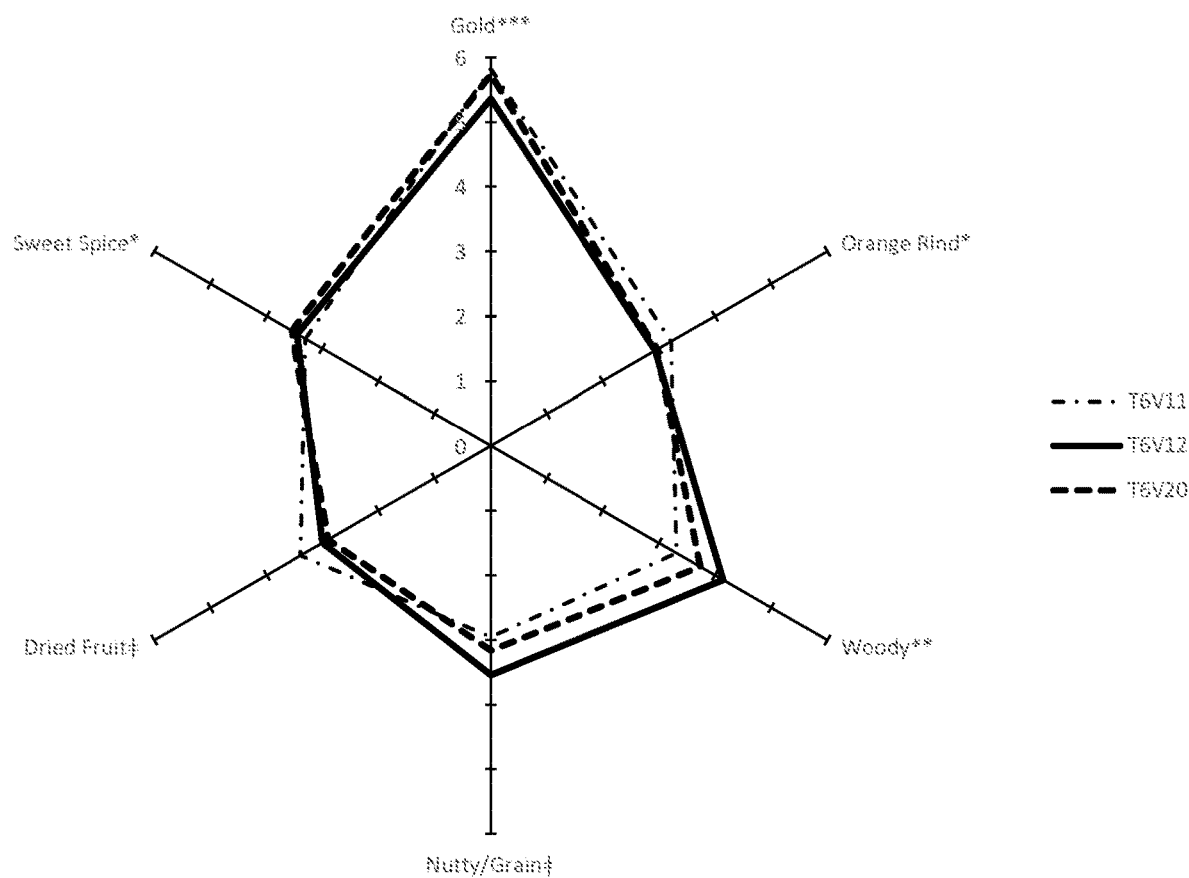
FIG. 34 shows a radar plot for the sensory data for selected samples.

A principal component analysis (PCA) plot and a radar plot for the results are shown in FIG. 33 and FIG. 34, respectively.

From the data, significant attributes were:
Gold (colour)
Orange rind (aroma)
Woody (aroma)
Sweet spice (aroma)
Dried fruit and nutty/grain aromas were close to significant, across this sample set.

Samples T6V20 and T6V12 were rated relatively high for most of the six key attributes, especially woody and sweet spice.

The data suggests that the dominant sensory attributes may be more wood-related, rather than dominated by the Apera spirit used in the process. The results can be viewed in context of the size of the sample set.

Colorimetric Analysis

Colorimetric analysis was conducted using a Cary 60 UV-Vis spectrophotometer through use of CIELab methodology with the following set parameters in accordance with method OIV-MA-AS2-11 "Determination of chromatic characteristics according to CIELab" (taken from the Compendium of International Analysis Methods).

TABLE 17

Specifications for colour measurements using the CIE lab system

| Cell size | Illuminant | Observer | Scales | Differences | Interval | Wavelengths |
|---|---|---|---|---|---|---|
| 10 mm | D65 | 10° | CIELab | dL*a*b* | 5 nm | 780 to 380 nm |

The colour analysis focused on four areas:
Process Trial—focusing on how the individual (Apera) process parameters affect the colour.
Repeatability Trial—using a 'standard' treatment, how reproducible is the process, according to colour impacts.
Stave Profiling—looking at incremental 3 mm tile sections of the wood, post treatment, to see what the layer effects are—in comparison to the 'standard' tile of 0-12 mm depth.
Fortified Samples—comparing the Apera profile to that for rum, botrytis, sherry (Pedro Ximenez) and single malt.

The attributes that were examined included:
Clarity (measure of brightness)
Individual colour components (red/green/yellow/blue)
Colour density (strength/depth of colour)
Colour difference (from control)

The results are shown in Table 18. The control was T6V22.

TABLE 18

CIELAb coordinates and calculated difference from control based on colorimetic outputs.

| Barrel Variant | Trial | L* | a* | b* | C* | ΔE* | ΔH* |
|---|---|---|---|---|---|---|---|
| T6V10R1 | Process Trial | 90.187 | 4.219 | 39.647 | 39.871 | 18.767 | 5.267 |
| T6V10R2 | Process Trial | 91.092 | 2.932 | 36.203 | 36.322 | 14.983 | 4.310 |
| T6V11R1 | Process Trial | 91.354 | 0.117 | 34.491 | 34.491 | 12.680 | 2.051 |
| T6V11R2 | Process Trial | 91.232 | 0.026 | 34.478 | 34.478 | 12.687 | 1.977 |
| T6V12R1 | Process Trial | 91.956 | 0.229 | 31.332 | 31.333 | 9.535 | 2.059 |
| T6V12R2 | Process Trial | 91.492 | 0.315 | 30.901 | 30.903 | 9.293 | 2.120 |

TABLE 18-continued

CIELAb coordinates and calculated difference from control based on colorimetic outputs.

| Barrel Variant | Trial | L* | a* | b* | C* | ΔE* | ΔH* |
|---|---|---|---|---|---|---|---|
| T6V13R1 | Process Trial | 92.750 | −0.411 | 28.865 | 28.868 | 6.871 | 1.428 |
| T6V20R1 0-3 MM | Depth Profiling Trial | 90.142 | 4.233 | 36.582 | 36.826 | 16.005 | 5.324 |
| T6V20R2 0-3 MM | Depth Profiling Trial | 90.595 | 3.744 | 33.415 | 33.624 | 12.915 | 4.989 |
| T6V20R1 3-6 MM | Depth Profiling Trial | 97.055 | −0.838 | 11.372 | 11.403 | 11.276 | 0.050 |
| T6V20R2 3-6 MM | Depth Profiling Trial | 97.244 | −0.238 | 11.103 | 11.106 | 11.633 | 0.772 |
| T6V20R1 6-9 MM | Depth Profiling Trial | 98.194 | −1.045 | 7.461 | 7.534 | 15.328 | 0.893 |
| T6V20R2 6-9 MM | Depth Profiling Trial | 98.083 | −1.080 | 7.978 | 8.051 | 14.799 | 0.862 |
| T6V20R1 9-12 MM | Depth Profiling Trial | 97.792 | −0.932 | 8.729 | 8.778 | 14.008 | 0.505 |
| T6V20R2 9-12 MM | Depth Profiling Trial | 97.939 | −0.940 | 8.394 | 8.446 | 14.366 | 0.566 |
| T6V20R1 | Process Trial | 91.575 | 0.782 | 33.701 | 33.710 | 11.980 | 2.571 |
| T6V20R2 | Process Trial | 91.585 | 0.946 | 33.703 | 33.716 | 12.012 | 2.706 |
| T6V21R1 | Fortified Spirit Trial | 96.378 | −2.323 | 13.810 | 14.004 | 8.758 | 1.705 |
| T6V21R2 | Fortified Spirit Trial | 97.056 | −2.147 | 13.976 | 14.140 | 8.746 | 1.460 |
| T6V22R1 | Fortified Spirit Trial | 90.866 | −0.832 | 41.728 | 41.736 | 19.745 | 1.543 |
| T6V22R2 | Fortified Spirit Trial | 90.398 | −0.031 | 45.351 | 45.351 | 23.429 | 2.222 |

In Table 18, L*, a* and b* are defined by the samples clarity (black/white), red/green and yellow/blue colour components respectively. Chroma is indicated by C*. The overall colourimetric difference from control and difference of tone from control, are represented by ΔE* and ΔH, respectively.

In the repeatability trial samples show that there is some reproducibility with regards to the colour profile.

The stave profiling tests shows that most of the colour resides in the first 0-3 mm of the wood, with the other layers having a relatively neutral colour, similar to the Apera barrel (T6V21).

A person skilled in the art would understand that similar degrees of colour is desirable but not essential.

The invention claimed is:

1. A process for conditioning a wood barrel, the process consisting of:
   (a) subjecting the wood barrel to heat to increase the temperature of the wood;
   contacting the heated internal surface of the wood barrel with a fluid additive (b) wherein the fluid additive either:
      is a liquid selected from the group consisting of: an alcoholic liquid; a wine or a fortified wine or an alcoholic distillate; or a flavour, wherein the liquid is optionally heated to from 60° C. to 75° C. prior to contacting the heated internal surface of the wood barrel; or
      comprises a gas, selected from peat smoke and wood smoke;
   (c) subjecting the interior of the wood barrel to a pressurised environment to facilitate absorbing the fluid additive into the wood;
   (d) optionally subjecting the wood barrel to further heating;
   (e) optionally repeating at least one of (b), (c) and (d); and
   (f) allowing the wood barrel to cool, or cooling the wood barrel, to provide a conditioned wood barrel,
   wherein a vacuum is not used before or during (c) and optionally the process further consists of any one or more of the following, in any order, prior to (a):
      contacting the internal surface of the wood barrel with hot water or steam;
      shaving the internal surface of the wood barrel;
      re-shaping or re-sizing the wood barrel; and
      toasting or charring the internal surface of the wood barrel.

2. The process according to claim 1, wherein the process comprises performing (b) and (c) more than once each, wherein further fluid additive is absorbed into the wood.

3. The process according to claim 1, wherein:
   (b), (c) and (d) are performed more than once each;
   (b) and (c) are performed two or three or four times each; or
   (b), (c) and (d) are performed two or three or four times each.

4. The process according to claim 1, wherein the heating in (a) is with at least one of fire, steam and water.

5. The process according to claim 1, wherein:
   in (a) the internal wood barrel temperature is: from 150° C. to 200° C.; from 160° C. to 190° C.; or from 160° C. to 180° C.; or
   in (b) and (c) the internal wood barrel temperature is: from 150° C. to about 200° C.; from 160° C. to 190° C.; or from 160° C. to 180° C.

6. The process according to claim 1, wherein (b) comprises spraying the fluid additive onto the internal surface of the wood barrel.

7. The process according to claim 1, wherein:
   in (c) the internal pressure of the wood barrel is: from 15 psi to 40 psi; or from 20 psi to 30 psi; or
   in (c), the pressurised environment is maintained for up to five minutes or for up to ten minutes.

8. The process according to claim 1, wherein (d) is performed by subjecting the wood barrel to further heating, optionally with fire.

9. The process according to claim 7, wherein in (d) the wood barrel is heated for up to ten minutes or for up to twenty minutes.

10. The process according to claim 7, wherein the fluid additive is a liquid additive and heating the wood barrel in step (d) oxidises and/or concentrates the liquid additive within the wood.

11. The process according to claim 1, wherein the internal surface of the wood barrel is: toasted, charred, or toasted and charred, prior to (a), optionally by fire for up to 60 seconds.

12. The process according to claim 1, wherein the wood barrel is comprised of oak, optionally selected from: American oak; European oak; or a mixture of American and European oak.

13. The process according to claim 1, wherein the wood barrel is comprised of virgin wood.

14. The process according to claim 1, wherein the wood barrel has previously been used for wine or alcoholic distillate production.

15. The process according to claim 1, wherein the wood barrel has not previously been used for fortified wine production.

16. The process according to claim 1, wherein the fluid additive is in the form of:
- droplets or particles; or
- an atomised spray.

* * * * *